United States Patent [19]

Harhen

[11] Patent Number: 5,406,477
[45] Date of Patent: Apr. 11, 1995

[54] MULTIPLE REASONING AND RESULT RECONCILIATION FOR ENTERPRISE ANALYSIS

[75] Inventor: John Harhen, Galway, Ireland

[73] Assignee: Digital Equipment Corporation, Maynard, Mass.

[21] Appl. No.: 258,131

[22] Filed: Jun. 10, 1994

Related U.S. Application Data

[63] Continuation of Ser. No. 753,267, Aug. 30, 1991, abandoned.

[51] Int. Cl.$^6$ ............................................. G06F 15/21
[52] U.S. Cl. ...................................... 364/401; 395/51; 395/925; 364/227.3; 364/276.1; 364/918.9; 364/DIG. 1
[58] Field of Search ............... 364/512, 402, 419, 401; 395/51, 1.1, 600, 800, 11

[56] References Cited

U.S. PATENT DOCUMENTS

| T998,008 | 9/1980 | DeLano, Jr. .......................... 364/412 |
| 4,754,409 | 6/1988 | Ashford et al. ...................... 364/513 |
| 4,918,521 | 4/1990 | Nado et al. ........................... 364/513 |
| 5,088,048 | 2/1992 | Dixon et al. .......................... 395/11 |
| 5,175,797 | 12/1992 | Funabashi et al. .................... 395/22 |
| 5,182,793 | 1/1993 | Alexander et al. ................... 395/13 |
| 5,224,204 | 6/1993 | Tsuruta et al. ........................ 395/51 |

OTHER PUBLICATIONS

Carlson et al., "Frame-Based Modeling Techniques for Analyzing A Strategic Planning Domain", *Proceedings of the Twenty-First Annual Hawaii International Conference on System Sciences vol. III Decision Support and Knowledge Based Systems*, 5–8 Jan. 1988, pp. 131–135.

Thomas, Robert J., "Forecasting New Product Market Potentiali & Combining Multiple Methods", *Journal of Product Innovation Management*, vol. 4, No. 2, Jun. 1987 pp. 109–119.

Kamel et al. "MCFS: A Multiple Criteria Reasoning Fuzzy Expert Systems Building Tool", *Proceedings 14th Annual International Computer Software And Applications Conference*, pp. 605–610 Oct. 29–Nov. 2, 1990.

Ohta et al., "A Forward–Chaining Multiple-Context Reasoner and Its *Application to Logic Design*" *Proceedings of the 2nd International Conference on Tools For Artificial Intelligence* pp. 386–392, 6–9 Nov. 1990.

Primary Examiner—Thomas G. Black
Assistant Examiner—Paul R. Lintz
Attorney, Agent, or Firm—Kenyon & Kenyon

[57] ABSTRACT

A computer-based method and apparatus for enterprise analysis, with which a user can generate value projections by applying, in parallel, multiple reasoning methods. The invention presents a method and apparatus for creating a complex, networked model of an enterprise, or system and its environment, that is structured from categorized objects and relationships. Using the model, the present invention is self sufficient in determining which areas of the multiple reasoning methods to appy to the variable projection problem. Applying reasoning methods to a single projection problem generates a set of conflicting intermediate hypotheses that the present invention can resolve to form a single final hypothesis through a reconciliation process that evaluates quality factors associated with the intermediate hypotheses. A problem solution tree tracks the solution process to provide to the user a full explanation of the methods chosen or discarded and data relied upon or disregarded.

21 Claims, 21 Drawing Sheets

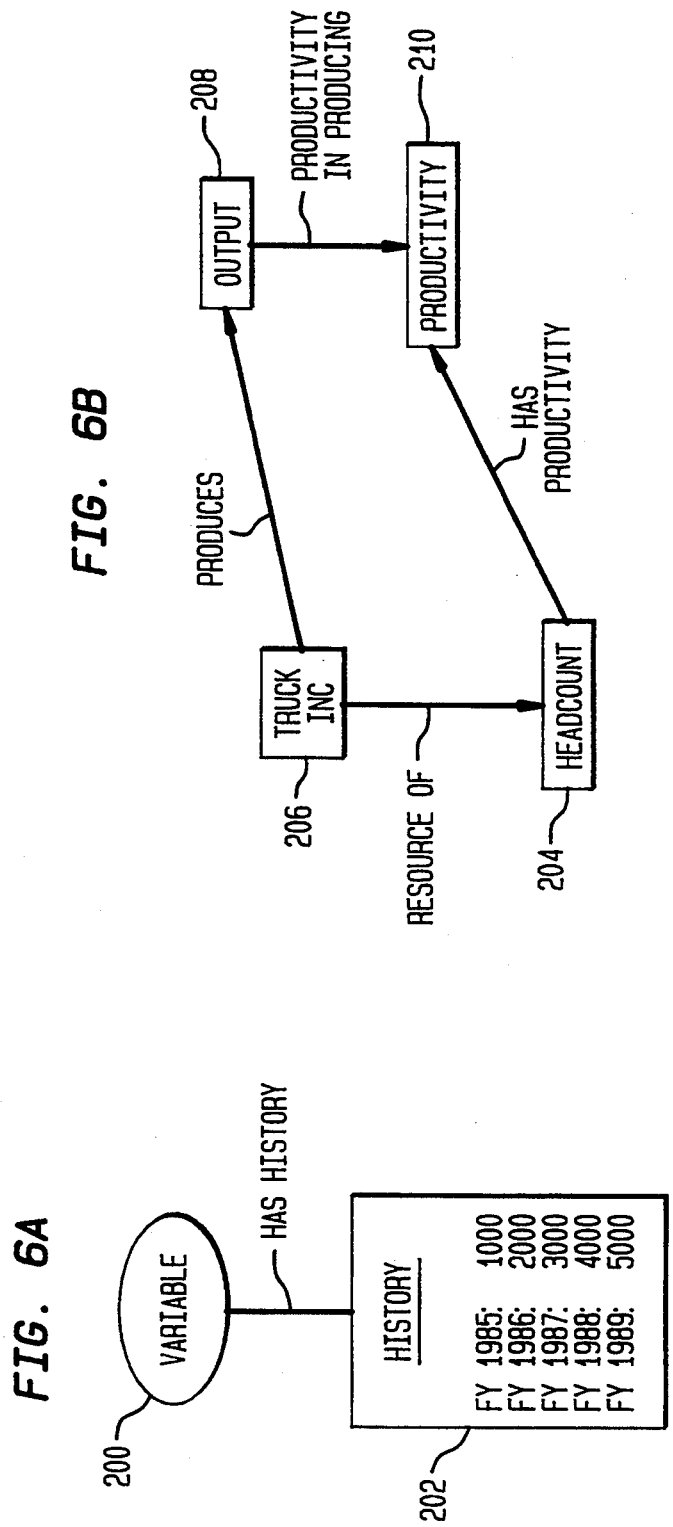

MULTIPLE REASONING AND RESULT RECONCILIATION FOR ENTERPRISE ANALYSIS

This is a continuation of application Ser. No. 753,267, filed Aug. 30, 1991, and now abandoned.

FIELD OF THE INVENTION

This invention pertains generally to the field of knowledge-based computer systems and, more particularly, to the field of decision support tools. In an exemplary embodiment, the invention pertains to the field of decision support tools for the management of an enterprise through strategic planning.

BACKGROUND OF THE INVENTION

Strategic planning is critical to the future success of any enterprise—an enterprise being any organization or business concern which produces products or renders services. The goal for a planning manager is to position the enterprise so that it can respond profitably to future market trends.

For example, a manager of a large industrial enterprise with a global market orientation, such as an aerospace engineering firm, might attempt to gather information on whether the world market for a particular engine part will be strong, weak, or non-existent, before making resource allocation decisions, such as leasing factories and equipment, or hiring employees for work. Perhaps the current product needs to be redesigned before it goes to the market. Perhaps a competitor has a new product that makes the current design obsolete, or perhaps the costs involved in re-tooling factories and retraining employees will be so expensive that the project should be dropped. Resolution of such decisions will affect the positioning of the enterprise in making capital investment and resource allocation decisions.

Generally, the resource allocation decisions made through the strategic planning process have a tremendous impact on the character and continued viability of the enterprise—so the stakes are high for the planning manager. Resource allocation decisions based on strategic planning analysis are typically made on a highly aggregated basis, and the time horizon for this planning, though arbitrary, typically ranges from three to ten years. If a planning manager's projections accurately anticipate the market trends, the enterprise will tend to thrive. Otherwise, it is likely to falter or even fail.

Planning managers spend much time and effort developing strategic resource allocation plans. Such a plan is a recommendation of the general direction an enterprise should take, containing an aggregate-level statement of resource allocation, and a statement of the assumptions underlying the plan. Those underlying assumptions are projections of conditions that the enterprise will most likely face. In planning, managers attempt to predict the future evolution of products, production processes, markets and other factors that will affect future production. Managers typically consider the forces that affect the making and marketing of a product, such as changes in the cost of raw materials to produce the product, the particular needs of large customers, the products offered by competitors, the need for product re-design, trends in component technology, trends in manufacturing process technology, changes in the employee skills needed, changes in manufacturing productivity (using measures such as manufacturing output per person, manufacturing output per manufacturing space or capital required per employee), inventory flow trends, as well as societal and governmental influences. The projections needed to make a resource allocation decision might include:

- Projections pertaining to the size, location or description of the market for goods or services sold by the enterprise;
- Projections pertaining to the expected sales of the product or services in the market;
- Projections pertaining to the costs of producing products or rendering services (including the costs of materials, land, factories and equipment, or the cost of acquiring trained workers);
- Projections pertaining to factors of the general economy that would affect the marketing or making of the goods or services such as Gross National Product (GNP), cost of living, inflation, or unemployment rates;
- Projections pertaining to changes in the state of technology and the need for future research and development;
- Projections pertaining to the emerging product technology that will affect sales or evolution of a product;
- Projections pertaining to new products that will change the market or make the current products obsolete; and
- Projections pertaining to political or governmental influences on the making or marketing of the product, such as imposition of regulatory restrictions or taxes, or the political stability of a nation.

Projections provide the support for the resource allocation decisions. For a large industrial enterprise, creating projections based on these factors can be a substantial task, because projections for each factor will vary greatly, depending on the assumptions made and the problem solving approaches taken.

Generating the projections in strategic planning that are used as a basis for making resource allocation decisions is an inexact process. A key problem has been to develop a way to integrate the diverse and often conflicting information that is used in forming projections. Managers have access to a variety of incomplete, and often inconsistent information from many different sources, from which a complete and cohesive plan must be wrought. First, there is raw numerical data, concerning the enterprise itself and the products and/or services it provides. Budgets, sales figures, gross and net income figures, production totals, quantities of raw materials purchased, numbers of employees used, layoff figures, attrition rates, quantities concerning defective products, etc., are readily used for creating projections. As enterprises are generally careful in keeping records, the statistical information available on the enterprise is quite detailed and is available in varying levels of aggregation. In addition, there is also raw numerical information concerning the market for the product and the economy as a whole. Statistics such as market indicators, total market sales, demographic figures, as well as general economic factors such as GNP, inflation and unemployment rates are also readily available.

Along with this historical data, enterprises also promulgate general statements on their expectations for output and future sales that reflect either general corporate policy, expectation or the need for profit. Other information such as general knowledge of enterprise history, information on technology trends and information on governmental influences further affect projections. This additional information should be incorporated to make more realistic and persuasive projections.

To synthesize that raw statistical and other data and form projections, enterprise managers create models showing the relationships between the factors that will affect the projection, gather information on these factors, and then use different reasoning methods, such as causal modeling, correlational modeling, historical reasoning or input/output analysis, to make a projection. Each reasoning method for projection uses a different set of assumptions and performs its analysis on different data drawn from different factors. For any one projection needed in making a resource allocation decision, many different reasoning methods can be applied arriving at many different results. The results will differ, sometimes because of conflicting data used and sometimes because the assumptions and approaches implicit and explicit in each reasoning method vary. Managers may wish to perform "what if" analysis and create projections substituting different "made-up" values in the analysis, in a way similar to an engineer's use of system dynamics models. Further, the projection techniques can be applied to data at different levels of aggregation. Each of the projections created have differing levels of credibility or reliability, which the manager must evaluate in deciding which one to adopt.

Thus, much of the strategic planning activity involves understanding the significance of the numeric data, evaluating the assumptions of the reasoning methods used to transform that data into projections, measuring the credibility of the results, and then reconciling the various results by merging them or choosing between them.

For example, an enterprise manager may look at historic productivity trends to generate a projection about future productivity. Additionally, he or she may use knowledge of the causal forces that affect future productivity to generate an alternative projection. The "historical" and "causal" perspectives may suggest identical future productivity rates or they may differ sharply. In either case, they must be merged or reconciled. Merging and reconciling conflicting data relies heavily on the manager's knowledge of the credibility of the assumptions and data used to arrive at a result, the plausibility or reliability of each reasoning method, and how credible each reasoning method result appears in relation to the others. In any enterprise, different managers will have different views on how those factors should be applied, as it is always arguable that different factors should drive the process of determining strategy. Thus, in most enterprises, the strategic planning process involves multiple decision makers, each with various implicit and explicit goals. These goals are not reducible to one set of criteria. Thus, the decision-making process through reconciliation is highly subjective.

For many years, planners have sought the aid of computer-based tools in strategic planning. The problem has been to create a computer system to generate plausible recommendations concerning the nature and the amount of the various resources that are required to supply the enterprise, and identify the actions appropriate to acquire and develop these resources, given that there are a large number of factors to consider in planning and many different ways to consider them. The computer system must be able to analyze data from many different perspectives and form a single projection based on the results from the application of the different reasoning methods.

Commercial computer applications have played a minor role in the planning processes at this level. For instance, attempts at applying systems dynamics techniques to problems in strategic planning have several shortcomings. Because of its focus on the examination of the stability of the response to external stimuli and the feedback loops within its model of the enterprise, systems dynamics principles tend to over-emphasize the importance of transient behavior in the analysis of systems. More importantly, it ignores the context out of which starting parameters are derived and does not have any self-awareness, thus precluding explanation. It also lacks the ability to easily represent aggregate structures, and does not allow any consideration of alternate model structures within the one framework.

Also, other resource planning tools that are currently available employ an incomplete representation of the planning process. Such systems do not represent in any way the uncertainty associated with the forecast demand, nor do they allow for the consideration of change in the technology required to produce a product. The goals of the organization are not explicitly represented and problem solving as such is left entirely to the planner. Furthermore, these systems do not represent the context out of which planning parameters, such as productivity are derived. Alternate views are not represented. Neither systems any self-awareness of the methods it applies. Consequently such systems cannot offer any explanation of how planning parameters are derived or results generated.

As a result of these deficiencies, strategic planning in manufacturing is largely a manual process, with the primary computerized decision support coming from spreadsheet tools, word processing programs and electronic mail. There is considerable need for new modeling technology that can represent conflicting views and structures simultaneously within a system and which, in addition, has knowledge of the context out of which its parameters are derived and self-awareness of its reasoning processes so that reasoned explanations can always be generated to support the results that the system generates. Thus, the creation of a method and apparatus to adequately provide for the representation of all aspects of a system or entity, such as an enterprise, would be an advance and would have a wide range of uses in strategic planning and in other system analysis areas as well.

SUMMARY OF THE INVENTION

The present invention provides a computer-based method and apparatus to generate projection values for defined variables by applying, in parallel, multiple reasoning methods. The present invention provides a method and apparatus for creating a realistic model of an enterprise, including its production processes and market environment. That representation of the enterprise is contained in a frame-based enterprise model, which is stored in a knowledge base. The enterprise model represents various facts about the structure of the firm, such as flow relationships, causal relationships, compositional relationships, productivity relationships, proportionality relationships as well as opinions, goals and plans. Through the model building method of the present invention, a user can declare and instantiate new objects representing such entities in a knowledge base, assign attributes and values to those objects, and connect those objects to other objects through the set of available relationships. Other model building activities relate to the decomposition of an object by a decomposition rule.

In the specification of objects for the enterprise model, the present invention provides for a categorization hierarchy of objects. Objects are classified by data type, such as historical data, variables, program data or plans, opinions or goals. The categorization hierarchy facilitates the use of feature inheritance in declaring objects, whereby attributes can be declared about general classes of objects and these attributes can be inherited to the specific members of the class. The inheritance mechanism of the underlying representational medium, as well as the power of decomposition, allow for very efficient model building.

The explicit representation of reasoning methods in a model is a significant aspect of the present invention which provides a basis for applying different assumptions concerning model structure and differing reasoning methods simultaneously within the one strategy support system.

With the enterprise model, the present invention provides a method and apparatus for performing variable projections by applying multiple reasoning methods. In the exemplary embodiment, a set of reasoning methods has been provided to illustrate the use of the architecture in a strategic planning domain. These include methods such as reasoning from history, using structural relationships (for either aggregation or disaggregation), and using productivity relationships.

Applying the differing methods gives rise to the need for reconciliation. The system must choose between competing evidence based on its plausibility. Plausibility is measured in multiple dimensions such as degree of truth, degree of causality, detail, estimated quality, recency, etc. Applying the multiple reasoning methods in parallel poses significant challenges regarding the control of inference. The present invention provides a process for solving a projection problem in a manner that can be looked upon as the construction of an argument that supports a particular final result. The system is aware of which evidence it has adopted and why, and documents it. It also documents those reasoning methods and conclusions that it has decided to ignore. The explicit representation of reasoning methods, reconciliation rules, intermediate hypotheses, final hypotheses, problems, sub-problems and their interconnections are the tools that are used to make the system aware of its own reasoning processes. Such awareness also facilitates explanation of the solution path created.

The control strategy of the present invention is model-based, and it is the structure of the model that guides the system on its path towards a solution. The process starts when the user asks the system to solve a problem. The typical question is to determine the behavior of a variable in the future. Various reasoning methods and reconciliation rules are used to generate solutions to the problems posed to the system. Sometimes in applying reasoning methods, the system attempts to reason in two directions over relationships in the enterprise model. When given a problem, the architecture applies combinations of these reasoning methods to the problem at hand. The application of some reasoning methods may generate sub-problems. For instance, in determining headcount through a productivity method, it is necessary that the system determines what the output will be and the productivity that relates headcount to output. In this manner, many sub-problems are generated. The application of a reasoning method to a sub-problem will, if it succeeds in solving the sub-problem, generate an intermediate hypothesis. These intermediate hypotheses for each sub-problem are then reconciled. In this manner, a final hypothesis for each sub-problem is produced. The system behavior is primarily driven by the structure of the knowledge base. The configuration of relationships in the enterprise model determines which reasoning methods are applicable to any given object under consideration. The reconciliation rules prune the search tree by eliminating inferior hypotheses.

The system maintains a dependency list among hypotheses (both intermediate and final) and the premises which generated them. This is done by creating relationships from the new hypothesis created after the successful execution of a reasoning method. The new hypothesis contains information concerning the characteristics of the reasoning method that generated it, as well as the premises to which that reasoning method was applied. Moreover, the hypothesis is linked to the sub-network of all sub-problems solved by the reasoning method. The information contained in the sub-network is also used in creating this new hypothesis. The propagation of hypothesis characteristics, through the solution space, ensures that the choice of which intermediate hypothesis to choose during reconciliation is much more than a simple choice amongst competing methods. The nature of the tree of premises and methods that underlies the hypothesis is also represented in the multiple attributes of the hypothesis itself.

The problem and sub-problem relationships that are generated by the system represent the structure of the argument supporting the choice of a final hypothesis. This problem tree is constructed as the search for a solution proceeds. The problem tree is connected with the enterprise model as well as with the network of hypotheses produced. The process of constructing the problem tree is complicated by the fact that it is possible to reason in both directions over most relationships between objects in the knowledge base.

Through the construction of this problem tree and the application and selective pruning of reasoning methods, the system decides in what manner to use the information available in the knowledge base. This architecture enables the system to be self-structuring, and enables the system to deal either with partial models of incomplete information or with situations when conflicting information appears in the knowledge base. In this manner, diverse and inconsistent knowledge such as budgets, plans, expectations, causal models and historical knowledge, can be integrated and interpreted within a single architecture. The ability to reason in either direction over declarative relations in the knowledge base is also important in achieving consistency between the various levels of plans produced in the hierarchies of organizations. Thus, the present invention represents a substantial improvement over the strategic planning tools that are currently available. Moreover, the method and apparatus of the present invention has a wide range of uses outside the domain of strategic planning. Wherever multiple analytical methods can be applied to a system to evaluate a component of the system, the present invention can be used.

BRIEF DESCRIPTION OF THE DRAWINGS AND APPENDICES

Figure 5A:
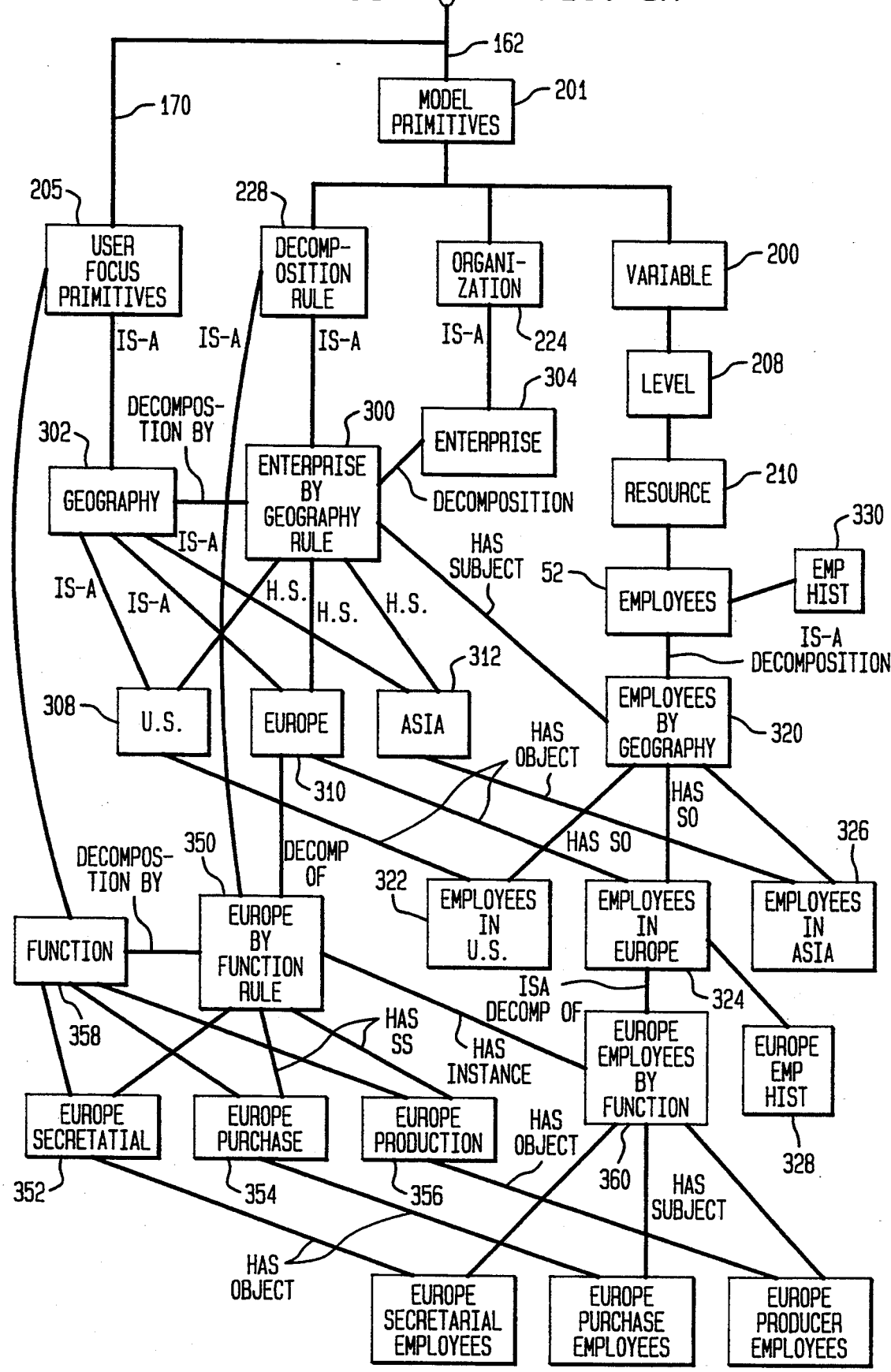
Figure 5B:
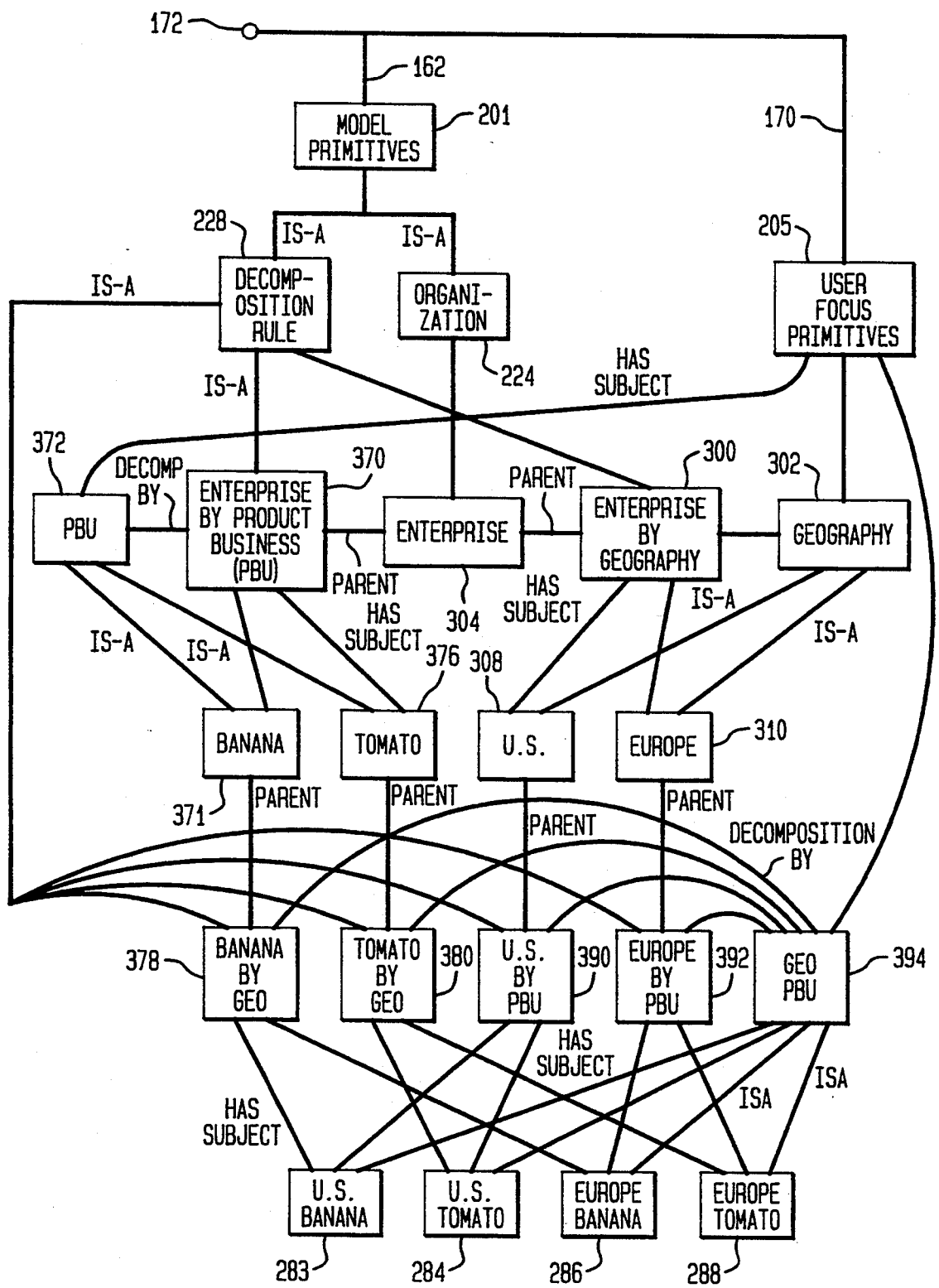
Figure 5C:
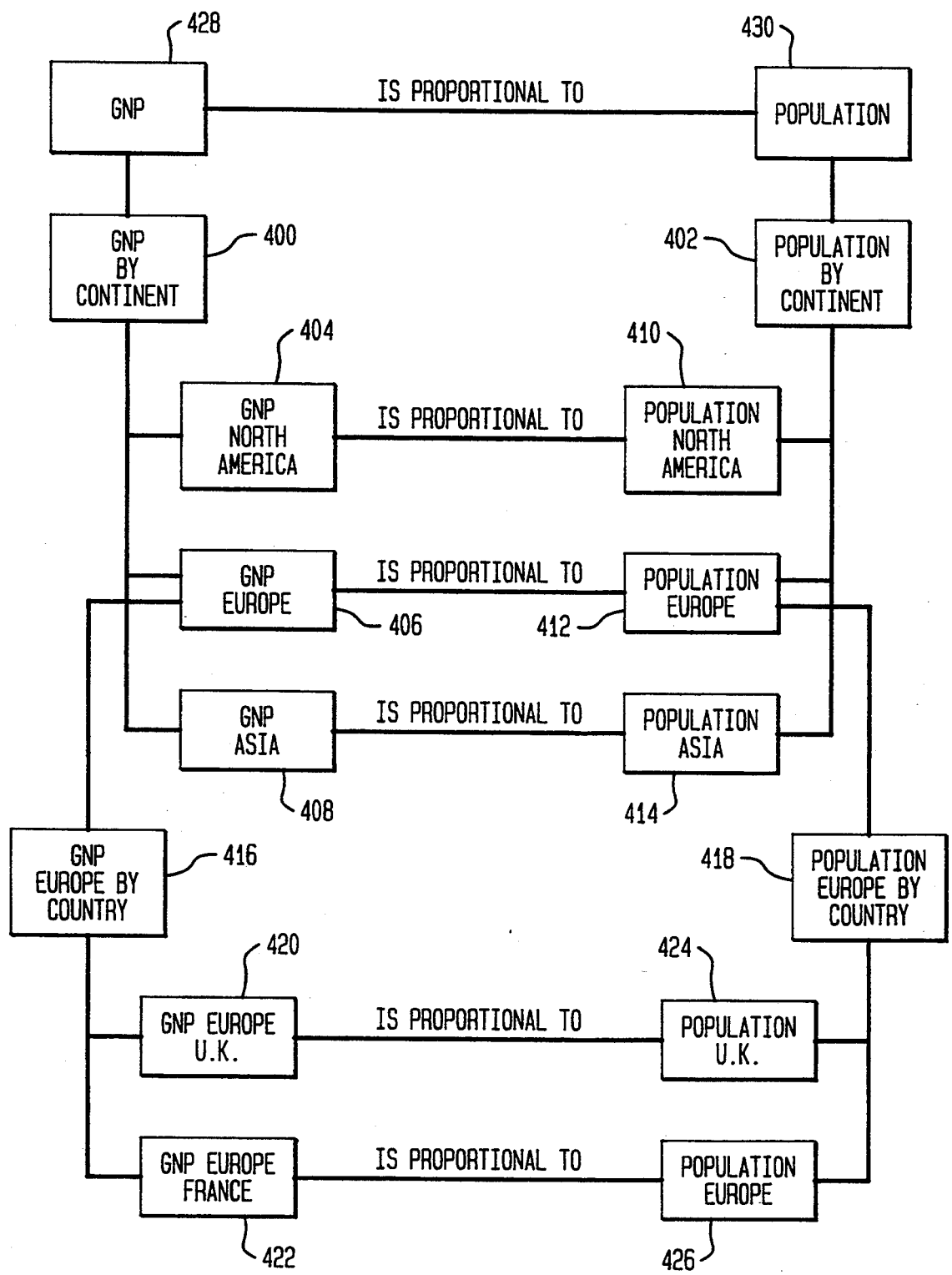
Figure 6D:
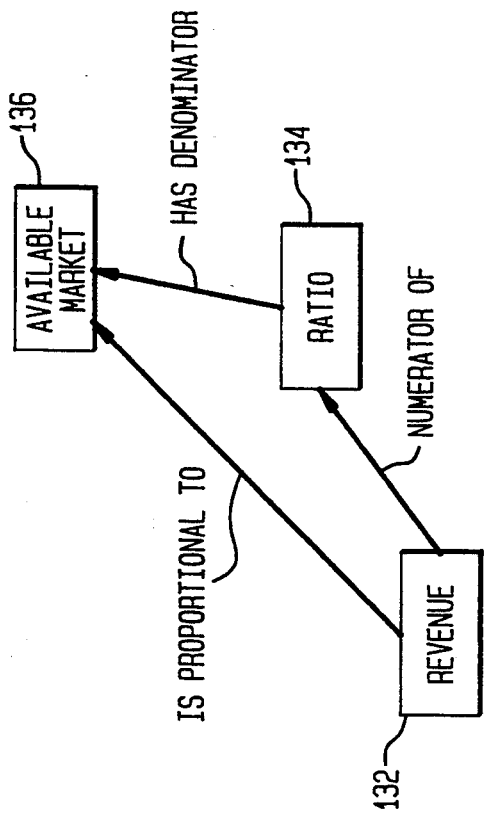
Figure 6C:
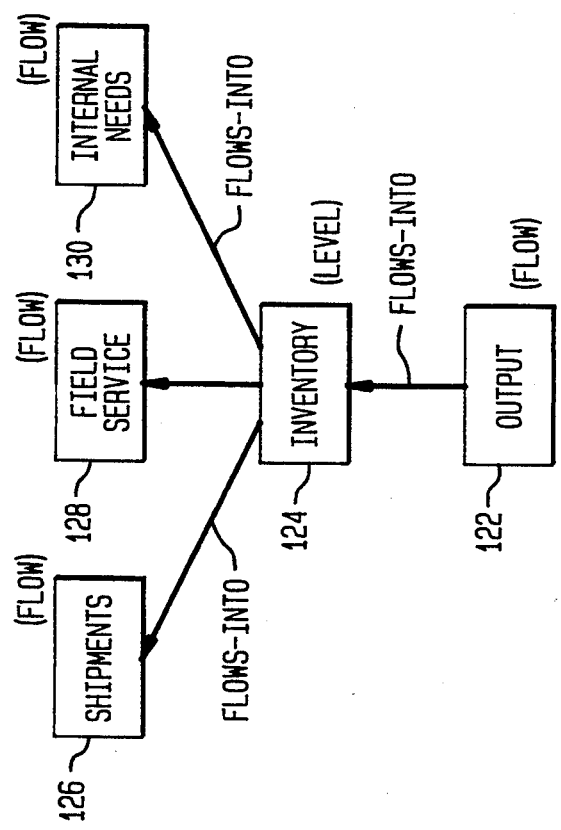
Figure 6E:
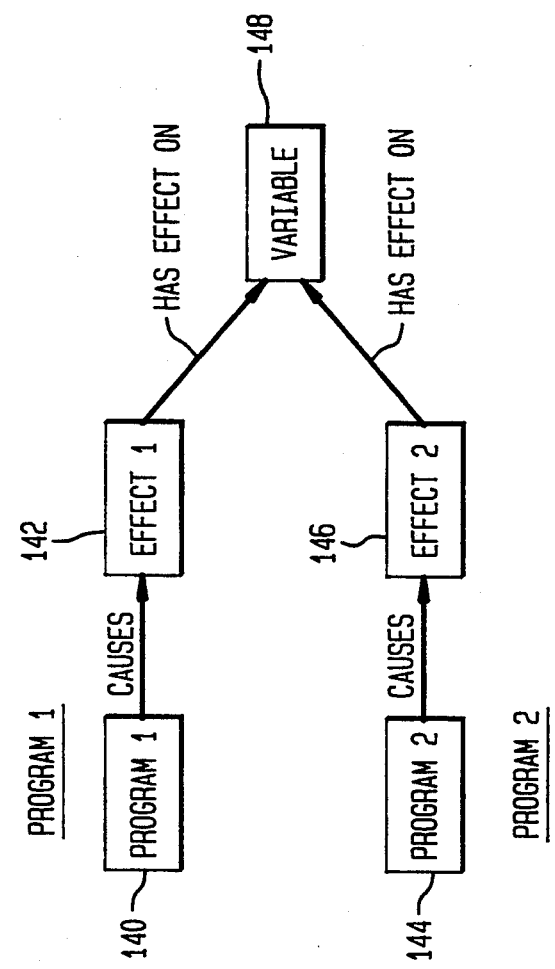
Figure 7:
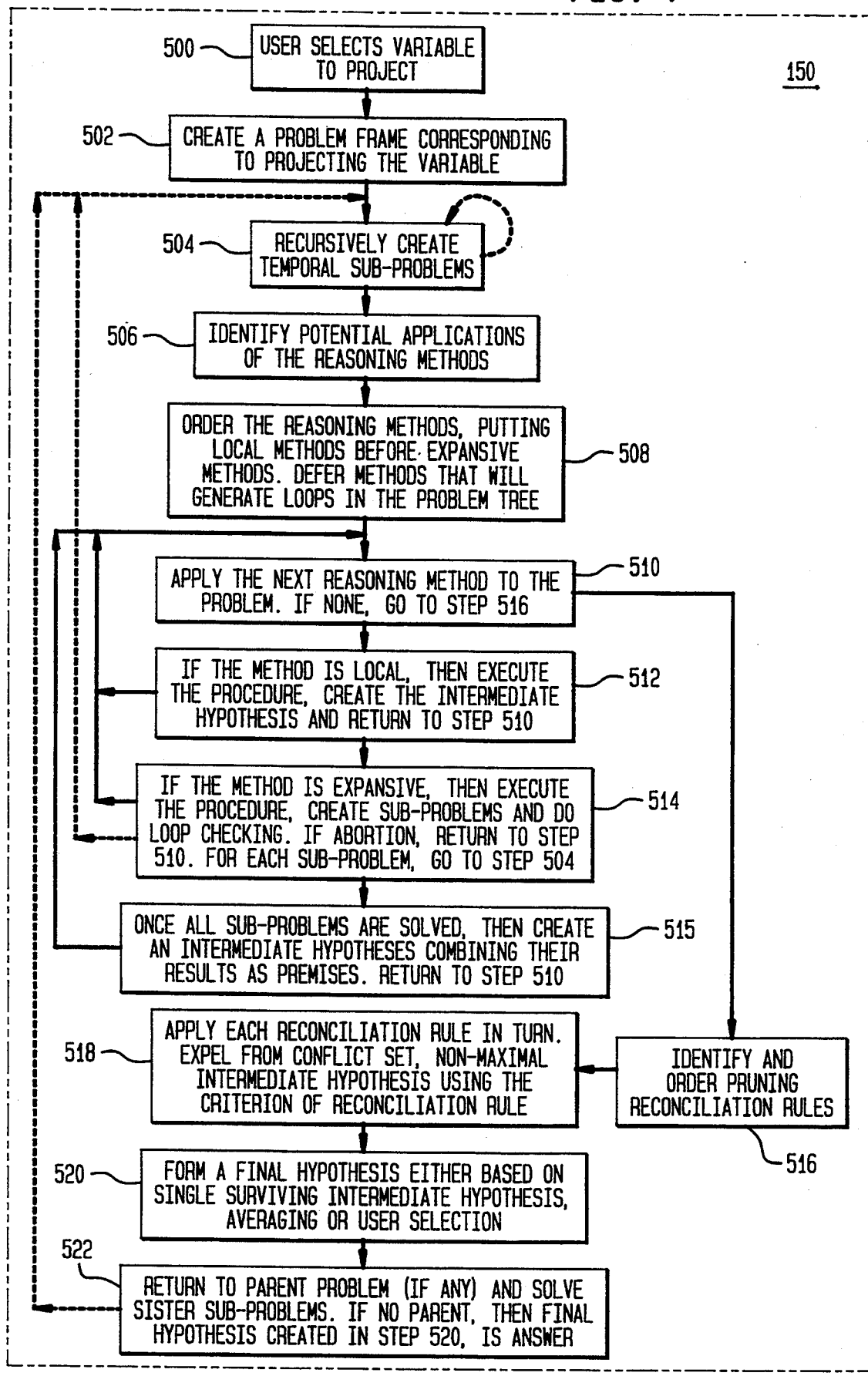
Figure 8A:
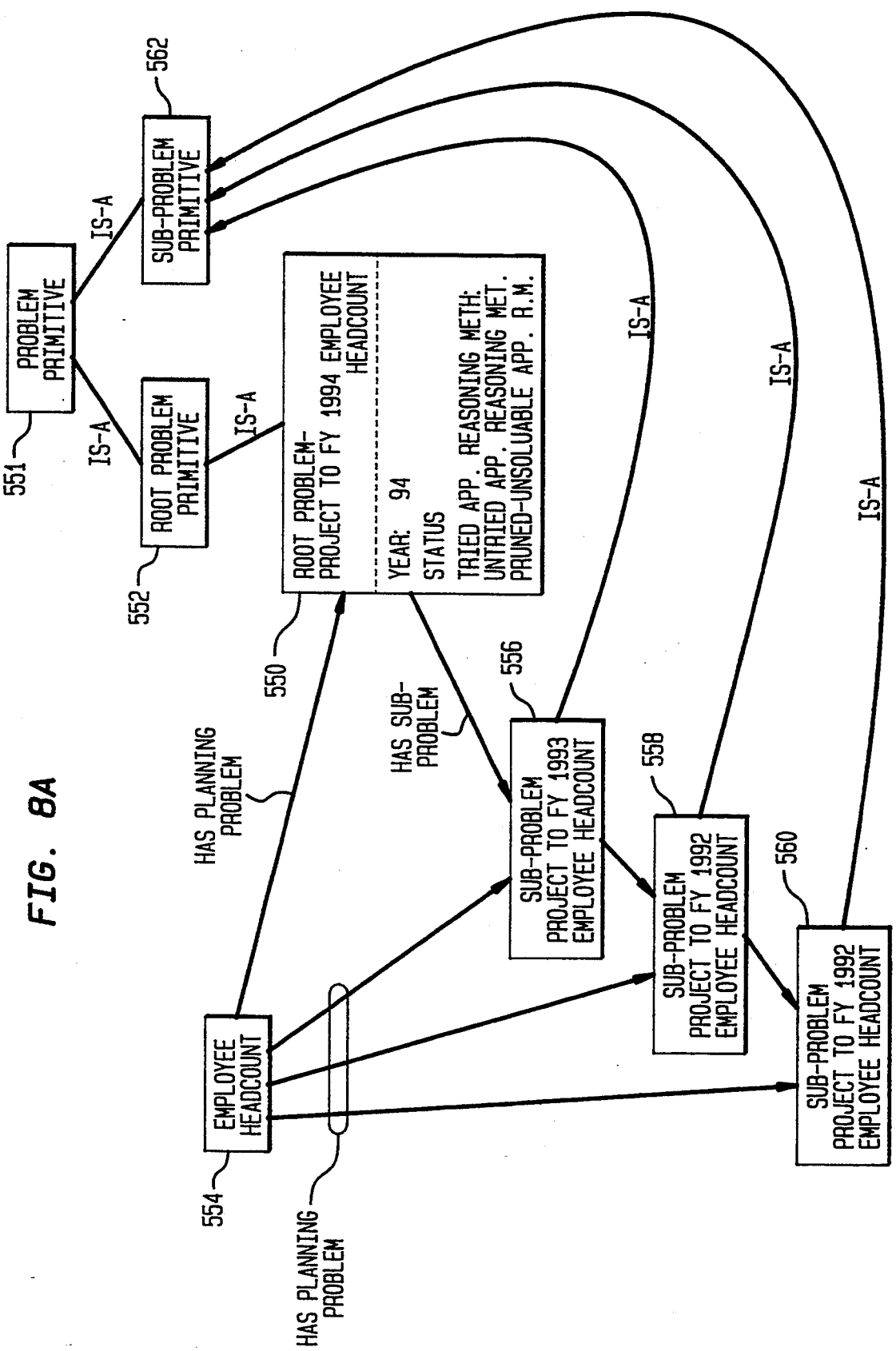
Figure 8B:
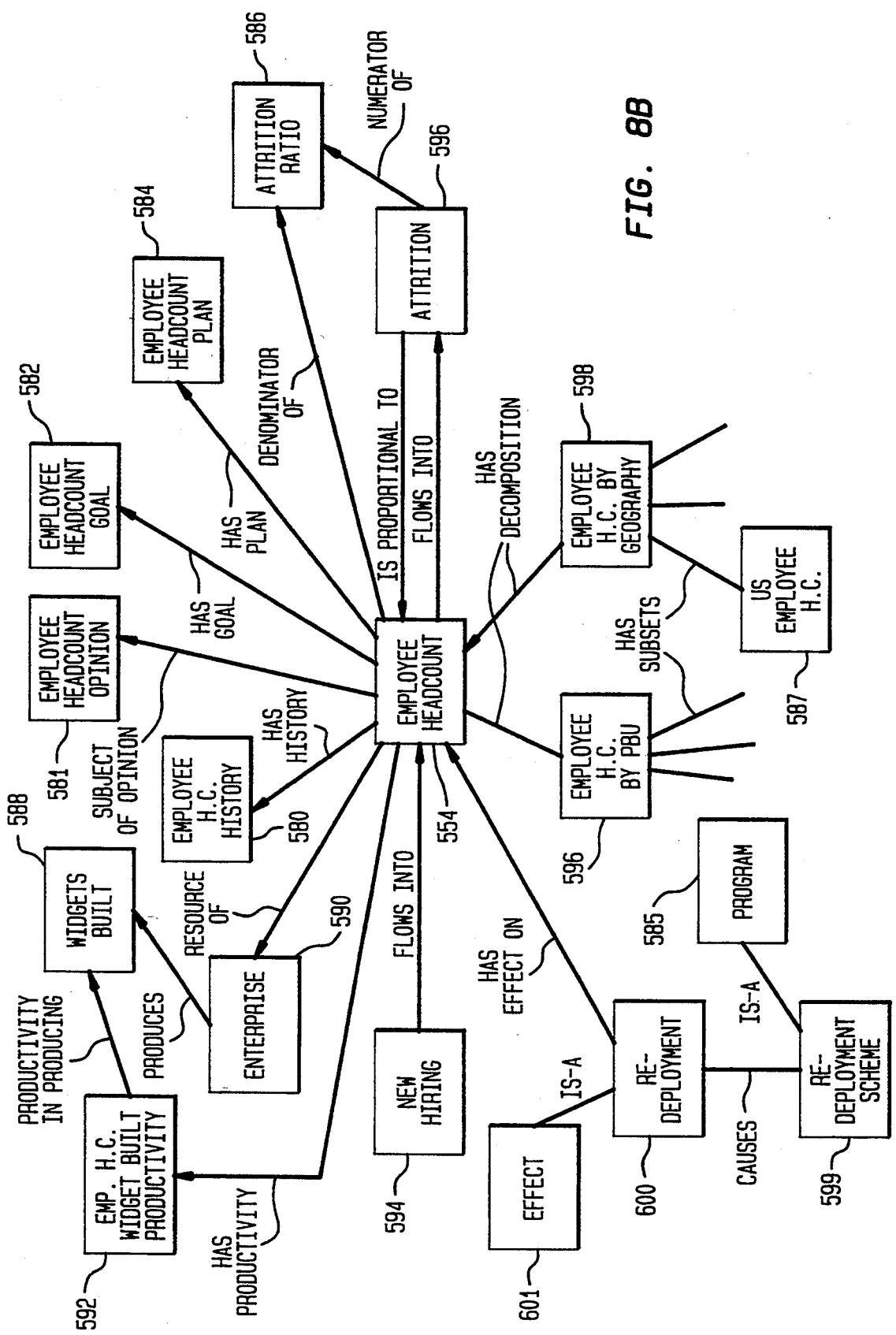
Figure 8C:
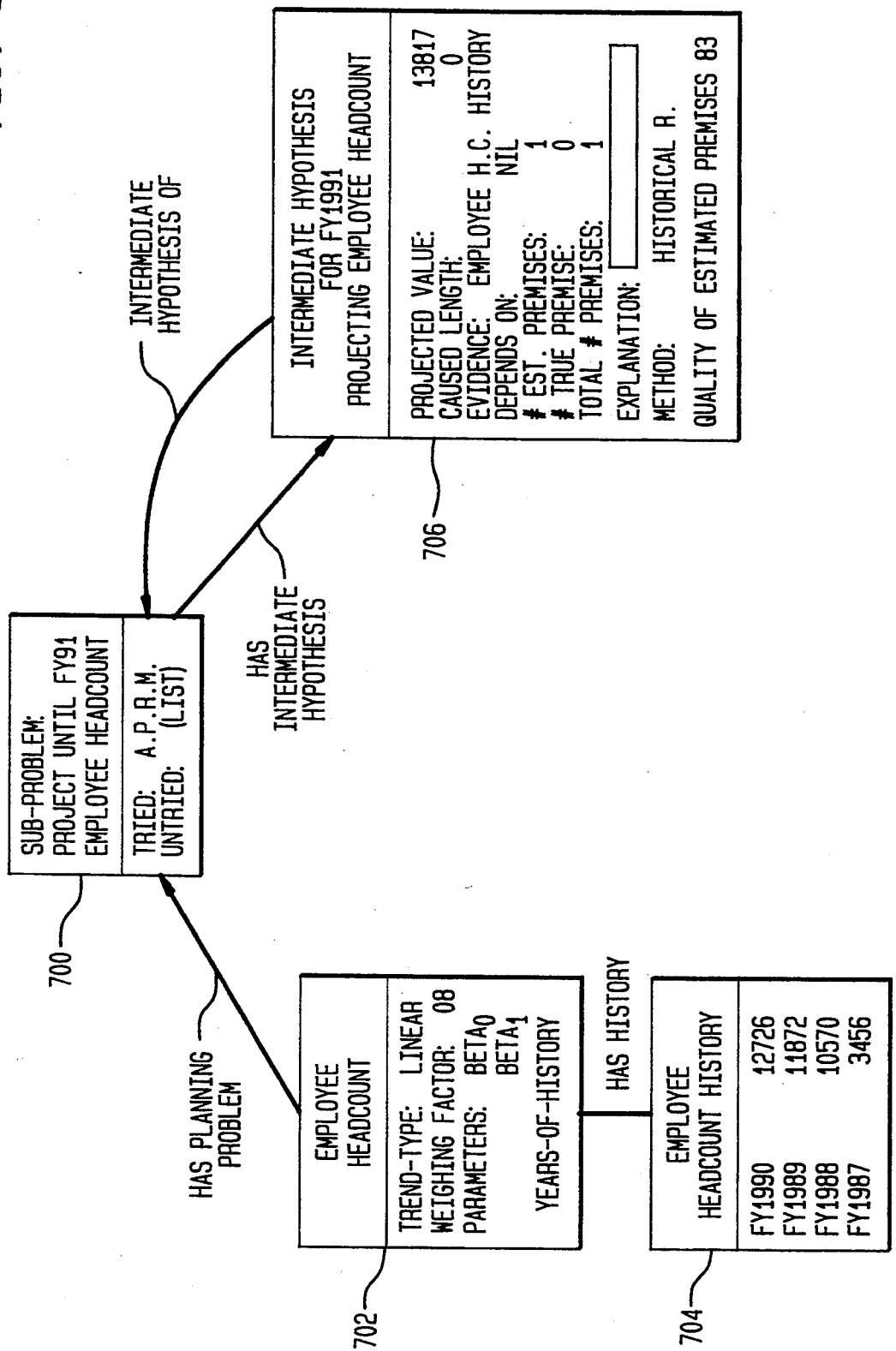
Figure 8D:
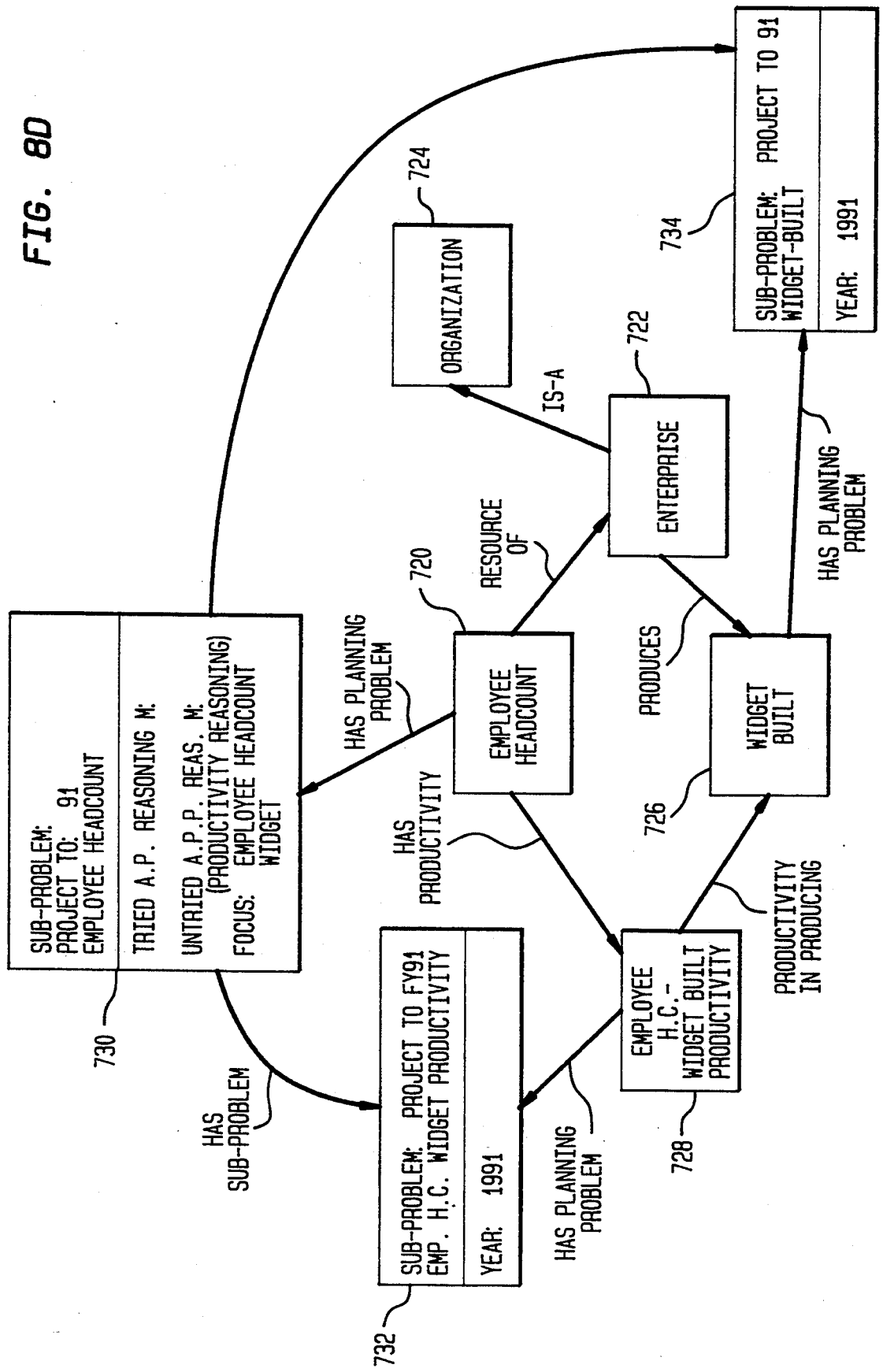
Figure 8E:
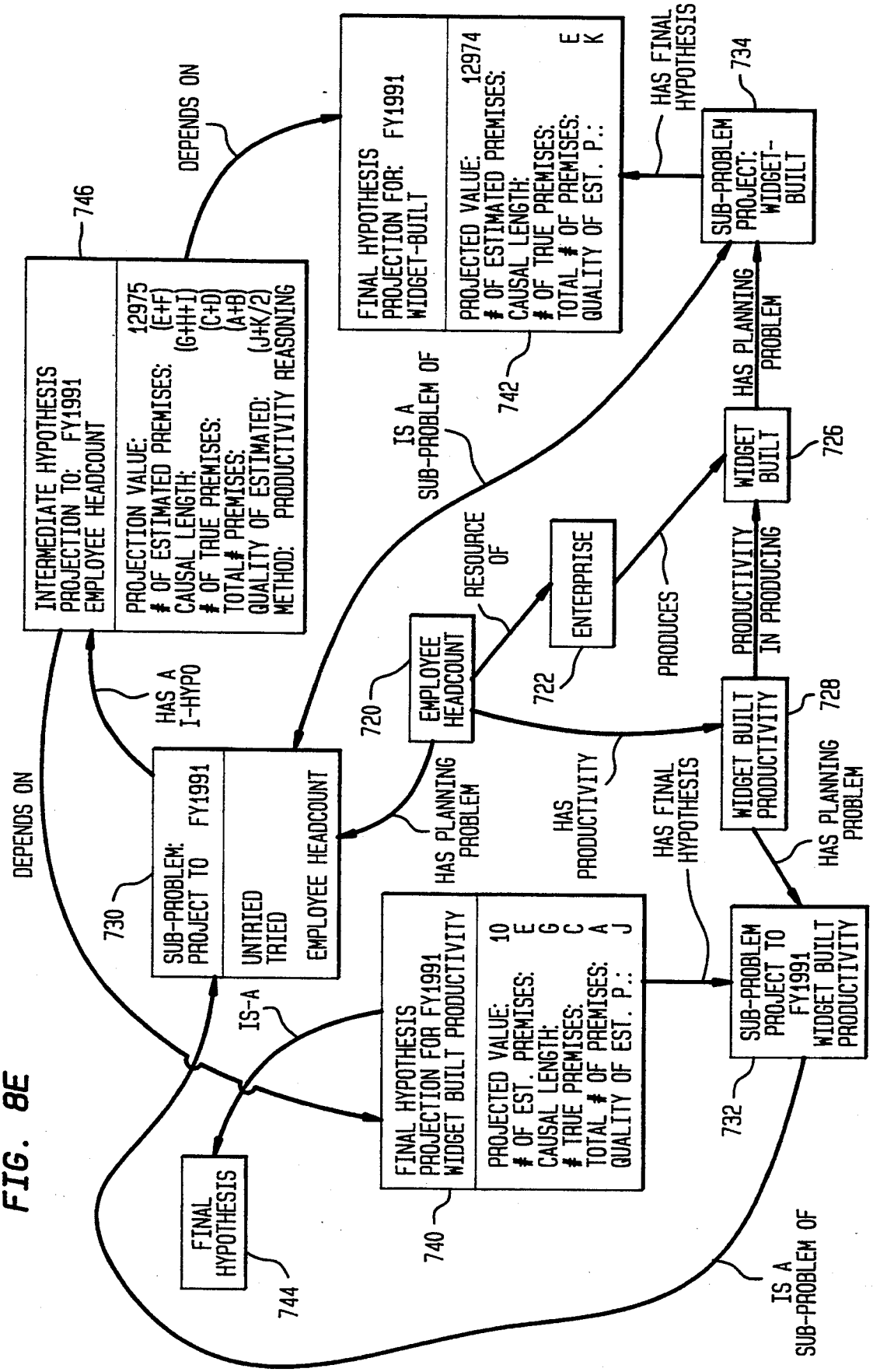
Figure 8F:
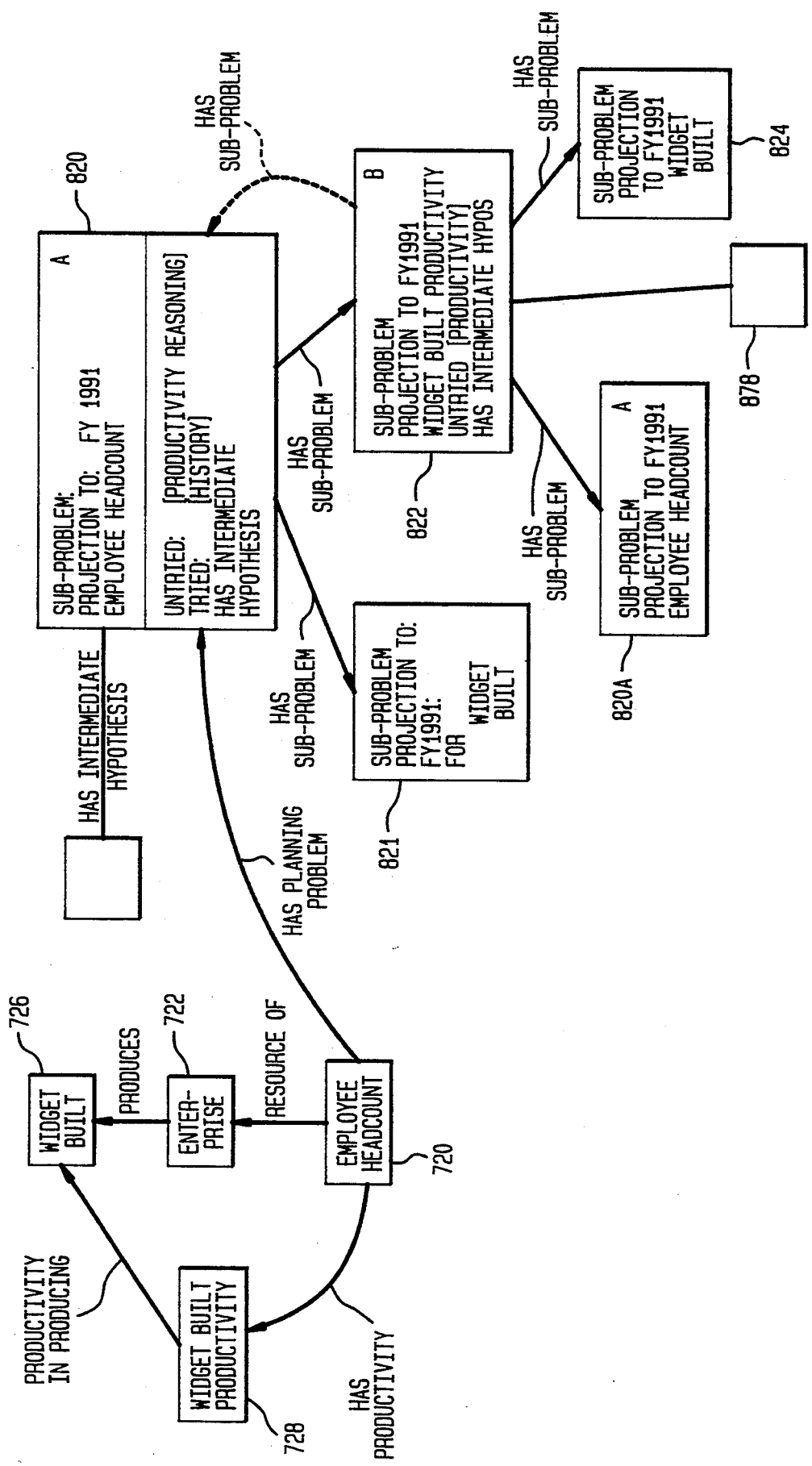
Figure 8G:
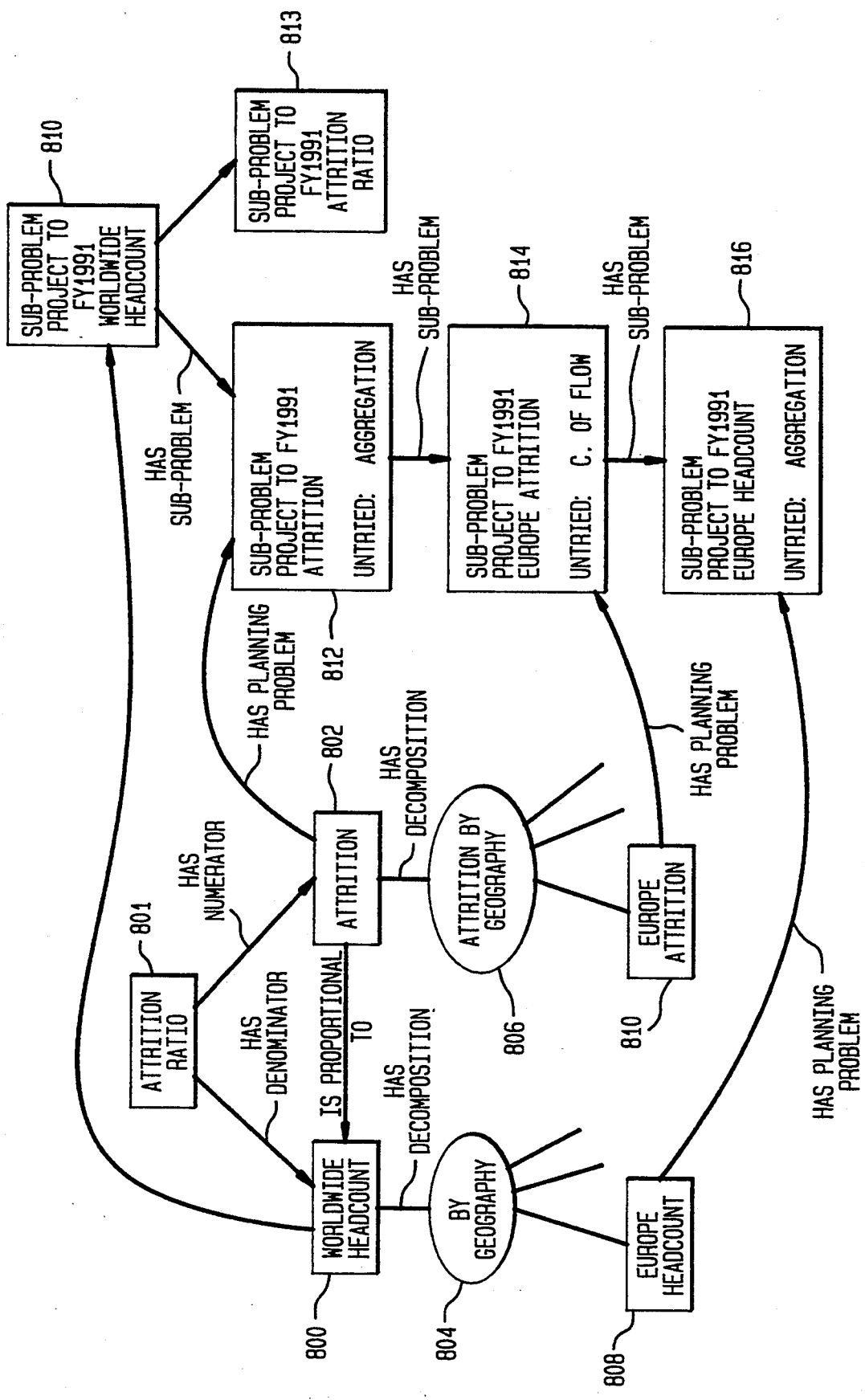
Figure 8H:
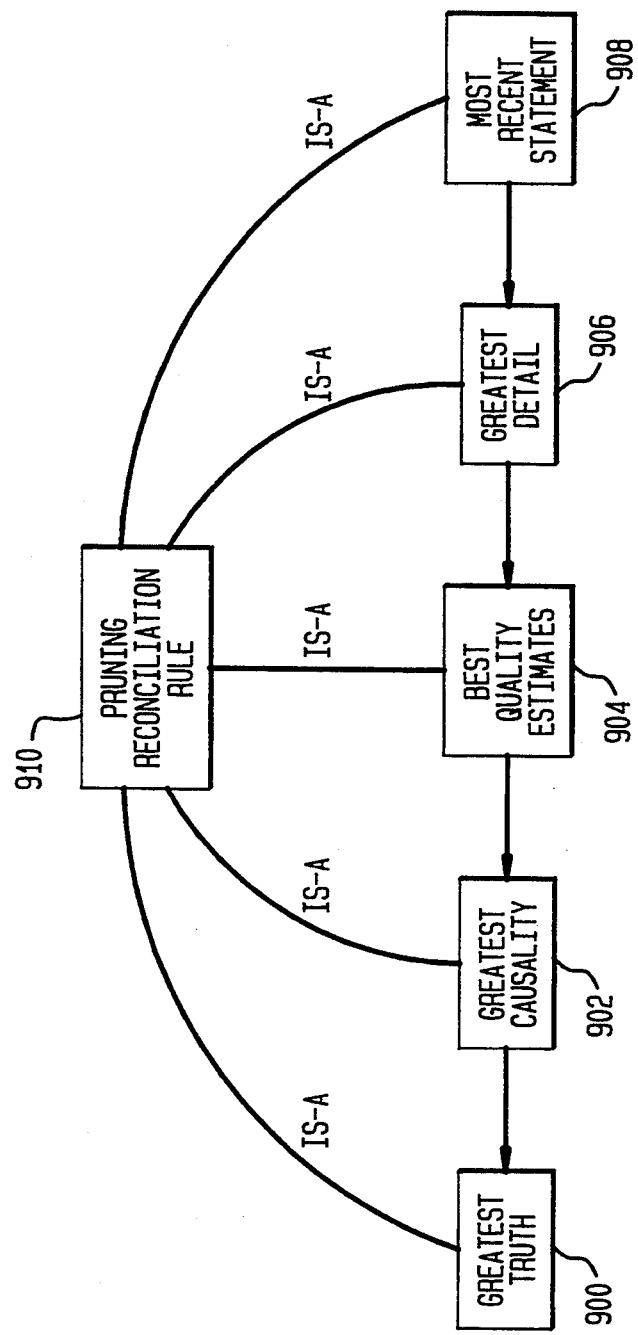
Figure 8I:
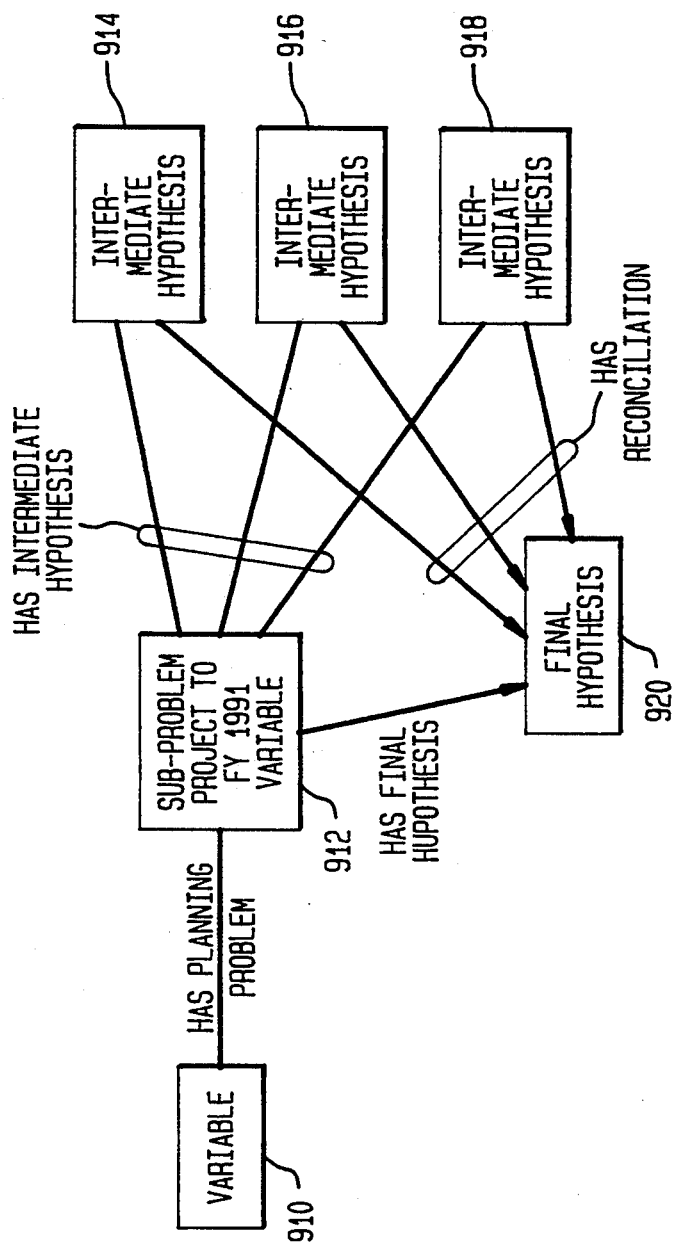

FIG. 5A Diagrams the object/relationship structures for exemplary single and layered decompositions of a variable, according to the present invention;

FIG. 5B Diagrams the object/relationship structures for an exemplary cross decomposition of two decomposition rules according to the present invention;

FIG. 5C Diagrams the object/relationship structures as a relationship is inherited through two decomposition layers according to the present invention;

FIG. 6A Depicts an exemplary applicability conditions template for the historical trend analysis reasoning method according to the present invention;

FIG. 6B Depicts an exemplary applicability condition template for the productivity reasoning method according to the present invention;

FIG. 6C Depicts an exemplary applicability condition template for the conservation of flow reasoning method according to the present invention;

FIG. 6D Depicts an exemplary applicability condition template for the proportionality reasoning method according to the present invention;

FIG. 6E Depicts an exemplary applicability condition template for the causality reasoning method according to the present invention;

FIG. 7 Depicts an overview of the process flow of the control module of the present invention;

FIG. 8A Diagrams the object/relationship structuring that occurs during the creation of a root problem object and during temporal decomposition of a root problem object, according to the present invention;

FIG. 8B Depicts an exemplary variable object and its related objects as considered by the control module in generating a list of applicable reasoning methods;

FIG. 8C Diagrams an exemplary object/relationship structuring that occurs as a local reasoning method is applied according to the present invention;

FIG. 8D Diagrams an exemplary object/relationship structuring that occurs as an expansive reasoning method is first applied to a variable;

FIG. 8E Diagrams an exemplary object/relationship structuring that occurs as the sub-problems generated return with final hypotheses according to the present invention;

FIG. 8F Diagrams an exemplary object/relationship structuring that occurs during a short circuit check according to the present invention;

FIG. 8G Diagrams an exemplary object/relationship structuring that occurs during a long loop check according to the present invention;

FIG. 8H Diagrams an exemplary order of precedence of exemplary reconciliation rule objects according to the present invention; and FIG. 8I Diagrams an exemplary subproblem and intermediate hypothesis configuration during the reconciliation process according to the present invention.

APPENDIX I Provides a listing of the exemplary two-way relationship definitions used in the present invention;

DETAILED DESCRIPTION

System Architecture Overview

Figure 1:
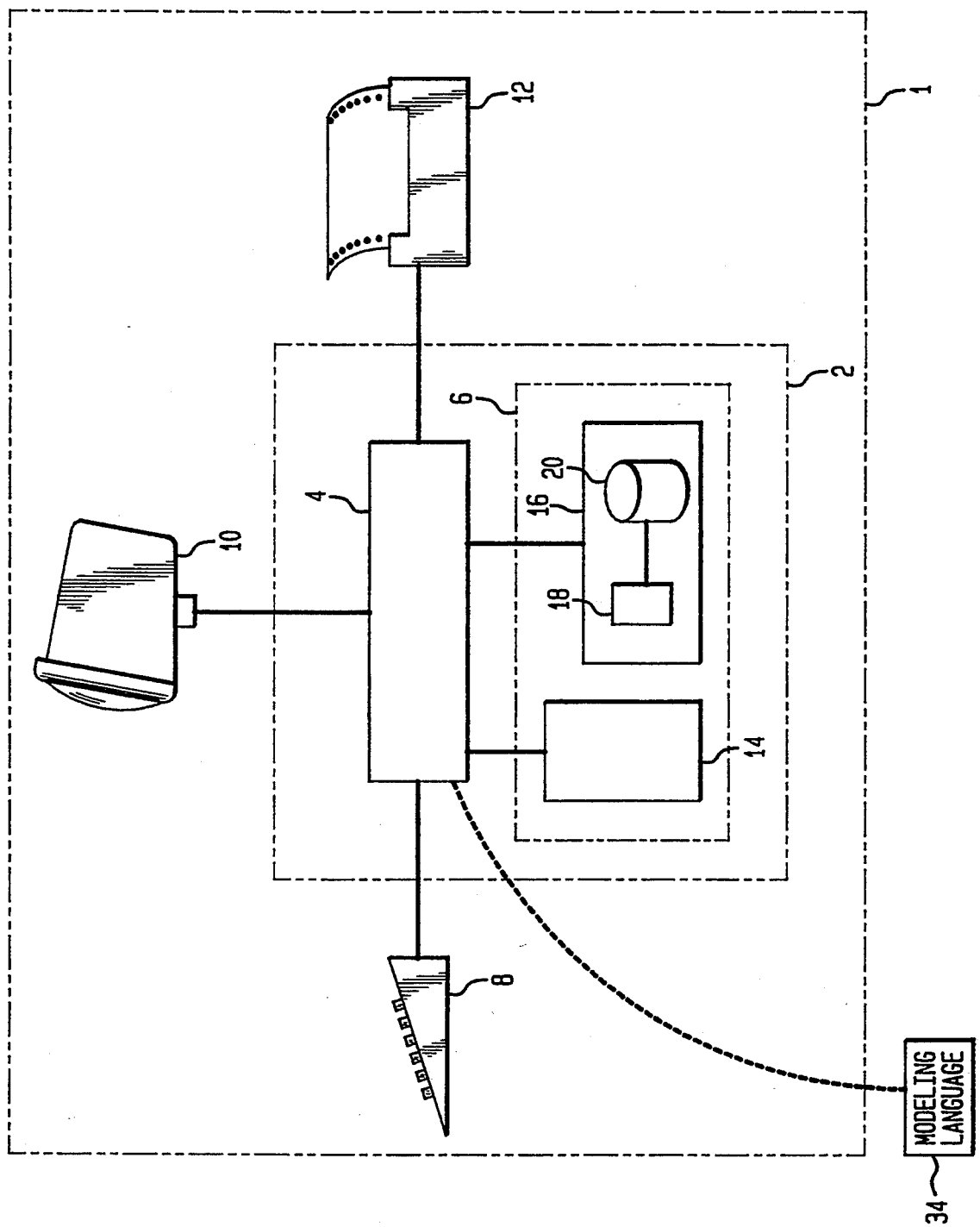
FIG. 1 Depicts an exemplary overview of the computer hardware component configuration of the present invention.

Referring to FIG. 1, the knowledge-based variable projection system of the present invention can be implemented in an exemplary computer hardware configuration 1, using a computer 2 that comprises a processor 4 (configured to accept input, perform processing functions and output results) coupled to a memory 6 and capable of accessing and storing data in that memory 6. An input device 8, such as a keyboard, is coupled to the processor 4. Output devices, such as a cathode-ray tube display device 10 and a printer 12, are also coupled to the processor 4. The processor 4 interfaces with each device 6, 8, 10, and 12 in gathering and outputting data through a plurality of input/output modules 14. In an exemplary embodiment, the present invention can be implemented using a workstation in the VAXstation 3500 family of workstations manufactured by Digital Equipment Corporation of Maynard, Mass. That computer can be configured to operate using the DECwindows graphical user interface marketed by Digital Equipment Corporation. For more information on the VAXstation family of workstations and the DECwindows graphical user interface, the reader is referred to "Digital Equipment Corporation Workstation Family Technical Summary", October 1990: Document Order No. EC-H0742-51, which is expressly incorporated herein by reference.

In FIG. 1, a strategic planning system subspace 16 in the memory 6 contains a set of computer program modules 18 and a knowledge base 20 that provide instructions and information to permit the processor 4 to perform the functions of the present invention. The computer program modules 18 stored in the strategic planning system subspace 16 comprise computer executable code that is accessed by the processor 4 and enables it to perform the functions of variable projection, by accessing and manipulating the information in the knowledge base 20. As will be discussed in detail below, the knowledge base 20 comprises a network of type characterized data objects, which can be accessed by the processor 4 using the computer program modules 18.

Enterprise Information Modeling

All information used by the system is maintained as a set of hierarchically characterized objects, with a network of relationships interconnecting these objects by way of two-way relations. Information concerning an enterprise and its surrounding environment is modeled in the present invention, according to a method for characterizing information by type and networking the characterized information by relationships. This method of modeling, allows planning managers to accurately model the factors which affect the enterprise. Using the system of the present invention, the relationships and dependencies of any process of projection can be accurately and realistically modeled.

Figure 2A:
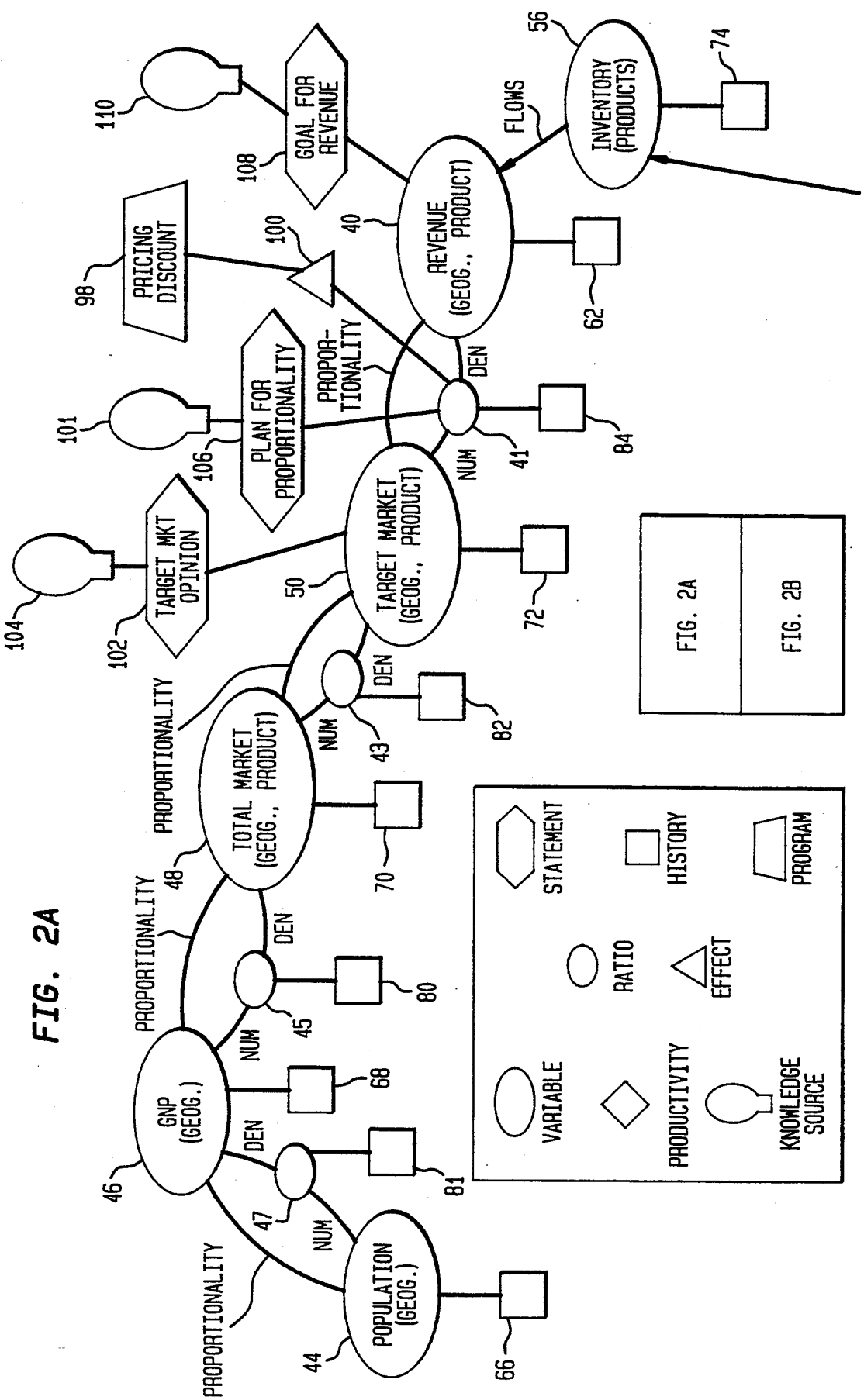
FIG. 2A Depicts an exemplary fragment of an enterprise model diagram constructed according to the present invention.
Figure 2B:
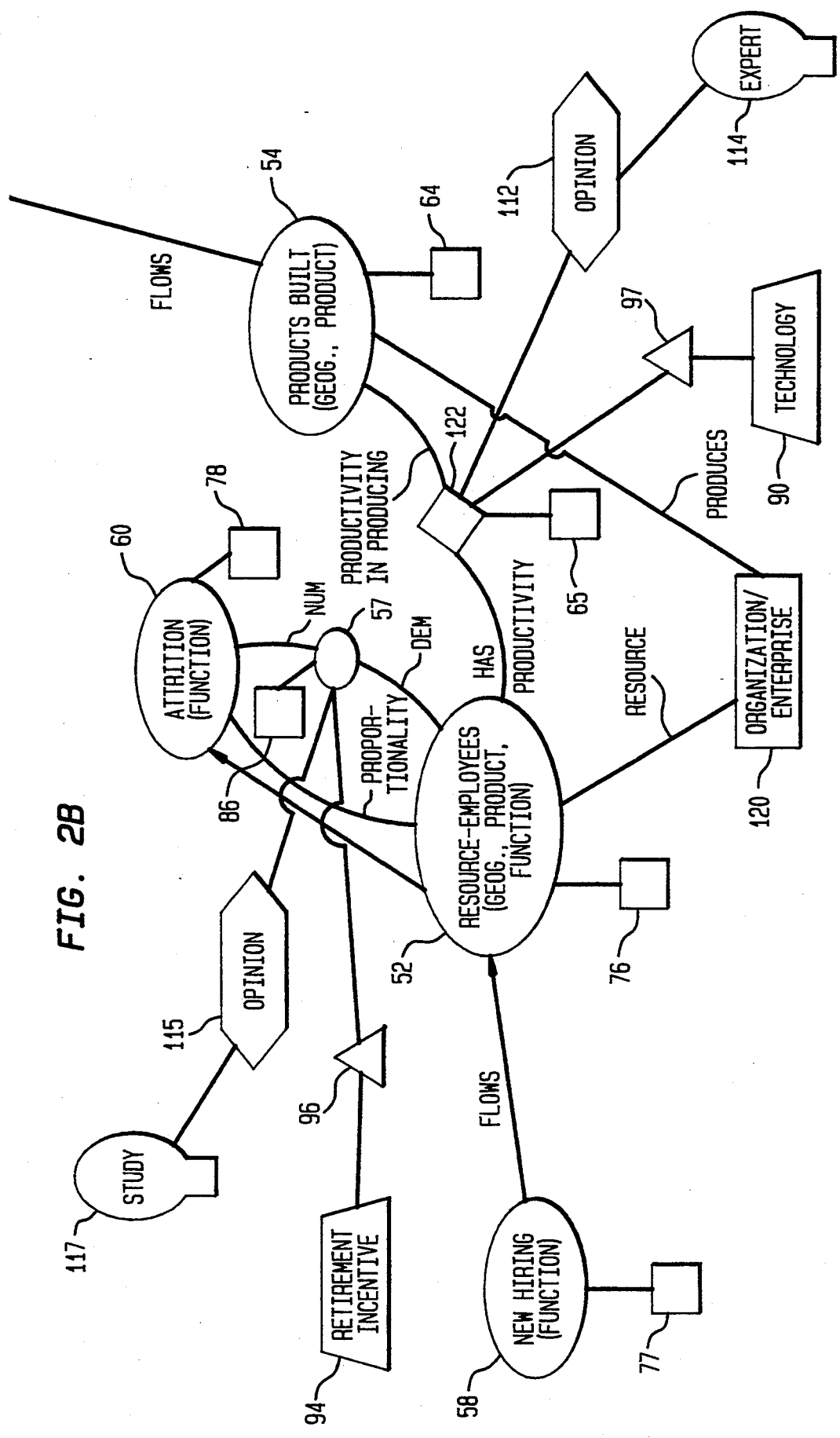
FIG. 2B Depicts an exemplary fragment of an enterprise model diagram constructed according to the present invention.

FIG. 2 depicts a fragment of a planning process, which diagrams, according to the method of the present invention, typical factors that a planner might consider in forming a projection. Suppose a planning manager wanted to determine how much revenue the enterprise would generate three years from now. The factors that he or she might consider could be:

What will the aggregate market be in terms of size and geography?

Which products can the enterprise build with existing process capability?

How competitive are the firm's products in the same market?

What special programs are underway to modify productivity, capability or capacity?

What is the required amount of resources to build the products?

What geographic constraints exist around the location of facilities?

What are the current resources?

The projection for the enterprise's revenue (as well as price, etc.) depends on the values of other factors, such as market share and market size. A complex system of interrelated variables can model the chain of factors on which the revenue projection depends. In creating such a model, revenue value projection and the factors on which it depends are represented as variables. A variable is any identifiable factor concerning an enterprise that has a value which typically changes over time. An enterprise's revenues certainly fluctuate over time.

In FIG. 2, the oval-shaped objects represent variables within an enterprise system. In the exemplary embodiment, specifications of each variable are contained in an object. The connections between the variables describe the relationships that are found in the enterprise. There are classes of relationships that bind these objects together. For example, a FLOW relationship describes enterprise reality as products are built, become inventory and are sold to become revenue. In FIG. 2, a products built variable 54 is connected by a FLOW relationship in the direction of an inventory variable 56. The implication of the two-directional FLOW relationship is that products built flow into inventory, and that inventory flows from the products that are built. The inventory variable 56 is also connected by a FLOW relationship in the direction of a revenue variable 40. As products are sold, inventory then flows into revenue. The inverse is that revenue flows from inventory.

A FLOW relationship can connect any two variables. A "principle of conservation of flow" applies to the flow sub-network specified by a set of flow relationships between a set of variables. The principle of conservation of flow is that the flow cannot be created or destroyed within flow networks. All intermediate variables in a network of variables connected by flow relationships conform to this principle.

There is also a categorization of variables into flow and level categories that is used to determine how the values of one variable influence another in a FLOW relationship. The conservation of flow principle is applied differently between flows and levels. A level value can accumulate, which means that a value for a level variable is calculated by considering its initial level, adding in the values of flow variables which flowed into it, and deducting the values of flow variables which flowed out of it. Flow variables allow for no accumulation, and a value is determined merely by inflows or outflows.

A PROPORTIONALITY relationship marks an association where one variable may bear some proportionality to another, without any implication of a causal relationship. For example, revenue earned has a PROPORTIONALITY relationship to its target market. In FIG. 2, the revenue variable 40 is associated with a target market variable 50, using a set of relationships to model this relationship. First, a two-way PROPORTIONALITY relationship (indicated by the arched line) exists between the revenue variable 40 and the target market variable 50 (i.e. revenue is proportional to target market and target market is proportional to revenue). To provide a way to capture the nature of the proportionality relationships, which is expressed as a ratio, the present invention provides a ratio variable 41 that is linked to the revenue variable 40 and the target market variable 50 by two relationships: an IS A NUMERATOR OF relationship and an IS A DENOMINATOR OF relationship. Those relationships are both two-way relationships. The target market variable 50 is a numerator of the ratio variable 41 and the ratio variable 41 has a numerator (i.e. the target market variable 50). Also, the ratio variable 41 has a denominator, the revenue variable 40, and that revenue variable 40 is a denominator for the ratio variable 41.

The target market variable 50 is related to other market indicators, and each is connected in the model by PROPORTIONALITY relationships. For example, the target market, as modeled, is linked to the general population in the market areas, the gross national product (GNP) of the region and the total market size. These factors are represented in the enterprise model by a collection of related variables—a population variable 44 is proportionally related to a GNP variable 46, which, in turn, is proportionally related to a total market variable 48. The total market variable 48 is proportionally related to the target market variable 50. Those variables reflect a chain of related variables that describe the target market variable 50 and its relationship to the revenue variable 40.

Additionally, the attrition rate of the labor pool is proportionally related to the number of employees. This is represented by an attrition variable 60 connected by a PROPORTIONALITY relationship to a resource-employees variable 52.

Each PROPORTIONALITY relationship is modeled using a direct two-way relationship between the proportional variables and a linked ratio variable to describe the proportionality. Between the GNP variable 46 and the population variable 44, there is a GNP-population ratio variable 47. Between the GNP variable 46 and the total market variable 48, there is a GNP-total market ratio variable 45. Between the total market variable 48 and the target market variable 50, there is a total-target ratio variable 43. In addition, between the resource-employees variable 52 and the attrition variable 60, there is a employees-attrition ratio variable 57.

Another set of factors that would affect an enterprise's revenue concerns the amount of product that flows into the market. In FIG. 2, the model fragment shows that the inventory level will fluctuate depending on the differential rates of sales and products built.

Employees of an enterprise produce its products. Accordingly, the resource-employees variable 52 is connected to an organization/enterprise object 120 containing information on the organization. The two-direction RESOURCE relationship indicates that employees are a resource of the enterprise and that the enterprise has a resource in its employees. Moreover, the enterprise object 120 is linked to the products it produces by a two-way PRODUCES relationship. In FIG. 2, the products-built object 54 is related to the enterprise object 120 indicating that the enterprise produces the built products and the products are produced by the enterprise.

To quantify the production relationships between employees and the products they produce, the present invention provides a fourth type of variable, a productivity variable, which measures productivity. This is a simple ratio of the output variable to the resource variable. It is categorized separately from general ratios so that its causal nature is easily identified. In FIG. 2, a employee-product productivity variable 122 is connected between the two variables 52, 54. Between the resource variable (resource-employees 52) and the productivity variable 122, there is a two-way HAS-PRODUCTIVITY relationship indicating that employees have an associated productivity and that the productivity variable is a productivity measurement for the employees. Between the productivity variable 122 and the products built variable 54, a PRODUCTIVITY IN PRODUCING relationship indicates that the output variable (products built) is produced with productivity of the employees, and that the productivity variable is a production measurement for the products built. This set of relationships between the resource-employees variable 52, the products-built variable 54, the productivity variable 122, and the organization object 120 together form a collective productivity relationship configuration. A productivity relationship is similar to the proportionality relationship, already mentioned, but it also indicates a causal dimension, not found in the proportionality relationship.

As newly hired employees are trained, they become part of the workforce until they are fired or quit. This set of relationships is modeled by a new hiring variable 58, that is connected to the resource-employees variable 52 by a FLOW relationship, the resource-employees variable 52 being connected by another FLOW relationship to an attrition variable 60. In FIG. 2, notice that the resource-employees variable 52 has an association with the attrition variable also described by a PROPORTIONALITY relationship, in addition to the FLOW relationship. Thus, in the present system, multiple relationships can describe the association between variables.

According to the method of the present invention, a user can make projections for any variable modeled. In the example described above, the planning manager wishes to project the revenue variable across a planning horizon of three years. However, in the present invention, any variable can be projected. The projections are based upon data that a planning manager has available for each variable. In the present invention, all the information concerning a variable can be incorporated into the model, using categorized objects and relationships.

Historical values for each variable are generally available and are stored in history objects. History objects are repositories of the past values, if they are known. For example, a revenue history object 62 contains the revenue earnings for the company for the past fifteen years, while a products-built history object 64 contains the yearly totals of products built by the enterprise over the past five years. Whatever historical information a company has for a variable, it can be stored in a history object and associated with the variable, using a two directional HAS HISTORY/HISTORY OF relationship.

In FIG. 2, a population history object 66, a GNP history object 68, a total market history object 70, a target market history object 72, the revenue history object 62, an inventory history object 74, the products built history object 64, a resource employees history object 76, a new hiring history object 77, and an attrition history object 78 all contain past values for the variables to which they are related through the HAS HISTORY/HISTORY OF relationship. In addition, the present invention provides for historical data to be associated with the productivity and ratio variables created through the specification of PRODUCTIVITY and PROPORTIONALITY relationships. For example, the GNP-total market proportionality variable 45, between the GNP variable 46 and the total market variable 48, has associated with it a history object 80 containing past values of the proportionality between GNP and the total market. This is achieved since a variable object is set up to represent the ratio. As a result, historical data on the relationship can be associated with the ratio variable. There is a history object 81, for the GNP-population variable 47, a history object 82, for the total-target proportionality variable 43, as well as a history object 84, associated with the proportionality variable 41 between the target market variable 50 and the revenue variable 40. There is also a history object 86 containing proportionality data associated with the proportionality variable 57 between the resource-employees variables 52 and the attrition variable 60. Further, a productivity history object 65 which contains historical data on the productivity variable 122. Thus, a history object acts as a repository for any historical information concerning any variable.

Another type of data that can be stored pertains to the effects that a given program can have on a variable. In the present invention, a program object and an effect object are used to represent the program (i.e. the cause) and the effect that program has on variable performance through time. For example, an employee incentive program, such as a quality circles program, might influence production. In the present invention, a program object contains relationships to its various effects. Effects objects contain data on how the program was thought to effect variable behavior. For instance, the quality circles might increase production by a percentage factor.

Referring to FIG. 2, a technology program object 90 contains data detailing how the enterprise has sought to upgrade the machinery used by the workers to produce the product. The effect of that program is represented in a technology program effect object 97. As the technology program affects the productivity of the workers, there is a two-way EFFECT relationship between the technology program effect object 97 and the productivity variable 122. Each program object is related to its corresponding effect by a two-directional CAUSES relationship. Each effect is related to the variable that it affects by a EFFECT relationship.

In FIG. 2, a retirement incentive program object 94 and a retirement incentive effect object 96 contain information on the effects that the program has on the attrition ratio 57. Also, a pricing discount program object 98 and a pricing discount effect object 100 contain data on the effects that a pricing scheme has on the proportionality between revenue and the target market, represented by a two-way EFFECT relationship between the pricing discount effect object 100 and the proportionality variable 41.

In the present invention, the user has the ability to activate or deactivate a program and its corresponding effects. If a program is deactivated, it will not be considered during the reasoning method analysis and reconciliation process, as will be described below. The use of such "switchable" modeling objects is one way in which a user can perform "what-if" analysis, using the modeling method of the present invention.

Statement data can also be incorporated into the enterprise modeling methods of the present invention. A planner may have access to statements about the likely future behavior of a variable. The statement may be in the form of a plan, opinion or goal. Thus, the present invention provides three objects to model statement data: plan objects, opinion objects and goal objects. For example, a marketing expert might have provided an opinion, concerning the size of the target market. Additionally, the enterprise might have set production goals for the upcoming years. Plan, opinion and goal objects contain a repository of information in the form of opinions, plans or goals which, in analysis, are considered to be "axiomatic". Plan, opinion and goal objects are associated with a variable using corresponding two-directional HAS PLAN/PLAN OF, HAS OPINION/OPINION OF and HAS GOAL/GOAL OF relationships. Associated with such statements is an indication of the respective source. The source is represented as a knowledge source object that is associated with a corresponding statement object, using PROVIDES PLAN, PROVIDES OPINION, and PROVIDES GOAL relationships.

Referring to FIG. 2, there is an opinion object 102 containing a opinion as to the size of the target market from a source listed in the associated knowledge source object 104. There is also a plan object 106 attached to the proportionality variable 41 between the target market variable 50 and the revenue variable 40. Plan object 106 is connected to a knowledge source 101 in a PROVIDES PLAN relationship. A statement in the form of a goal, concerning the revenue variable 40 and its associated source information is stored in a revenue goal object 108 and a revenue statement knowledge source object 110. An expert opinion, concerning the productivity relationship between the resource employee variable 52 and the products built variable 54, is specified in the model using a productivity opinion object 112 and a productivity opinion knowledge source object 114. The enterprise has also completed a study on attrition rates, and the conclusion of that study is contained in an opinion object 115. The source of that opinion, the document, is identified in a knowledge source object 117.

In addition to the modeling features described above, the present invention provides a method and apparatus for maintaining data and performing strategic analysis at varying levels of aggregation. The variables, as described above, reflect values for the entire enterprise, the entire population, etc. Those variables represent a high level of aggregation. In the strategic planning model, the present invention permits a user to "decompose" any variable, by breaking it down into different constituent subsets. For example, the employees of an enterprise could be split into groups by geographic location (e.g. the US-based employees), by the type of product they produce (e.g. the Model-X group) or the employee's function (e.g. widget machine operators). In a process to be described below, the present invention provides for the decomposition of variables into categories of sub-component objects. Data, such as historical data, statement data and program data, can be stored in objects related as subset objects of the decomposed variables. In FIG. 2, bracket indicators < > show that the GNP variable 46 has a decomposition by geographic region (such as US-GNP and European-GNP), while the total market variable 48 is decomposed in two ways, by geography and by product (as are the target market variable 50 and the revenue variable 40). The inventory variable 56 is decomposed by product only, but the products built variable 54 is broken down by geographic location and product. The attrition variable 60 and the new hiring variable 58 can broken down by function. As will be described below, a user is free to define different particular types of variable decomposition.

In tracking data, the decomposition feature works from an assumption that the subset objects created through the decomposition of a variable can be summed to form an aggregate value. However, in forming the aggregate values, different variables behave differently. Thus, variables which are subcategories of a flow variable behave differently from variables which are subcategories of a level variable. A level variable allows for an addition of the subset values to form an aggregate. For instance, the population of Europe is the sum of the populations of the individual countries of Europe. Inventory 56 and resource employees 52 are examples of level variables. In contrast are flow variables, the component parts of which cannot be merely summed to form an aggregate value. The total of exports from Europe which would be classified as a flow, is not simply the sum of exports from individual countries, as the export from one European country may be to another European country and could not be included in a net European export figure. Aggregation over flows must take into account interflows between the subsets.

Using the modeling system of the present invention, the user can specify a chain of interdependencies that accurately represent the environment of any enterprise. Because a method of model formulation for projection data has traditionally lain outside the domain of computer-aided decision support systems (as a sort of black art), the method of the present invention represents an advance. Here, a modeling system is presented by which multiple reasoning methods can be applied in parallel and in which multiple types of data, such as historical and opinion data can be simultaneously stored and manipulated. The present invention presents an architecture that allows the user to declare the known conceptual relationships that describe his or her planning domain. Through progressive refinement of this conceptual map, the user, in his interaction with the system, approaches an understanding of the implications and contradictions of such a network of knowledge. In this manner, he deepens his knowledge of the planning context.

With a model, such as that created above, a user will input a query to form a projection of a variable, such as the revenue variable over a planning horizon. To analyze the query, as will be described in detail below, the present invention applies a number of reasoning methods, using the data available and the relationship configuration of the model. A reasoning method is generally defined as a procedure that searches for evidence needed for its application and executes a procedure to generate a projection. Because the present invention supports the application of multiple reasoning methods in parallel, each projection created by each application of a reasoning method is considered to be only an intermediate hypothesis, which will be evaluated in a reconciliation process with others to form a final projection.

Implementation

This section presents an description of an exemplary implementation of the strategic planning system of the present invention, using the modeling approach outlined above.

Referring again to FIG. 1, the computer program modules 18 and knowledge base 20 of the present invention are located in the strategic planning system subspace 16 in memory 6. The computer program modules 18 stored in the strategic planning system subspace 16 comprise computer executable code that is accessed by the processor 4, enabling it to perform the functions of variable projection, by accessing and manipulating information stored in the knowledge base 20. The knowledge base 20 stored in the strategic planning system subspace 16 comprises hierarchically organized collections of data objects which can be accessed by the processor 4, using the computer program modules 18. In an exemplary embodiment, the computer program modules 18 of the present invention comprise code complied from code written in the KnowledgeCraft CRL language. The data objects of the knowledge base 20 are constructed using the KnowledgeCraft CRL language. The KnowledgeCraft CRL language and compiler are products of the Carnegie Group Inc. The language permits implementations in KnowledgeCraft CRL, layered on top of LISP computer language programming, such as in VAX LISP, which is a product of the Digital Equipment Corporation. For more information on the KnowledgeCraft CRL and VAX LISP programming languages, the reader is referred to the following publications which are expressly incorporated herein by reference: CRL Technical Manual Reserve/Update Information, Carnegie Group, Inc. May 1988; CRL Software User's Guide 3-2 Carnegie Group Inc.; Common LISP: The Language (2d ed), G. L. Steele, Digital Press, 1990.

Figure 3:
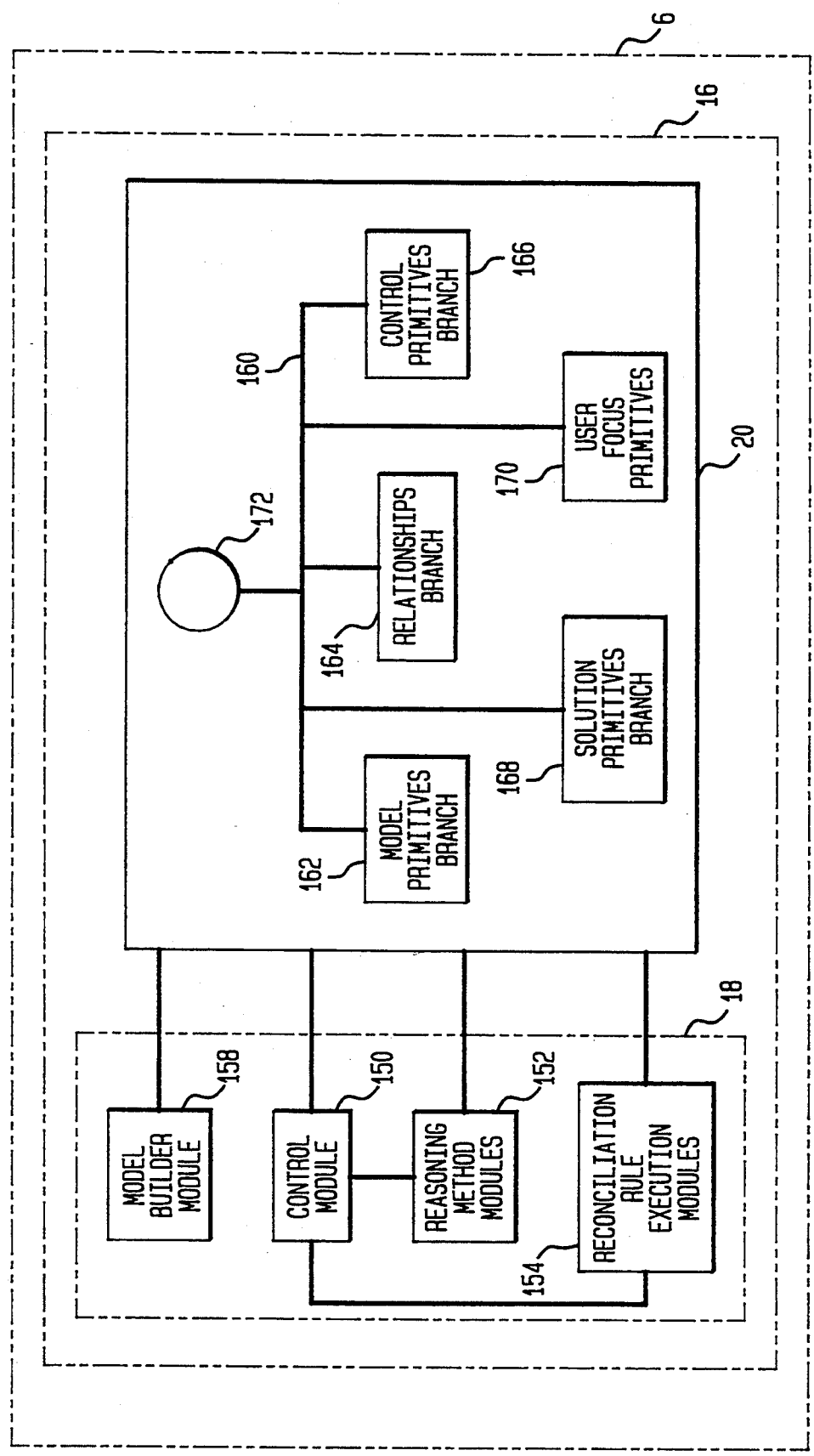
FIG. 3 Depicts an overview of the computer program modules and knowledge base of the present invention.

FIG. 3 depicts a block diagram of the computer program modules 18 and knowledge base 20 used in the exemplary implementation. There is a control module 150 to process projection queries made by the user that is coupled to a series of reasoning method modules 152, a series of reconciliation rule execution modules 154 and the knowledge base 20. In addition, there is a model builder module 158, to create the enterprise model, such as the one depicted in FIG. 2. When a user enters a query for variable projection, the control module 150 functions to control the applications of reasoning methods, by accessing information stored in the knowledge base 20. In the knowledge base 20, the user defined data structures representing a business model await, along with predefined object categories and other information concerning the reasoning methods and reconciliation rules until the control module 150 accesses it to process a user query. In processing user queries, the control module 150 also creates a solution tree containing information concerning the set of intermediate hypotheses generated. In the knowledge base 20, all data instances are stored as objects in a hierarchical classification scheme 160. When a reasoning method applies, the control module 150 will invoke a corresponding reasoning method module 152 to perform the operation. In determining reconciliation between intermediate hypotheses, the control module 150 invokes a number of the reconciliation rule execution modules 154 to create the data model of the enterprise. Each of these components is discussed in detail below.

The Knowledge Base

Data in the knowledge base 20 is stored in a series of categorized objects that are linked in a hierarchical classification scheme 160. As can be seen in FIG. 3, data in the knowledge base 20 is grouped under five general branch categories along the hierarchical classification structure 160 under the root note 172.

First, there is a model primitives branch 162. These primitives provide categories for the variable, history, program, effect, organization, and statement objects, as described above with reference to FIG. 2. As is described below, users have a great flexibility to specify object instances according to available object classification primitives and to even specify new classification primitives. To construct the data instances and classification primitives, the present invention provides the model builder module 158.

Second, there is a relationships branch 164, which is a category for information concerning the relationships that are available for networking between objects during the modeling process. This information is stored in a series of objects under the relationship branch 164 that classifies the relationships between model building objects. As described above, relationships associate modeling objects, such as variables or history objects. Those links help in specifying a detailed representation of the production environment for an enterprise. The links also provide the basis for and determine the applicability of the reasoning methods.

Third, a control primitives branch 166 classifies the reasoning methods and reconciliation rules used within the present invention to perform variable projection. This branch 166 of the knowledge base 20 contains parameters for each reasoning method and each reconciliation rule used in the system.

Fourth, there is a solution primitives branch 168. In execution, the control module 150 will accept a user query for projection of a single variable or a group of variables. As will be described below, the control module 150 will apply multiple reasoning methods. In applying the reasoning methods, the control module 150 will create a solution tree (stored in the knowledge base 20 under the solutions primitives branch 168) to track the solution of the variable projection problem through the various multiple reasoning methods applied.

A fifth branch of the knowledge base 20 is a user focus primitives branch 170, containing listings of groups of variables that share a common dimension of decomposition that is of sufficient significance to be of interest to the user as a grouping rule. This allows the user to specify decomposition dimensions of interest when specifying a projection query. Generally, a user query contains a request to project a single variable. However, when variables have been decomposed the user sometimes wishes to find projected values for a set of variables. For example, the user might present a query to project all "European" variables, where a number of variables, such as GNP, revenue and inventory, are decomposed by geographic location. The information stored under the user focus primitive branch 170, allows users to make such a query.

In an exemplary embodiment, all the information in each object in the knowledge base 20 can be represented as an object frame, having the following form:

```
{{FRAME-NAME
   RELATIONSHIP-1:    (list of other FRAMES)
   RELATIONSHIP-2:    (list of other FRAMES)
         :
   RELATIONSHIP-N:    (list of other FRAMES)
   ATTRIBUTE-1:       (list of values)
   ATTRIBUTE-2:       (list of values)
         :
   ATTRIBUTE-N        (list of values)}}
```

The relationship declarations specify a list of proper relationships that can be specified between objects, and the attribute declarations specify a list of attributes or data slots that an object can contain. When data is specified or a variable is declared, the information is stored in an object having the general form stated above. To categorize the objects, the present invention provides for the specification of object primitives. Primitives do not contain actual model data. But each primitive in the categorization hierarchy of the knowledge base 20 contains a declaration of the possible attributes and relationships that the objects within a category should contain. Thus, a primitive is like a template. The primitives are arranged in a tree structure to provide a way to categorize the objects used in the enterprise model. In the present invention the attributes of a primitive can be inherited to the other objects specified below it. Thus, in specifying a modeling object, the categorizing of an object will greatly determine the attributes it can have and the relationships that it can establish. In this way attributes are "inherited" from the chain of primitives leading to the root node above an object.

In an exemplary embodiment, the root node 172 (FIG. 3) is a primitive object that has the following frame:

```
{{PRIMITIVE
   HELP-TEXT:
      The five name primitives categories consist of control
      primitives, solution primitives and user-focus primitives which
      are used internally for reasoning and decision making.
   IS—A+INV   :MODEL PRIMITIVES
               SOLUTION PRIMITIVES
               CONTROL PRIMITIVES
               USER FOCUS PRIMITIVES
               RELATIONS
```

As described above, the root node in the hierarchical classification structure 160 (labeled PRIMITIVE) has sub-categories corresponding to each of the branches of the classification tree (i.e. model primitives 162, relationships 164, control primitives 166, solution primitives 168 and user focus primitives 170). All objects are linked in the classification hierarchy by a two-way relationship designated by the IS-A and IS-A+INV declaration. The IS-A relationship identifies the category of which that object is a member (e.g., the object is a member of the variable category). In this case, the primitive frame is a member of no category, because it is a root.

The inverse of the IS-A relation, IS-A+INV, provides an indication of the subcategory primitives underneath a particular primitive. In this case, the root primitive 172 has the subcategories corresponding to the branches of the knowledge base hierarchical tree, described above. In categorization, all of the objects are classified in the knowledge base 20 with the two-directional IS-A relationship.

Using these data structures the present invention provides for variable projection analysis, by allowing users to construct an enterprise model, using the data modeling approach, and then by the reasoning method dictated by the enterprise model to perform projection analysis, reconciling between the projections generated by the application of each reasoning method. The discussions to follow will describe in detail the model builder objects, the steps of building a model for variable projection, and processing of the control module 150 which applies the multiple reasoning methods and reconciles the projections to arrive at a variable projection value.

Model Object Classification Scheme

Figure 4:
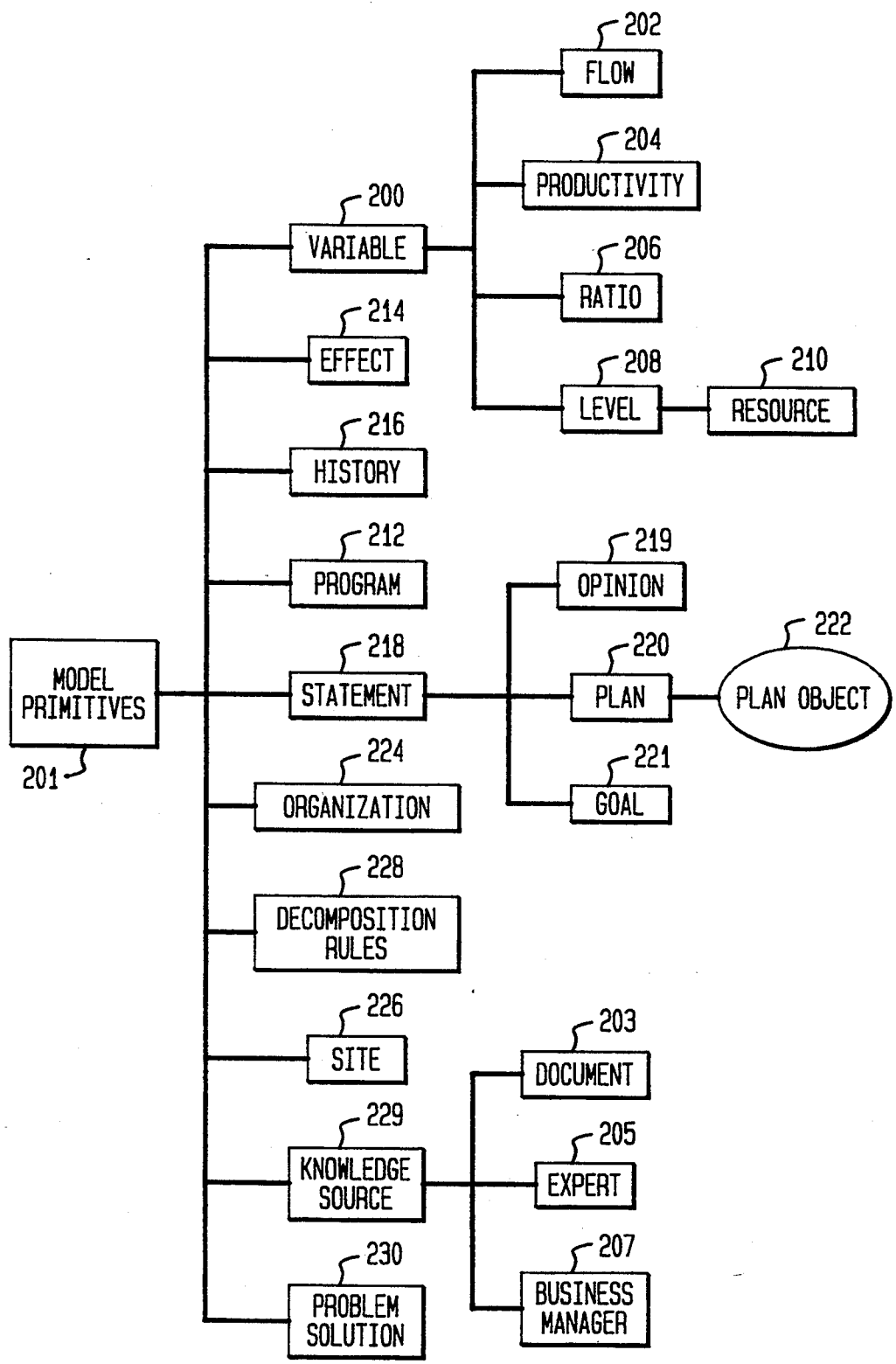
FIG. 4 Depicts an exemplary hierarchical categorization scheme of the model primitives of the present invention.

FIG. 4 depicts an exemplary classification scheme for the modeling objects of the model primitive branch 162 used in the present invention. The base of the branch 162 is a model primitive 201. Variables are stored under the variable primitive 200. As described above, a variable is defined to be a value pertaining to some factor of an enterprise, which generally changes over time. In the present invention, the method and apparatus for strategic planning provides projections only for defined variables. In an exemplary embodiment, variables are grouped into one of four categories: flow variables (grouped under the flow primitive 202), productivity variables (grouped under the productivity primitive 204), ratio variables (grouped under the ratio primitive 206) and level variables (grouped under the level primitive 208). In an exemplary embodiment, the frame for a variable is as follows:

```
{{VARIABLE
  HELP-TEXT   :
               Variable is a model-primitive data object
               which provides a means of defining quantities
               in the system that change. Attributes typically
               associated with variables are :-
               - annual growth rate
               - weighing factor
               - trend type
               - number of years of history
               - historical data
               - units of measurement
  IS-A+INV    : LEVEL
                FLOW
                PRODUCTIVITY
                RATIO
  IS-A                       : MODEL PRIMITIVE
  DESIGNATORS                : NIL
  YEARS-OF-HISTORY           : NIL
  ANNUAL-GROWTH-RATE         : NIL
  PARAMETERS                 : NIL
  WEIGHING-FACTOR            : 0.8
  TREND-TYPE                 : LINEAR
  HAS-HISTORY                : NIL
  UNIT-OF-MEASUREMENT        : "UNITS"}}
```

This declaration of a variable primitive indicates it is a model primitive categorized under the model primitive by the hierarchical IS-A relationship that names its parent: MODEL PRIMITIVE. In the exemplary embodiment, the IS-A two directional relationship is a categorization aid provided by the KnowledgeCraft CRL language. The variable primitive 200 also declares several attributes that will be inherited to all variables. Variables typically have a UNIT OF MEASURE slot, and, by default, this unit of measure is expressed in "Units". As variables typically have historical data associated with them (as described above through a related history object), and because historical trend analysis is one reasoning method that is often applied on historical data, the variable primitive 200 provides a number of attribute slots that contain information necessary for the application of the historical trend analysis reasoning method (described in detail below). A YEARS-OF-HISTORY slot reflects the years of historical data available. In regression employed in historical trend analysis, the variable primitive 200 specifies in the TREND-TYPE slot that weighed linear regression is by default the type of regression that will be used for any variable. The default WEIGHING-FACTOR slot provides a value of 0.8. The declaration of the IS-A+INV relationship indicates that the variable has, in the exemplary embodiment, four subcategories for level, flow, productivity, and ratio variables. Corresponding primitives, a flow primitive 202, a productivity primitive 204, a ratio primitive 206 and a level primitive 208, provide subcategorization declarations for these four different types of variables. Each of these primitives will now be described.

The level primitive 208 groups variables which have a value at a particular instant in time. For example, in flow networks, level variables may act as accumulators. In decomposition structures, a level variable can be determined by simply adding up all of the decomposed sub-units. For example, the total population of Europe is determined by adding together all the populations of the individual countries in Europe. In an exemplary embodiment, the frame for the level primitive 208 is as follows:

```
{{LEVEL
  HELP-TEXT:
     level is a variable that represents variables which are
     accumulations. For example, headcount, inventory etc.
     Level variables inherit attributes from the variable
     primitive.
  IS-A+INV              : RESOURCE
                          AVERAGE
                          INVENTORY
  IS-A                  : VARIABLE
  DESIGNATORS           : NIL
  YEARS-OF-HISTORY      : NIL
  ANNUAL-GROWTH-RATE    : NIL
  PARAMETERS            : NIL
  WEIGHING-FACTOR       : 0.8
  TREND-TYPE            : LINEAR
  HAS-HISTORY           : NIL
  UNIT-OF-MEASUREMENT   : NIL}}
```

A comparison of the attribute slots with those of the variable primitive 200 shows that the level primitive 208 inherits all of its attributes from the variable primitive 200 that is above it in FIG. 4. However, the IS-A+INV relationship slot in its frame declaration indicates that the level primitive 208 provides a subcategory for variables, and it lists three subclasses corresponding to Average, Resource and Inventory primitives.

One specific type of level variable provided for in the exemplary embodiment of the present invention is a resource variable (grouped under the resource primitive 210). The resource primitive 210 groups the resources of an enterprise. Examples of resources that an enterprise might have include people, space, total assets and capital. Resource variables have special significance because they can be associated with a particular organization, which is one of the relationships necessary in the applicability conditions of the productivity analysis reasoning. Additionally, a productivity variable is also associated with the resource variable as was described above. Accordingly, the frame for the resource primitive 210 has two additional relationships slots to show these affiliations, HAS-PRODUCTIVITY and RESOURCE-OF, as shown below:

```
{{RESOURCE
  HELP-TEXT :
     Resource is a sub-class of level variable. Attributes
     typically associated with resource variables are:
     - the organization to which the resource belongs
     - the productivity associated with the resource
  IS-A+INV  : PEOPLE
              SPACE
              STOCKHOLDERS EQUITY
              TOTAL ASSETS
              GROSS PROPERTY PLANT EQUIPMENT
              PLANT1 CAPACITY
              PROCESS-2 CAPACITY
              MACHINE-A CAPACITY
  IS-A                  : LEVEL
  DESIGNATORS           : NIL
  YEARS-OF-HISTORY      : NIL
  ANNUAL-GROWTH-RATE    : NIL
  PARAMETERS            : NIL
  WEIGHING-FACTOR       : 0.8
  TREND-TYPE            : LINEAR
  HAS-HISTORY           : NIL
  UNIT-OF-MEASUREMENT   : "UNITS"
  HAS-PRODUCTIVITY      : NIL
  RESOURCE-OF           : NIL}}
```

Flow variables (categorized under the flow primitive 202) represent a type of variable which is a value over a period of time, (e.g. revenue per year). In flow networks, flow variables cannot act as accumulators. In decomposition structures, aggregation over flow must take into account "interflows" between subsets. For example, a variable for net exports from Europe is a flow variable and not a level variable, because the value is not determined by a simple sum of exports from individual countries. One European country may export to another country, and the conservation of flow principles must be taken into account. Although there is a fundamental theoretical difference between flow and level variables which affects the application of a conservation of flow reasoning method, the basic frame structures for their primitives are the same. In an exemplary embodiment, the flow primitive frame is as follows:

```
{{FLOW
  HELP-TEXT :
     Flow is a variable category that represents no accumu-
     latory variables, such as the movement of people from
     one job category to another or the movement of
     revenue from one area to another. Flow variables
     inherit attributes from the variable primitive.
  IS-A+INV : REVENUE
             SPEND
             BUILD
             PROFIT
             INVENTORY GROWTH
             EQUIPMENT DISCOUNTS
             EQUIPMENT ALLOWANCES
             EQUIPMENT UPLIFT
             NEW HIRING
             ATTRITION
             TRANSFER SHIPMENT
  IS-A                  : VARIABLE
  DESIGNATORS           : NIL
  YEARS-OF-HISTORY      : NIL
  ANNUAL-GROWTH-RATE    : NIL
```

```
-continued
PARAMETERS         : NIL
WEIGHING-FACTOR    : 0.8
TREND-TYPE         : LINEAR
HAS-HISTORY        : NIL
UNIT-OF-MEASUREMENT : "UNITS"}}
```

The entries in the IS-A+INV relationship slot show examples of declared flow variable objects.

In addition to the flow and level subcategories, the exemplary embodiment has two additional subcategories for productivity and ratio variables. As described above, ratio variables represent ratios between variables. In an exemplary embodiment, the ratio primitive 206 has the following frame:

```
{{RATIO
    HELP-TEXT :
        Ratio is a variable which has a numerator and a
        denominator. Ratio variables inherit attributes from the
        variable primitive. Attributes typically associated with
        these variables are:
            - denominator
            - numerator
    IS-A+INV:
        GROSS RETURN ON SALES
        EFFECTIVE TAX RATE
        NET RETURN ON SALES
        RATIO OF DIRECT HEADCOUNT TO HEADCOUNT
    IS-A                 : VARIABLE
    DESIGNATORS          : NIL
    YEARS-OF-HISTORY     : NIL
    ANNUAL-GROWTH-RAT    : NIL
    PARAMETERS           : NIL
    WEIGHING-FACTOR      : 0.8
    TREND-TYPE           : EXPONENTIAL
    HAS-HISTORY          : NIL
    UNIT-OF-MEASUREMENT  : NIL
    HAS-DENOMINATOR      : NIL
    HAS-NUMERATOR        : NIL}}
```

To express ratios between the variables of the proportionality relationship, the attribute declaration above contains slots for a numerator and denominator, which correspond to the variables in the proportionality relationship.

As will be described in detail below, the modeling approach of the present invention creates ratio objects and their corresponding relationships, where a PROPORTIONALITY relationship is specified between two other variables. In the frame description above, the RATIO OF DIRECT HEADCOUNT TO HEADCOUNT is indicative of a system generated ratio object that is hierarchically attached under the ratio primitive.

The final variable subcategory groups productivity variables under the productivity primitive 204. Productivity variables represent a measure of the rate of efficiency of a resource (grouped under the resource primitive 210). In the exemplary embodiment, the productivity primitive has the following frame:

```
{{PRODUCTIVITY
    HELP-TEXT :
        Productivity is a variable that represents a measure of the
        rate of efficiency of some resource. Productivity
        variables inherit attributes from the variable primitive.
        A resource variable is typically associated with a
        productivity variable.
    IS-A+INV :    EUROPE MFG HEADCOUNT EUROPE
                  PRODUCT NOR MFG HEADCOUNT
                  MFG VALUE ADD PRODUCTIVITY
    IS-A                          : VARIABLE
```

```
-continued
    DESIGNATORS           : NIL
    YEARS-OF-HISTORY      : NIL
    ANNUAL-GROWTH-RATE    : NIL
    PARAMETERS            : NIL
    WEIGHING-FACTOR       : 0.8
    TREND-TYPE            : EXPONENTIAL
    HAS-HISTORY           : NIL
    UNIT-OF-MEASUREMENT   : NIL
    PRODUCTIVITY-OF       :
    PRODUCTIVITY-IN-PRODUCT : NIL}}
```

Because each productivity variable is associated with a resource, the productivity primitive 204 frame includes an attribute slot to identify the resource.

In addition to variables, other model objects in the modeling system of the present invention are stored according to the object categorization scheme.

Program objects are stored under a program primitive 212. A program is a change mechanism that will cause a change in particular variables. For instance, this can be a set of activities put in motion by the enterprise, or can arise out of the enterprise's environment. For example, a new product program should cause a rise in sales and an influx of new capital. In the exemplary embodiment, a frame for the program primitive 212 is as follows:

```
{{PROGRAM
    HELP-TEXT :
        program is a model primitive subcategory which
        represent agents of causal change in model.
    IS-A+INV :    NEW PRODUCT PROGRAM
                  SOURCING PROGRAM
                  MARKET PROGRAM
                  INFORMATION
                      TECHNOLOGY PROGRAM
                  PROCESS PROGRAM
                  COMPONENT
                      TECHNOLOGY PROGRAM
                  HUMAN RESOURCE PROGRAM
                  POLICY
    IS-A :        MODEL PRIMITIVE
    ACCEPTANCE:   T
    CAUSES:       NIL}}
```

The program primitive 212 frame contains an ACCEPTANCE slot to indicate whether the program has been accepted (activated), in which a user can enable or disable a particular instance of a program. This feature is one way in which managers perform what-if analysis with the present invention. By default, all programs are "accepted" or listed as active.

Programs create effects on variables. Effect objects are stored in the knowledge base 20 under an effect primitive 214. In an exemplary embodiment, the effect primitive 214 has the following frame:

```
{{EFFECT
    HELP-TEXT :
        Effect is a model primitive subcategory, instances of
        which are used to model the result of a program
        Attributes typically associated with a primitive include:
            - the program it is an effect of
            - the variables it effects
            - information describing the effect
    IS-A+INV :    TURNS IMPROVEMENT
                  SECOND SHIFT IMPACT ON SPACE
                  THIRD SHIFT IMPACT ON SPACE
                  REDEPLOYMENT
    IS-A :        MODEL PRIMITIVE}}
```

Effects are caused by programs, and the effects are said to act on variables.

History objects are grouped under a history primitive 216. History objects store data concerning the historical values that a particular variable has. Thus, history objects are repositories of information concerning the past values of the variables modeled. In an exemplary embodiment, the history primitive has the following frame:

```
{{HISTORY
    HELP-TEXT :
        History is a model primitive which is used as a template
        to store past data about an object. It has attribute slots
        for each of the years between fy72 and fy90.
    IS-A+INV :  RATIO-HISTORY
                PRODUCTIVITY-HISTORY
                COST OF SALES HISTORY
                INVENTORY GROWTH HISTORY
                HEADCOUNT HISTORY
                DEPRECIATION HISTORY
                MFG COST HISTORY
                EUROPE POPULATION HISTORY
                EUROPE GNP HISTORY
    IS-A : MODEL PRIMITIVE
    FY1972 : NIL
    FY1973 : NIL
    FY1974 : NIL
    FY1975 : NIL
    FY1976 : NIL
    FY1977 : NIL
    FY1978 : NIL
    FY1979 : NIL
    FY1980 : NIL
    FY1981 : NIL
    FY1982 : NIL
    FY1983 : NIL
    FY1984 : NIL
    FY1985 : NIL
    FY1986 : NIL
    FY1987 : NIL
    FY1988 : NIL
    FY1989 : NIL
    FY1990 : NIL }}
```

In the present invention, a user can specify instances of historical data and associate them to particular variables. However, in the present invention, the system can also create history objects, during application of the reasoning methods. For example, in the IS-A+INV declaration shown above, the RATIO-HISTORY and PRODUCTIVITY-HISTORY objects contain system generated data that are associated with ratio and productivity variables already implicitly in the model.

Statement objects are grouped under the statement primitive 218. As described above, statement objects, such as opinions, plans, and goals, provide information concerning opinions or guesses on the future value of a variable. Examples of statements include an opinion by expert, a statement of a goal or quota for an enterprise, or a description of an enterprise plan. In the exemplary embodiment, the statement primitive has the following frame:

```
{{STATEMENT
    HELP-TEXT :
        statement is a model primitive which accommodates
        declared information such as in plans, goals and opinions.
    IS-A+INV : PLAN OPINION GOAL
    IS-A : MODEL PRIMITIVE
    STATUS : NIL
```

As can be seen, there are three categories of statements, i.e. Plans, goals and opinions. All instances of plans, goals and opinions vary from model to model and are user defined. Semantically plans, goals and opinions are treated the same by the system. Subcategorization is thus merely to facilitate ease of retrieval of particular statements by the user in browsing the model or in activating statements.

Below the statement primitive 218 in the model primitive 201 hierarchy, are three additional primitives to further categorize available statement data: an opinion primitive 219, a plan primitive and a goal primitive 221. The primitive frame structure for the opinion 219, plan 220 and goal 221 primitives are similar. For example, the frame for the plan primitive is as follows:

```
{{PLAN
    HELP-TEXT :
        A plan is a variable which is of type statement.
        Plan contains information concerning:
            - date the plan was issued
            - subject of the plan
            - status to indicate if the plan should be
              considered when the programs is run
    IS-          : WIDGET BUILD PLAN
    A+INV
        IS-A            : STATEMENT
        RATIONALE       : NIL
        STATUS          : NIL
        DATE            : NIL
        OPINION OF      : NIL
        IS-A-PLAN-FOR   : NIL}}
```

As can be seen, in addition to attributes inherited from the statement primitive 218, the plan primitive 220 contains a STATUS slot that indicates whether a particular plan would be active or not. Users perform what-if analysis by activating or deactivating that slot. The IS-A-PLAN-FOR slot provides the link to a particular variable. A free text natural language justification for a particular plan can be stored in the RATIONALE slot.

A plan object 222 might be stored under a plan primitive 220 as follows:

```
{{WIDGET BUILT PLAN
    HELP-TEXT :
        A plan is a variable which is of type statement.
        Plan contains the attributes :-
            - date the plan was issued
            - subject of the plan
            - status to indicate if the plan should be
              considered when the program is run
    RATIONALE       : JOE BLOGGS KNOW
                      EVERYTHING
    STATUS          : FORECAST
    DATE            : 1990 FEBRUARY
    IS-A-PLAN-FOR   : BUILD WIDGETS
    FY1991          : 11312
                      AMOUNT
    FY1992          : 12954
                      AMOUNT
    OPINION-OF      : JOE BLOGGS
```

In the example above, the numbers listed are for specific amounts of widgets to be produced in three different years. The DATE slot contains the date on which the plan was adopted. As all statements are deemed to be axiomatically true, the DATE slot provides the system with a way of evaluating between similar data. In the present invention data can be stored either as an amount (as shown above) a ratio or as a stepping factor. Moreover for use in reasoning methods involving such techniques as "beta distribution", multiple values for a given year can be stored, such as for best case, worst case, most likely case scenarios.

Knowledge source objects are stored under a knowledge source primitive 229. As described above, knowledge source objects contain information on the sources of information for use in statement objects. For example, a named expert might have rendered an opinion concerning, for example, the size of a future market. In an exemplary embodiment, the knowledge source primitive 229 has the following frame:

```
{{KNOWLEDGE SOURCE
    HELP-TEXT :
        Knowledge source is a model primitive which represents
        sources of information.
        The four subcategories of knowledge-source are
        - document
        - business-manager
        - user
        - expert
    IS-A+INV :   EXPERT
                 BUSINESS MANAGER
                 DOCUMENT
    IS-A : MODEL PRIMITIVE
    ACCREDITED: NIL
```

Knowledge sources may be active or inactive, which again permits users to perform what-if analysis using the statements. Below the knowledge source primitive 229 in the classification structure are primitives to further categorize knowledge source data: a document primitive 203, an expert primitive 205 and a business manager primitive 207.

Organization objects are grouped under the organization primitive 224. As described above, organization objects contain data concerning any enterprise or other entity which controls a resource. An example could be subdivisions of the enterprise, affiliates of an enterprise, or a government entity. In the exemplary embodiment, the organization primitive 224 has the following frame:

```
{{ORGANIZATION
    HELP-TEXT :
        Organization is a model primitive representing an object
        which has resources and perhaps produces outputs.
        for example business units
    IS-A+INV :   MFG
             :   EUROPE MFG
             :   US MFG
    IS-A     :   MODEL PRIMITIVE}}
    HAS RESOURCE: NIL
    PRODUCES:   NIL
```

In the frame above, the IS-A+INV relationship slot identifies instances of organization resource objects: EUROPE MFG and US MFG.

In addition to organization objects, enterprise organization data can also be grouped by site location. Data concerning a site location can be stored in a site object, grouped under a site primitive 226. In an exemplary embodiment, the site primitive has the following frame:

```
{{SITE
    HELP-TEXT :
        Site is a mode primitive which identifies a corporate
        location. an attribute associated with site is :-
    IS-A+INV :   PLANT
                 OFFICE
    IS-A     :   MODEL PRIMITIVE
```
-continued
```
    LOCATION-CODE : NIL}}
```

A problem solving framework primitive 230 contains data on the base year and the planning horizon. This is the time frame over which a projection is based. In an exemplary embodiment, the problem solving framework primitive 230 has the following frame:

```
{{PROBLEM SOLVING FRAMEWORK
    HELP-TEXT            :
    IS-A                 : MODEL PRIMITIVE
    BASE-YEAR            : 1990
    LAST-PROBLEM-SOLVED  : NIL
    PLANNING-HORIZON     : 4}}
```

A BASE-YEAR slot provides the year from which the projection can start. The PLANNING HORIZON slot contains the number of years over which the projections can range.

Finally, decomposition rule objects contain information specifying the decomposition of an object; they are stored under a decomposition rule primitive 228. As mentioned above, a decomposition rule is a set of instructions to provide for the automatic breakdown of any variable. A decomposition rule allows data pertaining to a variable to be maintained at varying levels of aggregation or detail. For example, the production variable can be decomposed by geographic location and production data can be maintained by plant. In the hierarchical classification structure 160 (FIG. 3) decomposition rules are stored under a decomposition rule primitive 228. In an exemplary embodiment, the decomposition rule primitive 228 has the following frame:

```
{{DECOMPOSITION RULE
    HELP-TEXT :
        Decomposition rule is a model primitive which enables
        the logical breakdown of variables within the strategic
        planning domain (for example; headcount, revenue)
        into more specific categories (for example; geography
        areas, specific functions).
        The attributes associated with a decomposition-rule are:-
        - existence of subset decomposition
        - categories by which subject is being decomposed
        - subject being decomposed
    IS-A+INV    :   INVENTORY BY GEOGRAPHY
                    MFG BY INVENTORY TYPE
                    ENTERPRISE BY CORPORATE
                    FUNCTION QUALITY BY GEOGRAPHY
                    PURCHASING BY GEOGRAPHY
                    PRODUCTION BY GEOGRAPHY
                    PERSONNEL BY GEOGRAPHY
    IS-A            :   MODEL PRIMITIVE
    HAS-SUBSETS     :   NIL
    DECOMPOSITION-BY:   NIL
    DECOMPOSITION-OF:   NIL}}
```

Decomposition Described

Decomposition is an indexing scheme, in which a variable is represented in a more detailed way through a group of subset variables. For example, the group of employees of an enterprise can be organized into subsets by geographic location or by function, or both. To implement this decomposition scheme, the present invention provides an additional set of objects and relationships that can be associated with a variable. Further, as will be explained in detail below, the methods and apparatus of the present invention support hierarchical layering of decompositions, decomposing a single variable down a decomposition tree of layered decompositions, as well as the decomposition of a sub-network.

FIG. 5A depicts an exemplary representation of a set of objects and relationships used in the decomposition of a single variable, a resource-employees variable 52. To implement a decomposition of a variable, a user must specify the categories of decomposition in a decomposition rule. In FIG. 5A, an enterprise-by-geography decomposition rule object 300 contains the following declaration:

```
{{ENTERPRISE-BY-GEOGRAPHY
  HELP-TEXT :
    Decomposition rule is a model primitive which enables
    the breakdown of variables within the strategic
    planning domain (for example; headcount, revenue) into
    more specific categories (for example; geography areas,
    specific functions).
    the attributes associated with a decomposition rule including
    the categories by which subject is being decomposed
  IS-A                : DECOMPOSITION RULE
  HAS-SUBSETS         : US
                        EUROPE
                        ASIA
  DECOMPOSITION-BY    : GEOGRAPHY
  DECOMPOSITION-OF    : ENTERPRISE}}
```

The enterprise-by-geography rule object 300 is linked to the decomposition rule primitive 228 (see also FIG. 4) by a two-directional IS-A relationship. As can be seen from the declaration of the enterprise-by-geography rule object 300, there are additional objects associated with it through three different two directional relationships: HAS-SUBSETS, DECOMPOSITION-BY and DECOMPOSITION-OF relationships.

Each decomposition rule has a parent. In FIG. 5A, the parent is enterprise (represented by an enterprise object 304). The enterprise object 304 is attached to the categorization hierarchy by an IS-A relationship to the organization primitive 224. It is identified as a parent in FIG. 5A because it is related to the decomposition rule 300 by a HAS DECOMPOSITION relationship.

The declaration of the enterprise-by-geography rule 300 also indicates that this decomposition rule has a number of subsets corresponding to US subset object 308, the Europe subset object 310 and an Asia subset object 312.

Each of the subsets are created by the system, when a decomposition rule is created. These subset objects 308, 310 and 312 are associated with the enterprise-by-geography decomposition rule 300 by a HAS-SUBSET relationship. In an exemplary embodiment, each subset object has a frame, such as the following for the Europe subset object 310:

```
{{EUROPE
HELP-TEXT :
A user focus primitive which is used to gather variables together
in which the user might be interested
IS-A                : GEOGRAPHY
HAS-OBJECT          : NIL
LOCAL-DESIGNATORS   : EUROPE
IS-A-SUBSET-OF      : ENTERPRISE BY
                      GEOGRAPHY}}
```

An object frame declaration similar to the European declaration exists in the US subset object 308 and the Asia subset object 312. The Europe subset object 310 bears a IS-A-SUBSET-OF relationship to the decomposition rule object 300. A HAS-OBJECT relationship slot in the Europe subset object 310 declaration stores lists of "EUROPEAN" variables. As will be described below, these variables are created when the decomposition rule is applied to the decomposition of specific variables. The LOCAL-DESIGNATORS slot in the declaration for the Europe object 310 provides for naming each instance of a decomposed variable. As will be described below, in the application of decomposition to a variable, the designators from the decomposition rule subsets are used in the naming process of the subsets that form the decomposition of variables.

As can be seen from the frame of the Europe subset object 310 the sub set objects (308, 310, 312) of a decomposition rule (302) are also linked by an IS-A relationship to a geography object 302. The geography object is an instance of a user focus primitive, which is used to group instances of decomposed variables by type. The subset objects play a dual role in that they are also instances of the user focus primitives, and serve as collecting points by category for instances of decomposed variables. As described above this grouping technique allows users to specify projection queries such as one to project all modeled European variables. The Geography maintains a link to each subcategory of a particular decomposition rule. The geography object 302 is also linked to the hierarchical classification scheme 160 (FIG. 3), by an IS-A relationship to a user focus primitive 205. The geography object 302 is also linked to the enterprise-by-geography rule object 300 by a DECOMPOSITION-BY relationship. In an exemplary embodiment the geography object, a typical user focus primitive object, has the following frame:

```
{{GEOGRAPHY
HELP-TEXT    :
IS-A         : USER FOCUS PRIMITIVE
IS-A+INV     : US
             : ASIA
             : EUROPE}}
```

Once a decomposition rule is specified, the rule can be applied to decompose any variable. This method permits speedy model building, because this generic decomposition rule can be applied to any variable.

Referring to FIG. 2 for example, the enterprise-by-geography-decomposition rule 300 of FIG. 5A can be applied to the resource-employee variable 52, the products-built variable 54, the revenue variable 40, the target market variable 50, the total market variable 48, the GNP variable 46 and the population variable 44. Basically, any variable that is relevant to the parent of the decomposition rule (e.g., enterprise) can be decomposed using the rule described above.

FIG. 5A further depicts the single decomposition of the employee resource variable 52 (see also FIG. 2) by the enterprise-by-geography rule 300. During model building, the user invokes a function of the model builder module 158 (see FIG. 3) to decompose the resource-employee variable. The procedure will first create an instance object for the decomposition rule 300. In an exemplary embodiment, the employees-by-geography instance object 320 has the following frame:

```
{{EMPLOYEES-BY-GEOGRAPHY
HELP-TEXT :
This is a instance of a generic decomposition rule
```

| -continued | |
|---|---|
| DESIGNATORS: | : NIL |
| YEARS-OF-HISTORY | : NIL |
| ANNUAL-GROWTH-RATE | : NIL |
| PARAMETERS | : NIL |
| WEIGHTING-FACTOR | : 0.8 |
| TREND-TYPE | : LINEAR |
| UNIT-OF-MEASUREMENT | : PERSON |
| IS-A | : RESOURCE |
| HAS-SUBSETS | : EUROPE EMPLOYEES |
|  | ASIA EMPLOYEES |
|  | US EMPLOYEES |
| DECOMPOSITION-BY | : GEOGRAPHY |
| DECOMPOSITION-OF | : EMPLOYEES |
| ROOT-OBJECT | : EMPLOYEES |
| INSTANCE-OF | : ENTERPRISE BY |
| GEOGRAPHY}} | |

This object 320 is linked to the employees variable 52 by a two-directional IS-A DECOMPOSITION OF relationship. Further, the employees-by-geography instance object 320 is linked to the enterprise-by-geography rule 300 by a two-way INSTANCE OF relationship. As shown above, an attribute slot, ROOT-OBJECT, is provided to indicate that the root variable being decomposed is the employees variable 52. An attribute slot, DESIGNATORS, allows for designators used in naming the decomposed variables to be inherited into the subsets of the decomposition. The other attributes of the frame of the employees-by geography instance object 320 are inherited from the employees variable 52 (such as the ANNUAL GROWTH RATE slot and the YEARS OF HISTORY slot).

The second aspect of applying the generic decomposition rule is creating the subset variables, which are the subsets of the decomposed variable. In FIG. 5A, there are three subset variables, an US-employees variable 322, an Europe-employees variable 324 and an employees variable 326. These variable subset objects have a frame in the following form:

| {{EUROPE-EMPLOYEES | |
|---|---|
| HELP-TEXT | : This is an instance of |
|  | a decomposed |
| variable. | |
| DESIGNATORS | : EUROPE |
| YEARS-OF-HISTORY | : 9 |
| ANNUAL-GROWTH-RATE | : NIL |
| PARAMETERS | : 0.96647348611543D0 |
|  | R-SQUARED |
|  | 134.5203686841013D0 |
|  | BETA-1 |
|  | −331053.88362351D0 |
|  | BETA-0 |
| IS-A SUBSET OF | : EMPLOYEES-BY- |
|  | GEOGRAPHY |
|  | INSTANCE |
| WEIGHTING-FACTOR | : 0.8 |
| TREND-TYPE | : LINEAR |
| HAS-HISTORY | : EUROPEAN |
|  | EMPLOYEE HISTORY |
| UNIT-OF-MEASUREMENT | : PERSON |
| IS-A | : RESOURCE |
| IS SUBSET AND | : EMPLOYEE-BY- |
|  | GEOGRAPHY |

The US, Europe and Asia subset variable objects 322, 324, 326 are linked to the employees-by-geography instance object 320 by a HAS SUBSET relationship. Further, each subset variable objects 322, 324, 326 is linked to a corresponding subset of the decomposition rule objects 308, 310, 312 by a HAS OBJECT relationship. As can be seen from the declaration many of the attributes are inherited either from the employees variable 52 or from the employees-by-geography instance object 320 or from the variable superset primitive 200. The ANNUAL GROWTH RATE slot is inherited from the employees variable 52. A value can be placed by the system in the case of constant percentage growth in a geometric case. The PARAMETERS slot is also inherited from the employees variable 52. It would be filled in by the system during problem solving by the application of regression techniques. A TREND-TYPE attribute is inherited from the employee variable's superset primitive (i.e. the variable primitive 200.) This value could be user specified. The value in the WEIGHTING-FACTOR slot is also inherited from the variable primitive 200. That value could also be user specified.

In order to facilitate further inheritance, the subset is associated with the supercategory of the superset (i.e., EUROPE-MFG-HEADCOUNT IS-A RESOURCE). The subset is linked to the instance of the application of the decomposition rule by the IS-A-SUBSET-OF relationship. All the other relationships in this example were user specified after decomposition.

The DESIGNATORS label "Europe" is drawn from the LOCAL-DESIGNATOR slot in the Europe subset object 310 of the decomposition rule, which corresponds to the decomposed variable instance. In this case, the Europe subset object 310 designator is used for the corresponding Europe employees variable.

While the attributes of the subset objects 322, 324 and 326 can be inherited, the relationships from the superset variable employees 52 cannot. Each variable created through decomposition is considered independent and must be given its own set of relationships to other objects in the model. For example, a Europe-employees history object 328 can be associated with the employees in Europe subset variable 324. That variable 324 could not inherit a relationship to a history object, such as 330, that was related to the employees variable 52.

The description above provides one application of the enterprise-by-geography decomposition rule 300. The decomposition rule is generic and can be applied to many variables. As decompositions of variables occur, the relationships are created from the enterprise geography rule to each instance of this decomposition rule application.

Also, with each application of a decomposition rule to various variables, each of the subset variables associated with the decomposition rule (such as the Europe subset object 310) will have a set of links to each subset variable that corresponds to its subset class through the HAS-OBJECT relationship. The following shows the frame for the EUROPE object 310 after several applications of the decomposition rule with several "EUROPEAN" variables listed:

| {{EUROPE | |
|---|---|
| HELP-TEXT | : A user-focus primitive which |
|  | is used to gather variables |
|  | together which the |
|  | user may or may not be |
|  | interested in |
| IS-A | : GEOGRAPHY |
|  | USER FOCUS PRIMI- |
|  | TIVE |
| HAS-OBJECT | : EUROPE EMPLOYEES |
|  | EUROPE PRODUCTS |
|  | NOR |
|  | EUROPE SALES |
|  | EUROPE MODULES |

| | |
|---|---|
| DECOMPOSITION BY | : GEOGRAPHY |
| LOCAL-DESIGNATORS | : EUROPE |
| IS-A-SUBSET-OF | : DEC BY GEOGRAPHY}} |

The HAS-OBJECT relationships provide links to the categories of interest that are used for projection queries by the user focus primitive.

Another feature of the present invention provides for hierarchically layering decomposition rules. FIG. 5A depicts the object/relationship configuration for the further decomposition of the enterprise-by-geography rule 300 by creating a decomposition rule for Europe subset object 310. The decomposition rule breaks down the Europe category by function such as, secretarial, purchasing and production. A new decomposition rule object, Europe-by-function 350 must be declared. This decomposition rule object 350 has a frame similar to the enterprise-by-geography decomposition rule object 300, listed above. One difference, however, in this instance, is that the parent of the Europe-by-function decomposition rule 350 is the Europe-subset object 310 (and not the enterprise object 304). Another difference is that the method of decomposing is by function (not by geography). Accordingly, a function object 358, similar to the geography object 302, is created. The function object 358 has subsets corresponding to the functions that a typical enterprise employee might have, such as secretarial (corresponding to a Europe secretarial subset object 352), purchasing (corresponding to a Europe purchase subset object 354), and production (corresponding to a Europe production subset object 356) functions. The Europe-by-function decomposition rule object 350 is additionally linked in the hierarchical classification scheme 160 by an IS-A relationship link to the decomposition rule primitive 228.

This decomposition rule could then be applied to any variable which was related to the Europe subset object 310, for example the employees-in-Europe variable 324 (a variable instance of the previous decomposition by geography of the employees variable 52). In decomposition, the employees in Europe variable 324 would be decomposed, as the employees variable 52 was above, by creating an instance of the decomposition rule object, Europe-employees-by-function 360, and variable instances 362, 364, 366 to break the variable into the subsets by function. In FIG. 5A, a Europe-employee-by-function decomposition rule instance object 360 is related to the employees-in-Europe variable 324 by a IS-A-DECOMPOSITION-OF relationship, and has the following frame form:

| | |
|---|---|
| {{EUROPE-EMPLOYEES-BY-FUNCTION | |
| HELP-TEXT : | Decomposition rule is a model primitive which enables the logical breakdown of variables within the strategic planning domain (for example; headcount, revenue) into more specific categories (for example; geography areas, specific functions). the attributes associated with a decomposition-rule are :- |
| | - categories by which subject is being decomposed |
| | - subject being decomposed |
| DESIGNATORS | : EUROPE |
| YEARS-OF-HISTORY | : NIL |
| ANNUAL-GROWTH-RATE | : NIL |
| PARAMETERS | : NIL |
| WEIGHTING-FACTOR | : 0.8 |
| TREND-TYPE | : LINEAR |
| UNIT-OF-MEASUREMENT | : PERSON |
| IS-A | : RESOURCE |
| DECOMPOSITION-BY | : FUNCTION |
| HAS-SUBSETS | : EUROPE SECRETARIAL EMPLOYEES |
| | EUROPE PURCHASING EMPLOYEES |
| | EUROPE PRODUCTION EMPLOYEES |
| DECOMPOSITION-OF | : EUROPE EMPLOYEES |
| ROOT-OBJECT | : EMPLOYEES |
| LOCAL-DESIGNATORS | : EUROPE |
| INSTANCE-OF | : EUROPE-BY-FUNCTION}} |

Using the Europe-employee-by-function instance of the decomposition rule, the system generates sub-component variables for the Europe employees variable 324, e.g., a Europe-secretarial-employees variable 362, a Europe-purchasers-employees variable 364 and a Europe-production-employees variable 366.

These new subset variables have frames as follows, such as that for the Europe-secretarial variable 362:

| | |
|---|---|
| HELP-TEXT | : |
| | the attributes associated with a decomposition-rule include categories by which subject is being decomposed and subject being decomposed |
| DESIGNATORS | : SECRETARIAL EUROPE |
| YEARS-OF-HISTORY | : NIL |
| ANNUAL-GROWTH-RATE | : NIL |
| PARAMETERS | : NIL |
| WEIGHTING-FACTOR | : 0.8 |
| TREND-TYPE | : LINEAR |
| HAS-HISTORY | : EUROPE-SECRETARIAL EMPLOYEES HISTORY |
| UNIT-OF-MEASUREMENT | : PERSON |
| IS-A | : PEOPLE |
| IS-A-SUBSET-OF | : EUROPE EMPLOYEES BY FUNCTION |
| ROOT-SCHEMA | : EMPLOYEES |

Thus, two levels of decomposition are associated with the employees variable 52. There is no depth limit in the amount of layers that can be in a decomposition rule tree. Moreover, this tree can then recursively be applied in the decomposition of variables. It can easily be seen how such a function would create a tree of subset variables underneath the variable specified corresponding to the decomposition-rule tree sitting under the specified decomposition rule.

But in addition to layered decomposition rule structures, the present invention also provides a method and apparatus for cross-indexing for instances when rules have already been declared and are not layered hierarchically.

FIG. 5B depicts the object/relationship structure for a set of cross-indexed decompositions. There are two decomposition rule objects. First, there is an enterprise-by-geography rule object 300, as described above, which provides for the decomposition of variables by geographic location. This decomposition rule object 300 has two related subset objects: a US object 308 and a Europe object 310. There is also a geography user focus primitive object 302 which is also related to the decomposition rule 300, the US subset object 308 and the Europe subject object 310.

A second decomposition rule 370 provides for the decomposition of a variable by product business unit (PBU) and is declared by an enterprise-by-PBU rule declaration object 370. Associated with the enterprise-by-PBU decomposition rule object 370 is the parent (enterprise 304) and a PBU user focus primitive object 372, which is similar in form to the geography object 302. The subset objects of the PBU user focus primitive object 372 group variables by product division. Suppose there is a banana production division (represented by the banana object 371) and a tomato production division (represented by the tomato object 376).

When two decomposition rules have been declared, it might be advantageous to create a further layer of decomposition by cross-indexing the decomposition categories. A user may wish to have the geography variables decomposed by PBU and the PBU variables decomposed also by location. However, the application of these two further decompositions leads to the same set of decomposition subsets: a US-banana subset 382, a US-tomato subset 384, a Europe-banana subset 386 and a Europe-tomato subset 388.

The problem is to ensure that the decomposition rule structure links the lower layer subsets upwards in both directions (i.e., the US-banana division has to be linked as a subset of the US-business as well as the banana business).

The model builder module 158 (FIG. 3) provides a procedure that will allow the cross-indexing of decomposition rules. Referring again to FIG. 5B, the procedure creates new decomposition rule objects for each one of the subset objects of the decomposition rules namely, a banana decomposition rule object 371, a tomato decomposition rule object 376, a US decomposition rule object 308 and a Europe decomposition rule object 310. These decomposition rule objects specify a cross decomposition by geography and PBU. To create sub subset objects for each of these decomposition rule objects, the process merges each subset of the enterprise-by-PBU object 370 and enterprise-by-geography object 300 (i.e., the banana and tomato subset objects 371 and 376 and the US and Europe subsets objects 308 and 310).

Additionally, there are decomposition rule objects, a Banana-by-geography object 378, a Tomato-by-Geography object 380, a US-by-PBU object 390 and a Europe-by-PBU object 392 that are related to a geography-PBU user focus primitive object 394, which provides an access point to the indexing scheme for later projections of variable sets. The US-banana-object 382, the US-tomato-object 384, the Europe-banana-object 386 and the Europe-tomato-object 388 are linked to the appropriate rule declaration objects by a HAS SUBSETS relationship. All of the subsets objects, US Banana 382, US Tomato 384, Europe Banana 386 and Europe Tomato 388 are linked to the PBU-geography-object 394 by an IS-A relationship.

The cross-indexed decomposition rules are now ready to be applied, and can be applied to many variables. For example, a full decomposition by geography on a variable will produce a layered decomposition by geography and by geography-PBU. Application of a full decomposition of a variable by PBU will produce a similar, layered result.

An additional feature of the present invention allows in certain cases for the relationships between variables to be carried through the entire decomposition structure, when the decompositional structures of two decomposed variables match. FIG. 5C shows such a decompositional relationship of two variables—a GNP variable 428 and a population variable 430. In this example, both the population variable 430 and the GNP variable 428 have been decomposed by continent. Thus, each variable 428 and 430 has associated with it a decomposition rule instance object 400 and 402 respectively, linked to the corresponding variable by a DECOMPOSITION-OF relationship (i.e., the GNP-by-continent decomposition rule instance object 400 and the population-by-continent instance object 402). As a result of the decomposition of the GNP variable 428, there is a GNP-North America variable 404, a GNP-Europe variable 406 and a GNP-Asia variable 408. As a result of the decomposition of the population variable 430, there is a population-North America variable 410, a population-Europe variable 412 and a population-Asia variable 414. FIG. 5C further depicts a layered decomposition hierarchy where the Europe variable (as in GNP-Europe 406 and population Europe 412) has been decomposed by another decomposition rule (the associated instance objects of which for GNP is the GNP-Europe by country object 416 and the population EUROPE by country object 418) into several other variables. For the GNP-Europe variable 406, there is a GNP-Europe-UK variable 420 and a GNP-Europe-France variable 422. For population-Europe there is a population-Europe-UK variable 424 and a population-Europe-France variable 426.

Notice that the variables GNP 46 and population 44 have the same decomposition structures, because a full decomposition function was applied to each using the same layered decomposition rule. However, in applying the full decomposition as described above, the proportionality relationship existing between the two variables GNP 46 and population 44 will not ordinarily be promulgated through inheritance to the other variables created through decomposition. However, as shown in FIG. 5C, the model builder module 158 in FIG. 3 can allow that relationship to cascade down through two similar decomposition structures.

Model Building

The model builder module 158 (FIG. 3) provides a method and apparatus that enables a user to quickly build an enterprise model using the object and relationship structures described above. The hierarchical classification scheme 160 of the model primitive branch 162 (FIG. 3) supports the inheritance of attributes. Thus, to create a modeling object, the user specifies that the model builder module 158 create an instance of the object according to one of the primitives under the model primitives. The attributes associated with the specified primitive as well as many of the attributes from primitives above that primitive in the hierarchical classification scheme 160 will be created in the object. The user in addition, has the freedom to specify additional attributes. Thus, a user can quickly specify model building objects. To link the model objects, the user can specify relationships in the object declaration. As the primitives hierarchical classification schemes 160 classify each object, there are specific sets of allowable relationships that can be used between each object. For example a ratio variable would not be related to a level variable by a FLOWS relationship. Accordingly the classification scheme provides a easy and quick way to describe meaningfully the aspects of an enterprise to be modeled. APPENDIX I presents the object frames for the exemplary relationships presented in this invention.

Although the hierarchical classification scheme provides structure for the model builder, it is not a limitation. In the present invention users can specifically create new primitives at any level in the model primitive hierarchy. For example, a user could add primitives under the resource primitive 209 (FIG. 4) to provide subcategories for people, equipment and locations resource objects. Between these new primitives, the users could specify new attribute slots, or not. Because the model builder module 158 (FIG. 3) supports inheritance, the attributes of the resource primitive and the allowable relationships that correspond to it also apply to the sub categories.

The model building model supports other automatic features as well, such as the automatic calculation of related variables when either a PROPORTIONALITY or a PRODUCTIVITY relationship is specified. For example, referring to FIG. 2, there is a PROPORTIONALITY relationship specified between the population variable and the GNP variable. Using the model builder module 158 (FIG. 3) to create the PROPORTIONALITY relationship, the user need only specify a IS PROPORTIONAL relationship between the GNP variable 48 and the population variable 44. The processor 4 (FIG. 1), using the statements of the model builder model 158, would create the ratio variable 47 and establish the NUMERATOR and DENOMINATOR relationships between the variables. In addition, if the population variable 44 and the GNP 46 variable have associated history objects (e.g. 66 and 68) the processor 4 also creates a history object 81 for the ratio variables and fills the object with corresponding part ratio values. Such object generation accrues at each level of a decomposition structure when a user specifies that a relationship between two aggregate variables should cascade to the subset variables, as discussed above with reference to FIG. 4C. Thus the model builder module 158 provides a flexible structure for model building complex systems. The features of this model building module provide the user with a declaration language 34 (FIG. 1) for describing the feature of an enterprise.

Reasoning Methods and Reconciliation

In an exemplary embodiment, the present invention provides reasoning methods that are frequently used by planning analysts. Typical methods include the following:

Determining a projection by building a regression model from historical data;
Determining a projection based on decomposed data by reasoning either in a "bottom-up" or "top-down" fashion over a structural model;
Determining a projection by applying the conservation of flow principle;
Reasoning from productivity considerations;
Reasoning based on proportions;
Finding an expert opinion and accepting it;
Finding a plan and using it as a prediction;
Finding a goal, accepting it as achieved and determining the implications of it being achieved on related variables;

Using causal knowledge to build a causal model.

Each reasoning method acts upon a variable to form a projection. Some reasoning methods in their application require a value for other variables. For example in FIG. 2, to project a value for the resource-employees variable 52, using a productivity reasoning method, the values of the productivity variable 122, and the product built variable 54 must be determined. Sub-problems for these variables would be generated in the present invention to obtain values for other related variables. The applicability of a reasoning method to a sub-problem, if it succeeds in solving a problem, will generate an intermediate hypothesis. These intermediate hypotheses are reconciled to form a final hypotheses for the projection problem. Each intermediate hypothesis contains characteristic data that serve as the basis for pruning or selecting hypotheses in reconciliation. The characteristics include the reasoning methods that generated the intermediate hypotheses, the premises or argument value to which the reasoning method was applied and other characteristics that permit the reconciliation procedure described below to prune intermediate hypotheses to determine a single projection from many competing intermediate projections. Reconciliation is needed each time a sub-problem is solved. In dealing with large interrelated knowledge bases, many thousands of reconciliations will take place in solving a scenario. The strategy for dealing with reconciliation is to view the decision as a multi-criteria decision, based on dimensions of intermediate hypothesis quality.

An exemplary embodiment of the invention provides for a reconciliation method using some of the subjective criteria implicitly used by planning managers, such as:

1. Greatest truth as measured by the ratio of the number of axiomatically true premises to the total number of premises;
2. Greatest causality as measured by the total number of causal arguments in the tree of support;
3. Best quality estimates as measured by the sum of total axiomatically true premises plus the product of the quality of estimated premises by the number of estimated premises and divided by the total number of premises;
4. Greatest detail (i.e. the total number of premises);
5. Most recent statements (All opinions, goals and plans are dated). Statements that are older than a threshold such as 6 months from the most recent statement, are discarded.

As each reasoning method is successively applied, the processor 4 will store information concerning the reasoning methods quality factors as will be described below. The applicability of each reasoning method is determined by the configuration of the network of objects that make up the enterprise model. It is the ability to apply multiple reasoning methods in parallel and the ability to reconcile competing intermediate answers that enables the system to be self structuring. These abilities allow the system to determine which parts of an enterprise model ultimately get applied or discarded in making projections. Each of the reasoning methods have different data requirements or applicability conditions that must be satisfied before the method can be applied.

The discussion to follow outlines the general procedure of each method and a statement of its applicability conditions.

The objects in the knowledge base 20 containing data on each reasoning method are grouped in the control primitive branch of 166 of the hierarchical classification scheme 160 (FIG. 3). In a exemplary embodiment, a reasoning method primitive object has the following frame:

```
REASONING METHOD
  IS-A:         CONTROL PRIMITIVE
  IS-A+INV:     HISTORICAL TREND ANALYSIS
                ACCEPT A PLAN
                USE OPINIONS
                ASSUME A GOAL IS ACHIEVED
                PRODUCTIVITY ANALYSIS
                PROPORTIONAL ANALYSIS
                CONSERVATION OF FLOW
                AGGREGATION
                CAUSAL REASONING
  COMPUTATIONAL-COST:
  CAUSALLY-JUSTIFIED:
  PROOF-VALUE:
  EXPLANATION:
  PROCEDURE:
  EVIDENCE-REQUIRED:
```

The attributes are inherited to each reasoning method information object by the two directional IS-A relationship.

As can be seen, the reasoning method primitive object (and through inheritance each reasoning method) has many features including an EVIDENCE REQUIRED slot, which lists a procedure that is to be called to test the applicability of that reasoning method, (the EVIDENCE-REQUIRED slot), a PROCEDURE slot referencing a computer program module for executing the method (the ATTACHED-PROCEDURE slot), and an attached procedure used in creating and explanation in the intermediate hypotheses for particular application of the reasoning method (the EXPLANATION slot).

The applicability test is based on examining the enterprise model to see if the relationship structure around the variable being considered matches the template specified in the required evidence procedure. In addition to information on the applicability conditions, the reasoning method contains a computational-cost slot to indicate whether the application of the reasoning method is local or expansive. A reasoning method is either expansive in terms of problem solving or else local. By expansive is meant that sub-problems are generated through the application of the method. Local methods do not generate sub-problems, but merely use data directly related to the variables being considered. Local methods are inexpensive to apply and therefore will be the first methods applied by the architecture in tackling any problem. In addition, each reasoning method provides several slots, which provide, for reconciliation purposes, information on the quality and proof value of the reasoning method. This is used in constructing the intermediate hypotheses quality values described above. One such indication is whether a reasoning method provides a causal basis for its projection (i.e. whether the projection is causally based). In reconciliation, causally justified projections are considered to have an additional value over non-causal reasoning methods, because with causal methods, the causal reasoning can be provided to the user, thus providing extra credibility in the analysis. Thus, for reconciliation purposes, each reasoning method has an indicator of whether it is or is not a causally justified method. Reasoning based on productivity and reasoning from a causal model are described by the system as causally justified methods. Other methods are not.

Another reasoning method quality attribute appears in the proof value slot. Each method either produces an estimate or a statement of fact. Axiomatic statements such as goals, plans and asserted assumption are taken as fact. All other methods generate estimates. The proof-value slot indicates whether the reasoning method provides an axiomatic truth value or an estimate. In reconciliation, hypotheses based on axiomatic truths are valued more highly than estimates.

The discussion to follow now provides an overview of each reasoning method.

Historical Trend Analysis

Historical trend analysis provides projections based on any historical data associated with a variable. The applicability conditions for this variable specify that the variable in question has a history object associated with it by a HAS HISTORY relationship and that the associated history object contains at least five data points. FIG. 6A depicts template conditions where a variable 200, has a history object 202 associated with it by a HAS HISTORY relationship. Historical trend analysis is achieved by applying weighted regression analysis techniques on the historical data. In the present invention, different types of regression techniques are used, such as linear, weighted linear, exponential, power model with an offset, and logarithmic regression. The application of historical trend analysis provides a projection for a variable and a goodness of fit metric value, which can be used during reconciliation in evaluating the strength of the intermediate hypothesis. In an exemplary embodiment, the reasoning method object for historical trend analysis has the following frame:

```
HISTORICAL TREND ANALYSIS
  IS-A: REASONING METHOD
  COMPUTATIONAL-COST: LOCAL
  CAUSALLY-JUSTIFIED: NIL
  PROOF-VALUE: ESTIMATE
  EXPLANATION: EXPLAIN-HISTORY
  PROCEDURE: HISTORY-PROC
  EVIDENCE-REQUIRED: HAS HISTORY
  MINIMUM-NUMBER-OF-DATA-POINTS-NEEDED: 5
```

The attribute slots indicate that this reasoning method is a local, non-causal, estimating method.

Reasoning From Productivity

Reasoning from productivity is concerned with the relationship between the input and output of an organization. To determine what resources are needed, the system considers the required output as well as the output per resource. The applicability conditions for the reasoning methods are depicted by the model fragment in FIG. 6B. In that figure, a resource variable, employee headcount 204 is owned by an organization, (represented by the Truck Inc. variable 206) and is used in the production of an output variable 208. Between the employee headcount variable 204 and the organization object, Truck Inc. 206, there is a two-directional RESOURCE relationship. Between the organization object 206 and the output variable 208, there is a PRODUCES relationship. When such a relationship configuration is specified, during model building, the model builder module 158, will create a productivity variable 210 to express productivity as a ratio of output per unit of resource. To link that productivity variable 210, the processor 4 (FIG. 1) also creates a HAS PRODUCTIVITY relationship between the employee head count variable 204 and the productivity variable 210 as well as a PRODUCTIVITY IN PRODUCING relationship between the output variable 208 and the productivity variable 210. When the processor 4 encounters such a configuration, the productivity reasoning method applies. The productivity reasoning method can project values for the employee headcount variable 204, the productivity variable 210 and the output variable 208. In an exemplary embodiment, productivity analysis has the following reasoning method object frame:

```
PRODUCTIVITY ANALYSIS
   IS-A: REASONING METHOD
   COMPUTATIONAL-COST: EXPANSIVE
   CAUSALLY-JUSTIFIED: T
   PROOF-VALUE: EXPLAIN-PRODUCTIVITY
   PROCEDURE: PRODUCTIVITY-PROC
   EVIDENCE-REQUIRED: PRODUCES
```

The frame provides that this is a expansive, causal, estimating method.

Conservation of Flow Analysis

This reasoning method executes by enforcing a conservation of flow relationship between connected flow variables and level variables, the idea being that where a flow variable flows directly into other flows, the sum of all inflows is equal to the sum of all outflows.

The template model structure which satisfies the applicability conditions for conservation of flow analysis is depicted in FIG. 6C. For example, the output of an enterprise (represented by an output flow variable 122) flows into inventory (represented by an inventory level variable 124). In turn, inventory flows out into various categories such as shipments (represented by a shipments flow variable 126), field services use (represented by the field-service flow variable 128) and products for internal-needs (represented by the internal needs flow variable 130). In FIG. 2, the applicability conditions for a conservation of flow reasoning method was satisfied by the model configuration, where the products built variable 54 is related to the inventory level variable 56 by a FLOW relationship and the inventory level variable 56 is related to the revenue flow variable 40 by a FLOW relationship.

In an exemplary embodiment, the reasoning method object has the following frame:

```
{{CONSERVATION OF FLOW
   IS-A: REASONING METHOD
   COMPUTATIONAL-COST: EXPANSIVE
   CAUSALLY-JUSTIFIED: NIL
   PROOF-VALUE: ESTIMATE
   EXPLANATION: EXPLAIN-FLOW
   PROCEDURE: FLOW-PROC
   EVIDENCE-REQUIRED: HAS FLOW}}
```

This indicates that the conservation of flow reasoning method is an expansive, non-causal estimating method.

Proportionality Reasoning

Proportionality reasoning works on the basis that one variable is proportional to another. If the value of one variable and the proportionality relationship are known, a value for the other variable in the proportionality relationship can be generated. The model template for the applicability of the proportionality reasoning method is depicted in FIG. 6D. In that figure, a revenue variable 132 is associated by a PROPORTIONALITY relationship to an available market variable 136. As described above, when a proportional relationship is established, the model builder module 158 (FIG. 3) provides a ratio variable object 134 and establishes appropriate NUMERATOR and DENOMINATOR relationships between it and the other variables 132, 136. Thus, the proportionality reasoning method applies when a PROPORTIONALITY relationship is declared by a user between two variables. Referring to FIG. 2, there are many PROPORTIONALITY relationships depicted, such as between the revenue variable 40 and the target market variable 50. In an exemplary embodiment, the reasoning method object for the productivity reasoning method has the following frame:

```
{{PROPORTIONAL ANALYSIS
   IS-A: REASONING METHOD
   COMPUTATIONAL-COST: EXPANSIVE
   CAUSALLY-JUSTIFIED: NIL
   PROOF-VALUE: ESTIMATE
   EXPLANATION: EXPLAIN-PROPORTION
   PROCEDURE: PROPORTIONAL-PROC
   EVIDENCE REQUIRED: PROPORTIONAL-TO-
     SOMETHING}}
```

As can be seen, the attribute slots indicate that this is an expansive, non-causal, estimating reasoning method.

Causal Reasoning Method

The causal reasoning method creates variable projections based on the effects of programs or variables. The applicability conditions for the causal reasoning method is depicted in FIG. 6E, where two program objects 140, 144 and their corresponding effect objects 142, 146 are shown to be acting upon a variable 148. In applying this reasoning method, the system will create an intermediate hypothesis for each program acting upon the variable, reconciling the results. In FIG. 2 the model fragment depicts three programs that are affecting three different variables; the retirement incentive program 94 will act to accelerate the attrition rate; the price discount program 98 will act to augment the market share for the enterprise; and the technology investment program 90 will have an impact on the worker's productivity. In an exemplary embodiment, the reasoning method has the following information stored in its reasoning method object frame:

```
{{CAUSAL REASONING
   IS-A: REASONING METHOD
   COMPUTATIONAL-COST: LOCAL
   CAUSALLY-JUSTIFIED: T
   PROOF-VALUE: T
   EXPLANATION: EXPLAIN-CAUSALITY
   PROCEDURE: CAUSAL-PROC
   EVIDENCE-REQUIRED: IS AFFECTED BY}}
```

As can be seen the attributes indicate that causal reasoning is a local, causal, axiomatic method.

Reasoning with Statements:
   Find an expert opinion and accept it
   Find a goal and assume it as achieved
   Find a plan and use it as a projection Statements include opinions, plans and goals which come from many sources, reference documents, hired experts and even the user. Such statements can provide a significant part of the planning context for the user of the system.

According to the method of the present invention, all data contained in accredited goal, opinion and plan objects are treated as axiomatic facts. An opinion, plan or goal is accredited where it is related to a knowledge source object. Goals, opinions and plans can be associated with any variable. The effect that an opinion goal or plan has on the projected value for a variable will, in turn, affect other related variables.

More than one statement, such as an opinion, may be attached to a variable. Each statement results in a separate intermediate hypothesis and all are evaluated in the reconciliation process. Thus, the system supports contradictory opinions in making a variable projection. As all statements are considered to be axiomatic equally, the reconciliation process looks to other factors beyond the proof values such as the date of the opinion (with the latest being most valuable), to solve conflicts.

The method and apparatus of the present invention allows for statements such as opinions, plans and goals to be represented either as a particular value, as changing at a particular rate, or as changing by a particular step amount, for each time interval over the planning horizon.

The architecture also allows the user to interact with the system in the assertion or negation of any statement that describes the behavior of various parts of the model.

The reasoning method objects and execution procedures for plans, opinions and goals are all similar. In an exemplary embodiment, the reasoning method object for the plan reasoning method has the following frame:

---
USE PLANS
 IS-A: REASONING METHOD
 COMPUTATIONAL-COST: LOCAL
 CAUSALLY-JUSTIFIED: NIL
 PROOF-VALUE: T
 EXPLANATION: EXPLAIN-THE-STATEMENT
 PROCEDURE: USE-ALL-PLANS
 EVIDENCE-REQUIRED: HAS PLAN
---

This indicates that the reasoning with the statement objects is a local, non-causal, axiomatic method.

Reasoning "Top-down" or "Bottom-up"

This reasoning method pertains to projections on variables having a decomposition. As described above, a variable can be decomposed into constituent subsets, such as an enterprise revenue variable being split into subsets decomposed by geographic location or by business unit. Where a variable has been decomposed, moving down a compositional tree will produce more detailed arguments, while moving up will provide more aggregate arguments. Modeling the manufacturing process in detail may increase accuracy, provided plausible premises can be found at the more detailed level. However, aggregate historical trends are perceived by planners to be more predictable than detailed trends. Moreover, complete data for the set of all decomposed variables is often unavailable at a detailed level. As has been pointed out, reasoning can take place in either direction over the aggregational relationships. The decision of whether to reason "bottom-up" or "top-down" is determined by the control module 150 (FIG. 3). The architecture tries to use the "best" information. If better information is available at the detailed level, then the system will reason bottom-up. If better information is available at the aggregate level, the system will reason top-down.

In the case of level variables, this reasoning method executes on the basis that summation over subsets must equal the aggregate. In cases where one is dealing with aggregate representations of "flow" variables, then aggregation proceeds on the basis of summation over subsets while deducting for flows between members of the same set. Consider, for example, inventory at two plants. Inventory is considered a level variable. To treat the two plants as one in aggregate means that total inventory is merely the sum of the two plant inventories. On the other hand, shipments is considered a flow variable. Total shipments is not the sum of shipments from the individual plants. Rather, it is the sum of shipments from the two plants less any shipments between the two plants.

In an exemplary embodiment the aggregation/disaggregation reasoning method object has the following frame:

---
AGGREGATION/DISAGGREGATION
 IS-A: REASONING METHOD
 COMPUTATIONAL-COST: EXPANSIVE
 CAUSALLY-JUSTIFIED: NIL
 PROOF-VALUE: ESTIMATE
 EXPLANATION: EXPLAIN-AGGREGATION
 PROCEDURE: AGGREGATION-PROC
 EVIDENCE-REQUIRED: HAS DECOMPOSITION
---

The attributes indicate that this is an expansive, non-causal estimating reasoning method.

The Control Module

The processor 4 uses the statements in the control module 150 to perform projection analysis, using multiple reasoning methods. As stated above, the control strategy is model-based, as it is the structure of the enterprise model that guides the system on its path towards a solution.

FIG. 7 provides an overview of the flow of control of the control module. In step 500, the processor 4, using the statements of the control module 150, accepts as input a user query for a variable projection. The user query asks the system to project a future value for a variable modeled over the planning horizon. In a query, a user can specify one variable or a number of variables, using the user focus primitives. If the user indicates that he or she wishes to do projections on a collection of variables, then the system retrieves a list of objects that are sub-categories of the user focus primitive 205 (FIG. 4). The user chooses one collection from this list. (These collections correspond to a particular dimension of decomposition, such as European variables grouped under the Europe subset object 310 in FIG. 5A). Once one is selected, e.g. Europe, then all variables which share that dimension of decomposition are identified. This is done easily since all such variables are associated during the application of the decomposition rule with the dimension of decomposition by a HAS-OBJECT-/HAS FOCUS relationship pair. The list of variables that this results in (e.g. Europe-Populaiton, Europe-GNP) are all put in a list to be individually projected, as per the main control algorithm.

Having accepted a user query, the processor 4 proceeds to step 502, where it creates a root problem object and associates with it the variable to be projected. As stated above, the process of solving a variable projection problem is similar to constructing an argument which supports a conclusion. To construct this argument, the present invention maps the solution path taken, by building a problem solution tree, using a set of objects and relationships as it solves the problem. The problem solution tree provides explicit representation of the problems, sub-problems, reasoning methods applied, intermediate hypotheses, and final hypotheses, generated in arriving at a solution. The root problem object created in step 502 is the root node of this problem solution tree. Objects in the problem solution tree are connected, using relationships, with objects in the enterprise model. These connections provide the user with an integrated knowledge base. The root problem object, in step 502, is connected to the variable to be projected in the enterprise model. The procedure in step 502 of creating a problem frame is described in further detail below with reference to FIG. 8A.

With the root problem object created in step 502, the processor 4 proceeds to step 504, where the processor 4 creates and solves, in recursive fashion, sub-problems created by a temporal decomposition of the root problem object. Temporal decomposition of the root problem proceeds as follows. If, for example, an employee headcount variable was being projected to the end of a five year planning horizon, the processor begins by creating a sub-problem to project the employee headcount variable to the end of a few year planning horizon. Before solving that problem, however, the processor 4 recursively creates a sub-problem, projecting the employee headcount variable to the end of three years. This recursive sub-problem creation continues until there is a projection created to project the variable to the end of a designated base projection year. The recursive function of step 504 will bottom out at the base year, and the processor 4 will proceed to solve that problem. This sub-problem becomes the current focus for the processor 4. In creating temporally decomposed sub-problems, each sub-problem is related to each other, to the problem, and to the variable projected by a series of relationships. The process of temporal decomposition of the root problem is discussed in more detail below with reference to FIG. 8A.

To solve the problem of current focus (i.e. the temporal sub-problem on which the recursive procedure has bottomed out), the processor 4 proceeds to step 506 and identifies a list of potential reasoning methods that can be used to create a projection. As the control strategy is model-based, the processor 4 looks to the enterprise model and the relationship configuration surrounding the variable of current focus to determine which reasoning methods will apply. As described above with reference to FIGS. 6A–E, the reasoning method objects in the knowledge base 20 reference an attached procedure to determine which the processor 4 will use in the enterprise model. In step 506, a list of applicable reasoning methods is created. The process of determining applicable reasoning methods is discussed in detail below with reference to FIG. 8B.

Proceeding to step 508, the processor 4 will order the reasoning methods to be applied. As described above, reasoning methods are classified in terms of problem solving as being either expansive or local. To determine the projection of one variable, expansive methods require projected values for other variables. Hence, the application of such a method generates sub-problems to determine, in recursive fashion, the values of the other variables needed to apply the expansive reasoning method. Moreover, in generating sub-problems, it is possible that an expansive method could encounter either a long loop or short circuit. Long loops and short circuits are indicative of special circumstances where the chain of sub-problems created through the application of expansive reasoning methods leads to a sub-problem which calls for the solution of the original problem. Dealing with such expansive methods can be computationally expensive and can lead to abortive reasoning attempts, because of looping.

Local methods, on the other hand, do not create sub-problems. In application, they always generate an intermediate hypothesis. In the present invention, local reasoning methods are always applied before expansive methods. Having ordered the reasoning methods to be applied, the processor 4, in step 508, begins a loop to apply local reasoning methods first, before expansive methods. Proceeding to step 512, the processor 4 determines whether the reasoning method is expansive or local. If the method is local, the processor 4 invokes the reasoning method module and creates a value projection that is stored in an intermediate hypothesis object that is attached to the problem of current focus. An example of such an application of a local method is described in detail with reference to FIG. 8C.

Having executed the local reasoning method, the processor 4 returns to step 510 to retrieve another applicable reasoning method and apply it.

Referring again to step 512, if the applicable reasoning method is expansive (i.e. meaning that all local reasoning methods have been applied), the processor 4 proceeds to step 514 to execute the procedure. As defined above, the variable of focus depends on values for other variables. Thus, the application of an expansive method takes the focus of attention away from the variable currently being examined. The focus goes toward related variables. Sub-problems for these variables are created. However, before the problems are solved, the sub-problem path is checked for long loops and short circuits. A short circuit exists where "problem-A" is an immediate sub-problem of "problem-B" which in turn is an immediate sub-problem of "problem-A". If a short circuit exists, the processor 4 (FIG. 1) then determines in which direction reasoning should proceed. The strategy is to compare "problem-A" with "problem-B" using the reconciliation process to see which has the best intermediate hypothesis generated thus far. If A is "better" than B, then the reasoning method will be applied in reasoning from A to B, but not from B to A. If B is better than A, the opposite direction of reasoning, from B to A, is best. The choice of which variable to solve first is made on the basis of identifying those sub-problems which are part of circuits in the sub-problem tree. These circuits arise quite naturally, because it is always possible to reason in both directions over relationships in the enterprise model. For instance, the system can use the variable "headcount" as a premise in determining "productivity" or alternatively may use "productivity" as a premise in determining "headcount". Once a "short circuit" is identified, the system attempts to determine in which direction over the relationship should inference take place. This decision is based on an interim reconciliation or mini-conflict resolution process that attempts to determine on which side of the relationship the best information lies.

A long loop represents a situation where the system is trying to solve for a value of a variable, and, in trying to solve that problem, the system finds it would be forced to use that value before it had the chance to find it. A long loop circuit is similar to a short circuit, except that the requirement for each sub-problem to be an immediate sub-problem of the other does not apply. In this situation, the system aborts its attempt to apply the reasoning method, thus avoiding the lurking infinite loop.

Once processor 4, in step 514, determines whether the expansive reasoning method is not halted either by a long loop or a short circuit, it recursively attempts to solve all the sub-problems generated by the expansive reasoning method, and waits for the system to return with a final value for each of those sub-problems. These recursive calls will eventually bottom out and return to the current focus. In Step 515, the processor 4 uses the final hypotheses of each sub-problem to create a value for the problem in focus. That value, along with an explanation of the processes applied, and other information concerning the qualities of the variables analyses involved is stored in an intermediate hypothesis object. However, the processor 4 will also link (through a two-directional DEPENDS-ON/SUPPORTS relationship) the final hypotheses of the sub-problems to the intermediate hypothesis for the focus problem. The procedure for applying an expansive reasoning method, checking for long loops, checking for short circuits and creating an intermediate hypothesis is discussed below with reference to FIGS. 8D-8G.

Having applied the expansive reasoning method in step 514, the processor 4 proceeds to step 510 to apply the next reasoning method. If in step 510, there are no more reasoning methods to apply, the processor 4 will proceed to step 516 to reconcile each set of intermediate hypotheses to create a final hypothesis for the sub-problem of focus. As each intermediate hypothesis contains a different estimate value, the set is deemed to be a conflict set; the reconciliation process is the process of pruning this conflict set to one hypothesis which is then considered to be a final hypothesis for that sub-problem.

As described above, the reconciliation rules adopted in the exemplary embodiment (greatest truth, greatest causality, best quality estimates, greatest detail and most recent statement) provide the system with the capability to decide among competing hypotheses based on the quality characteristics of the hypotheses. Each of the reconciliation rules focuses on different attribute qualities stored in the intermediate hypotheses objects.

In step 516, the processor 4 searches the knowledge base 20 and identifies a set of active reconciliation rules and orders them according to declared procedure parameters, explicit in the knowledge base 20.

Once the rules are ordered in step 516, the processor 4 proceeds to step 518, to apply each reconciliation rule in order of procedure, searching for one intermediate hypothesis that best satisfies the success criteria of the reconciliation rule—pruning the other intermediate hypotheses. When all but one of the hypotheses are pruned, the processor 4 proceeds to step 520 and generates a final hypothesis for the sub-problem. In the case where more than one intermediate hypotheses exists after the pruning process, the results are averaged, or the system defers to the user. Once a final hypothesis is generated, the processor 4 proceeds to step 522, bottoming out in the recursive loop to project the sub-problems created through temporal decomposition. Next, the processor 4 returns to step 504 to proceed with the solution of a later sub-problem. In some cases, the intermediate hypotheses and final hypotheses can be re-used in the solution of the next sub-problem. If in step 522, there is no more temporal sister sub-problems to solve, the processor 4 returns, in step 520, to the user the final hypothesis found as the final answer. The following [Appendix II] provides a exemplary output report which the system generates in outputting to the user a final hypothesis.

| YEAR | Sample Output Report Projection of mfg headcount | EXPLANATION |
|---|---|---|
| 88 | 13,221 | actual |
| 89 | 13,159 | actual |
| 90 | 12,000 | |

Based on the criterion of greatest truth, the following evidence was chosen,
    effects on mfg headcount of redeployment scheme.
The following evidence was ignored
    14 years historical data interpreted by a linear model transformed into a weighted linear regression model.
The R squared goodness of fit measure is 0.717823.

| | | |
|---|---|---|
| 91 | 11,000 | ′ ′ |
| 92 | 10,574 | |

Based on the criterion of greatest truth, the following evidence was chosen,
    mfg headcount product revenue productivity in producing product revenue
The following evidence was ignored
    summation over the following subsets
        office mfg headcount
        plant mfg headcount to yield mfg headcount
    summation over the following subsets
        Europe mfg headcount
        Row mfg headcount
        US mfg headcount to yield mfg headcount
    14 years historical data interpreted by a linear model transformed into a weighted linear regression model.
The R squared goodness of fit measure is 0.711823.

The problem solution tree created during this process contains the entire solution path from initial problem to final solutions. The tree can also be viewed by the user to provide an explanation of reasoning methods selected, projection values created, reasoning methods and solutions discarded.

Aspects of the procedure of the control module will now be presented below.

Creating the Root Problem Object

FIG. 8A depicts the object and relationship structuring that occurs, in creating a root problem object, as in step 502 of FIG. 7. Referring to FIG. 8A, a root problem object 550, created after a user specifies a query, is the anchor of the problem solution tree for a variable projection problem. In the hierarchical classification scheme 160 (FIG. 3) of the present invention, the root problem object 550 is stored under a root problem primitive 552 in the problem solution branch 168 of the hierarchical classification scheme 160 (FIG. 3). A two-directional IS-A relationship promotes that association. In an exemplary embodiment, the root problem object 550 has the following frame:

```
{{ROOT PROBLEM-FY94-ENTERPRISE HEADCOUNT
   IS-A                          : ROOT PROBLEM
   HAS-SUBJECT                   : ENTERPRISE-
                                   HEADCOUNT
   YEAR                          : 1994
   STATUS                        :
UNSOLVED
   PRUNED-OR-UNSOLVABLE-         : NIL
      REASONING METHODS
   TRIED-APPLICABLE              : NIL
      REASONING METHODS
   UNTRIED-APPLICABLE            : NIL
      REASONING METHODS
   HAS-INTERMEDIATE              : NIL
      HYPOTHESIS
   HAS-FINAL HYPOTHESIS          : NIL}}
```

The frame indicates that this is a root problem object 550, and it contains information about the user problem. As can be seen, a HAS-SUBJECT slot indicates that an enterprise headcount variable was selected for projection by the user's query. The YEAR slot shows the planning horizon: 1994. That horizon value is executed by the processor 4, during the process step of creating a problem frame (step 502, FIG. 7). The problem solving framework object 225 in the knowledge base 20 contains a base year and a number, which is the planning horizon. By adding the planning horizon value to the base planning year, the horizon is created and is stored in the YEAR slot. The STATUS slot shows that the planning problem is yet unsolved.

The three remaining slots in the problem frame will contain information on the application of the reason methods: a PRUNED-OR-UNSOLVABLE-REASONING METHOD slot, a TRIED-APPLICABLE-REASONING-METHOD-SLOT and an UNTRIED-APPLICABLE-REASONING-METHOD slot. An UNTRIED-APPLICABLE-REASONING-METHOD slot contains the list of applicable reasoning method before they are applied. When a reasoning method is successfully applied, reference to it is stored in the TRIED-APPLICABLE-REASONING-METHOD slot. When a reference reasoning method is discarded, through long loops, or short circuits a reference is listed in the PRUNED-OR-UNSOLVABLE REASONING METHOD slot. In addition, the root problem object 550 is also associated by a two-directional HAS PLANNING PROBLEM/HAS-SUBJECT relationship to a resource variable, employee headcount 554. Once the root problem frame and its relationships are created the processor 4 proceeds to other steps of the control again. Referring to FIG. 7, the processor 4 in step 504 proceeds to temporally decompose the root problem into sub-problems.

Temporal Decomposition of the Problem

FIG. 8A also depicts the creation of temporal sub-problems from the root problem. Temporal decomposition is the process of taking the root problem and recursively breaking apart the problem across time, creating a sub-problem for each year from the base year to the final year of the planning horizon, and then projecting values for these sub-problems year by year. In FIG. 8A, the planning problem is to estimate the value for the employee headcount variable until 1994. Accordingly, there are three sub-problems created through temporal decomposition. There is a fiscal-year-1993-sub-problem 556, a fiscal-year-1992-sub-problem 558 and a fiscal-year-1991-sub-problem 560. In an exemplary embodiment, the sub-problem objects would have a frame such as the following:

```
{{SP FY91 ENTERPRISE HEADCOUNT
   IS-A                       : SUB PROBLEM
   STATUS                     : NIL
   PRUNED-OR-UNSOLVABLE       :
      PERSPECTIVES
   TRIED-APPLICABLE-          : HISTORICAL
      PERSPECTIVES
REASONING
   UNTRIED-APPLICABLE-        : NIL
      PERSPECTIVES
   YEAR                         91
   HAS-SUBJECT                : ENTERPRISE
                                HEADCOUNT
   HAS-INTERMEDIATE HYPO-     : NIL
      THESIS
   HAS-FINAL HYPOTHESIS       : NIL}}
```

Notice that the fiscal-year-1993 sub-problem 556 is linked to the root problem object 550 by a two directional HAS-SUB-PROBLEM/SUB-PROBLEM OF relationship. Each of the other sub-problems, in turn is linked to the immediately preceding sub-problem. However, each temporary sub-problem generated 556, 558 and 560 is linked to the employee-headcount variable 554 by a two directional HAS PLANNING PROBLEM/HAS SUBSET relationship. Each is also linked to a sub-problem primitive 562, used for categorization, by an IS-A relationship. The recursive procedure of step 504 (FIG. 7) will create a sub-problem and then recursively call itself until the sub-problem for the base year is reached. (i.e., as in sub-problem 560.) With the base year reached, the processor 4 calls for the solution of that sub-problem, and that sub-problem becomes the current focus. Sometimes, after previous executions of the control module 150 (FIG. 5) or during the recursive solution of an expansive reasoning method, a value may have already been found for a temporary decomposition sub-problem. In such a case, the processor 4, will recursively bottom out at that temporal decomposition and attempt to project values for the sub-problems that do not have an answer.

Identifying Applicable Reasoning Methods

In step 508 of FIG. 7, the processor 4 uses the model structure surrounding a variable of focus to determine a list of reasoning methods applicable for a projection.

As stated above, the present invention has a variety of reasoning methods available to it, which it may apply to any sub-problem.

Thus, to determine applicability, the processor 4 will examine the applicability conditions of each reasoning method and attempt to match them against the model structure surrounding the variable that is the current focus. FIG. 8B depicts the set of objects and relationships surrounding the employee headcount variables. The structure depicted also shows an example of the applicability conditions for each of the reasoning methods, as were also previously discussed with reference to FIGS. 6A–E. In FIG. 8B, an employee headcount history object 580 stores historical values for the employees headcount variable 554, and is related to that variable (employee headcount) by a two directional HAS-HISTORY/HISTORY OF relationship. As described above, so long as the employee history object 580 contains a requisite number of instances of past values, the applicability conditions for historical trend analysis will apply.

Statement data are also associated with the enterprise headcount variables 554. A headcount opinion object 581 is associated to the enterprise headcount variable 554 by a two-directional SUBJECT OF OPINION/IS AN OPINION FOR relationship. A headcount goal object 582 is associated with the enterprise headcount variable 554 by a two-directional HAS GOAL/GOAL FOR relationship. A headcount plan object 584 is associated with the enterprise headcount variable 554 by a two directional HAS PLAN relationship. Each of these object/relationship configurations is an instance where the method of reasoning by adopting a statement as true could apply. After checking the relationship links of the enterprise headcount variable 554 for the required STATEMENT relationship, the processor 4 must also check information in each of the statement objects 581, 582, 584 to determine two additional facts. First, the ACCEPTANCE slot in the statement objects must be on. As described above, the present invention permits users to perform what-if analysis by activating or deactivating statement variables in the model. Assume in the present example that all three statements objects 581, 582, 584 are active. The second additional applicability condition is that one of the data instances contained in each statement object must correspond to the current year in focus. In the present example, the year in question of the sub-problem is Fiscal Year 1991. To be relevant, the statement objects each must have an instance for that year. If so, then these reasoning methods, find-an-expert-opinion-and-accept-it, find-a-plan-and-use-it, and find-a-goal-and-accept-it-as-achieved would all apply.

In the present example of FIG. 8B, the enterprise headcount variable 554 is also associated through a PROPORTIONALITY relationship to an attrition rate variable 596. There is also an attrition ratio variable 586, used to show the PROPORTIONALITY relationship expressed as a ratio of the two variables. The attrition ratio variable 586 is linked to the enterprise headcount variable 554 by a NUMERATOR OF relationship. Such a structure alone satisfies the applicability conditions for the proportionality reasoning methods and the processor 4 will find that it applies.

The enterprise headcount variable 554 is also associated with a widget-built variable 588 through a set of PRODUCTIVITY relationships. Enterprise headcount is a resource of an organization, represented by an enterprise object 590. The enterprise object 590 specifies that the enterprise produces widgets. Further a productivity variable 592 links the enterprise headcount variable 554 to the widgets built variable 588 by a HAS PRODUCTIVITY relationship. The widget build variable 588 is linked to the productivity variable 592 by the PRODUCTIVITY IN PRODUCING relationship. Such a structure provides the basis for applying the productivity reasoning method. The processor 4 stores productivity analysis as an applicable reasoning method.

The applicability conditions for the conservation of flow reasoning method are met when the variable that is the current focus has a FLOWS relationship to another variable. In FIG. 8B that configuration is present, where a new hiring variable 594 flows into the enterprise headcount variable 554, enterprise headcount flows into an attrition variable 596.

The reasoning by best evidence method applies, when a variable has a decomposition structure. In FIG. 8B, there are two decompositions. The employees headcount variable has two decompositions: by geographic location 598 and by primary business unit (PBU) 596. Thus, in the present example, reasoning "bottom-up" is applicable two times. In one instance the focus of the reasoning method will be reasoning by geography, the other by PBU.

The causal reasoning method is applicable when the variable in focus has an IS AFFECTED BY relationship established to an effect object. In FIG. 8B, a redeployment object 600 is connected to the employee headcount variable 554 by a HAS EFFECT ON/IS AFFECTED BY relationship.

Applying a Local Reasoning Method

Referring to FIG. 7, once the reasoning methods that will apply in solving for a variable are identified in step 506, the processor 4, orders the reasoning methods. As mentioned above, local methods are applied first, then expansive methods. The ordered list is then placed in the UNTRIED-APPLICABLE-REASONING METHOD slot of the sub-problem object. When the ordered list is stored, the processor 4 proceeds in step 510 to begin applying the reasoning methods.

The following is a description of the process flow for each of the reasoning methods:

Reasoning From History
1. Check if regression model is generated, if not generate regression model.
    1A. Find type of trend type
    1B. Retrieve History and prepare a matrix 2 by n matrix storing YEAR-VALUE couples for each of n years
    1C. Calculate alpha and beta and Goodness-of-fit parameters of the appropriate regression mode.
2. Project using the regression model a value for the year in question.
3. Create an intermediate hypothesis presenting this solution.

Reasoning from plan
1. Find the value in the plan for the variable for the year in question.
2. Crete an intermediate hypothesis presenting this solution.

Note there may be multiple plans applicable to the same variable. These will have been identified in the testing of applicability and the reasoning from a plan will be called from each one of the applicable plans.

Reasoning from an opinion
1. Find the value in the opinion for the variable for the year in question.
2. Create an intermediate hypothesis presenting this solution.

Note there may be multiple plans applicable to the same variable. These will have been identified in the testing of applicability and the reasoning from a opinion will be called from each one of the applicable opinions.

Reasoning from a goal
1. Find the value in the goal for the variable for the year in question.
2. Create an intermediate hypothesis presenting this solution.

Note there may be multiple plans applicable to the same variable. These will have been identified in the testing of applicability and the reasoning from a goal will be called from each one of the applicable goals.

Reasoning from a programme
1. Find the value in the effect of a programme on the variable for the year in question.
2. Create an intermediate hypothesis presenting this solution.

Note there may be multiple programmes applicable to the same variable. These will have been identified in the testing of applicability and the causal-reasoning will be called from each one of the applicable programmes.

Productivity Reasoning
1a. Is the variable in question a sub-category of RE-SOURCE, then call PRODUCTIVITY-DERIVED-RESOURCE.
1b. Is the variable in question a sub-category of PRODUCTIVITY, then call PRODUCTIVITY-DERIVED-PRODUCTIVITY.

Note there may be multiple productivities applicable to the same variable. These will have been identified in the testing of applicability and the productivity-reasoning will be called from each one of the applicable productivity measures.

2a. PRODUCTIVITY-DERIVED-RESOURCE.

Create a SUB-PROBLEM corresponding to the output VARIABLE of the productivity relationship, i.e. the VARIABLE which is PRODUCED-BY the ORGANIZATION of which the RESOURCE is a RESOURCE-OF.

Create a SUB-PROBLEM corresponding to the productivity VARIABLE of the productivity relationship, i.e. the VARIABLE which measures the relationship between the RESOURCE and the output.

Check for Long Loops caused by the OUTPUT-SUB-PROBLEM. i.e. is the PRODUCTIVITY-SUB-PROBLEM a SUB-PROBLEM of itself, with a chain of SUB-PROBLEM-OF relationships greater than 2 in length.

If either of these sub-problems cause long loops, then abandon the application of the reasoning method and return NIL.

Check if any of the sub-problems has short loops. Solve those which have short loops first. (This has the effect of activating short-loop pruning early before further expansion of the problem three takes place.)

If problem solution for either sub-problem returns the symbol DEFER, then return DEFER.

If there is a solution for both sub-problems, then the resource-projection is equal to the output-projection divided by the productivity-projection.

Create a INTERMEDIATE-HYPOTHESIS corresponding to this solution.

List the FINAL-HYPOTHESIS of the output projection and the FINAL-HYPOTHESIS of the productivity projection as dependencies on which the INTERMEDIATE-HYPOTHESIS for the resource projection DEPENDS-ON.

List the output variable and the productivity variable as evidence for the INTERMEDIATE-HYPOTHESIS.

Calculate the quality attributes of the INTERMEDIATE-HYPOTHESIS.

Return the INTERMEDIATE-HYPOTHESIS.
a. End of PRODUCTIVITY-DERIVED-RESOURCE.

2b. PRODUCTIVITY-DERIVED-PRODUCTIVITY

Create a SUB-PROBLEM corresponding to the output VARIABLE of the productivity relationship, i.e. the VARIABLE which is PRODUCED-BY the ORGANIZATION of which the RESOURCE is a RESOURCE-OF.

Create a SUB-PROBLEM corresponding to the RESOURCE VARIABLE of the productivity relationship, i.e. the VARIABLE which is a RESOURCE of the ORGANIZATION which PRODUCES the output.

Check for Long Loops caused by the OUTPUT-SUB-PROBLEM i.e. is the OUTPUT-SUB-PROBLEM a SUB-PROBLEM of itself, with a chain of SUB-PROBLEM-OF relationships greater than 2 in length.

If either of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for both sub-problems, then the productivity-projection is equal to the output-projection divided by the resource-projection.

Create a INTERMEDIATE-HYPOTHESIS corresponding to this solution.

List the FINAL-HYPOTHESIS of the output projection and the FINAL-HYPOTHESIS of the resource projection as dependencies on which the INTERMEDIATE-HYPOTHESIS for the productivity projection DEPENDS-ON.

List the output variable and the resource variable as evidence for the INTERMEDIATE-HYPOTHESIS.

Calculate the quality attributes of the INTERMEDIATE-HYPOTHESIS.

Return the INTERMEDIATE-HYPOTHESIS.
2b. End of PRODUCTIVITY-DERIVED-PRODUCTIVITY.

Proportional Reasoning
1a. Is the variable in question a sub-category of RATIO, then call PROPORTION-DERIVED-RATIO.
1b. Is the variable in question a denominator of the ration-relationship that we are currently examining then call NUMERATOR-DERIVED-RATION.
1c. Is the variable in question a numerator of the ration-relationship that we are currently examining then call DENOMINATOR-DERIVED-RATIO.

Note there may be multiple ratios applicable to the same variable. These will have been identified in the testing of applicability and the proportional-reasoning will be called from each one of the applicable ratios.

2a. DENOMINATOR-DERIVED-NUMERATOR

Create a SUB-PROBLEM corresponding to the denominator VARIABLE of the proportionality relationship, i.e. the VARIABLE which is DENOMINATOR-OF the RATION.

Create a SUB-PROBLEM Corresponding to the ration VARIABLE which measures the relationship, i.e., the VARIABLE which measures the relationship between the NUMERATOR and the DENOMINATOR.

Check for Long Loops caused by the DENOMINATOR-SUB-PROBLEM. i.e. is the DENOMINATOR-SUB-PROBLEM a SUB-PROBLEM of itself, with a chain of SUB-PROBLEM-OF relationships greater than 2 in length.

Check for Long Loops caused by the PROPORTION-SUB-PROBLEM. i.e. is the PROPORTION-SUB-PROBLEM a SUB-PROBLEM of itself, with a chain of SUB-PROBLEM-OF relationships greater than 2 in length.

If either of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for both sub-problems, then the numerator-projection is equal to the denominator-projection multiplied by the proportion-projection.

Create a INTERMEDIATE-HYPOTHESIS corresponding to this solution.

List the FINAL-HYPOTHESIS of the denominator projection and the FINAL-HYPOTHESIS of the proportion projection as dependencies on which the INTERMEDIATE-HYPOTHESIS for the numerator projection DEPENDS-ON.

List the denominator variable and the ratio variable as evidence for the INTERMEDIATE-HYPOTHESIS.

Calculate the quality attributes of the INTERMEDIATE-HYPOTHESIS.

Return the INTERMEDIATE-HYPOTHESIS.

2a. End the DENOMINATOR-DERIVED-NUMERATOR.

2b. NUMERATOR-DERIVED-DENOMINATOR

Create a SUB-PROBLEM corresponding to the numerator VARIABLE of the proportionality relationship, i.e. the VARIABLE which is NUMERATOR-OF the RATIO.

Create a SUB-PROBLEM corresponding to the ration VARIABLE of the proportionality relationship, i.e. the VARIABLE which measures the relationship between the NUMERATOR and the DENOMINATOR.

Check for Long Loops caused by the NUMERATOR-SUB-PROBLEM. i.e. is the NUMERATOR-SUB-PROBLEM a SUB-PROBLEM of itself, with a chain of SUB-PROBLEM-OF relationships greater than 2 in length.

Check for Long Loops caused by the PROPORTION-SUB-PROBLEM. i.e. is the PROPORTION-SUB-PROBLEM a SUB-PROBLEM of itself, with a chain of SUB-PROBLEM-OF relationships greater than 2 in length.

If either of these sub-problems has short loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for both sub-problems, then the denominator-projection is equal to the numerator-projection divided by the proportion-projection.

Create a INTERMEDIATE-HYPOTHESIS corresponding to this solution.

List the FINAL-HYPOTHESIS of the numerator projection and the FINAL-HYPOTHESIS of the proportion projection as dependencies on which the INTERMEDIATE-HYPOTHESIS for the denominator projection DEPENDS-ON.

List the numerator variable and the ratio variable as evidence for the INTERMEDIATE-HYPOTHESIS.

Calculate the quality attributes of the INTERMEDIATE-HYPOTHESIS.

Return the INTERMEDIATE-HYPOTHESIS.

2b. End of NUMERATOR-DERIVED-DENOMINATOR.

2c. PROPORTION-DERIVED-RATIO

Create a SUB-PROBLEM corresponding to the numerator VARIABLE of the proportionality relationship, i.e. the VARIABLE which is NUMERATOR-OF the RATIO.

Create a SUB-PROBLEM corresponding to the denominator VARIABLE of the proportionality relationship, i.e. the VARIABLE which is the DENOMINATOR-OF the RATIO.

Check for Long Loops caused by the NUMERATOR-SUB-PROBLEM. i.e. is the NUMERATOR-SUB-PROBLEM a SUB-PROBLEM of itself, with a chain of SUB-PROBLEM-OF relationships greater than 2 in length.

Check for Long Loops caused by the DENOMINATOR-SUB-PROBLEM. i.e. is the DEMNOMINATOR-SUB-PROBLEM a SUB-PROBLEM of itself, with a chain of SUB-PROBLEM-OF relationships greater than 2 in length.

If either of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for both sub-problems, then the ratio-projection is equal to the numerator-projection divided by the denominator-projection.

Create a INTERMEDIATE-HYPOTHESIS corresponding to this solution.

List the FINAL-HYPOTHESIS of the numerator projection and the FINAL-HYPOTHESIS of the denominator projection as dependencies on which the INTERMEDIATE-HYPOTHESIS for the denominator projection DEPENDS-ON.

List the numerator variable and the denominator variable as evidence for the INTERMEDIATE-HYPOTHESIS.

Calculate the quality attributes of the INTERMEDIATE-HYPOTHESIS.

Return the INTERMEDIATE-HYPOTHESIS.

2c. End of PROPORTION-DERIVED-RATIO.

Aggregational Reasoning

1. Is the variable a super-set of the decomposition, if so then call BOTTOM-UP-REASONING. (2a)

If a variable has already a certain intermediate-hypothesis return NIL, i.e. don't do Top-Down reasoning in cases where we have certain answers. Is the variable a sub-set of the decomposition, if so then call TOP-DOWN-REASONING. (2b)

Note there may be multiple decompositions applicable to the same variable. These will have been identified in the testing of applicability and the aggregational-reasoning will be called from each one of the applicable decompositions.

2a. BOTTOM-UP-REASONING

Create SUB-PROBLEMS corresponding to the SUBSETS of the VARIABLE. In doing so, if these VARIABLES are sub-categories of FLOW then ignore any flows which are merely internal to the set.

Check for Long Loops caused by any of these SUB-SET variables, i.e. is the SUB-SET-PROBLEM of itself, with a chain of SUB-PROBLEM-OF relationships greater than 2 in length.

If any of these sub-problems cause long loops, then abandon the application of the reasoning method and return NIL.

Check if any of the sub-problems has short loops, Solve those which have short loops first. (This has the effect of activating short-loop pruning early before further expansion of the problem tree takes place.)

If problem solution for either sub-problem returns the symbol DEFER, then return DEFER.

If there is a solution for both sub-problems, then the superset projection is equal to the sum of the subset-projections.

Create a INTERMEDIATE-HYPOTHESIS corresponding to this solution.

List the FINAL-HYPOTHESIS's of the subset projections as dependencies on which the INTERMEDIATE-HYPOTHESIS for the subset projection DEPENDS-ON.

List the subset variables as evidence for the INTERMEDIATE-HYPOTHESIS.

Calculate the quality attributes of the INTERMEDIATE-HYPOTHESIS.

Return the INTERMEDIATE-HYPOTHESIS.

2a. End of BOTTOM-UP-REASONING

2a. TOP-DOWN-REASONING

Create a SUB-PROBLEM corresponding to the SUPER-SET of the VARIABLE.

Create SUB-PROBLEMs corresponding other variables that are peers of the variable that we are dealing with, i.e. Sub-sets of the same super-set. In doing so, if these VARIABLES are sub-categories of FLOW then ignore any flows which are merely internal to the set.

Check for Long Loops caused by any of these peer subset variables, i.e. is the PEER-SUBSET-SUB-PROBLEM a SUB-PROBLEM of itself, with a chain of SUB-PROBLEM-OF relationships greater than 2 in length.

Check for a Long Loops caused by the SUPERSET sub-problem, i.e. is the SUPERSET-SUB-PROBLEM a SUB-PROBLEM of itself, with a chain of SUB-PROBLEM-OF relationships greater than 2 in length.

If any of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for all sub-problems, then the variable-projection is equal to the superset-projection minus the sum of the peer-subset-projections.

Create a INTERMEDIATE-HYPOTHESIS corresponding to this solution.

List the FINAL-HYPOTHESIS of the peer-subset-projections and the superset projection as dependencies on which the INTERMEDIATE-HYPOTHESIS for the variable projection DEPENDS-ON.

List the peer-subset variables and the sub-set as evidence for the INTERMEDIATE-HYPOTHESIS.

Calculate the quality attributes of the INTERMEDIATE-HYPOTHESIS.

Return the INTERMEDIATE-HYPOTHESIS.

2a. End of TOP-DOWN-REASONING

Conservation of Flow reasoning

1. Is the variable a sub-category of a LEVEL. If so then call LEVEL-PROCEDURE (2a).

Is the variable a sub-category of a FLOW and does it have a FLOWS-INTO relationship with another variable which is a sub-category of a FLOW. If so then call FLOW-PROCEDURE-CASE-1 with FLOWS-INTO as a passed parameter (2B).

Is the variable a sub-category of a FLOW and does it have a FLOWS-OUT-OF relationship with another variable which is a sub-category of a FLOW. If so then call FLOW-PROCEDURE-CASE-1 with FLOWS-OUT-OF as a passed parameter (2B).

Is the variable a sub-category of a FLOW and does it have a FLOWS-INTO relationship with another variable which is a sub-category of a LEVEL. If so then call FLOW-PROCEDURE-CASE-2 (2d) with FLOWS-INTO as a passed parameter (2C).

Is the variable a sub-category of a FLOW and does it have a FLOWS-OUT-OF relationship with another variable which is a sub-category of a LEVEL. If so then call FLOW-PROCEDURE-CASE-2 (2d) with FLOWS-OUT-OF as a passed parameter (2C).

2a. LEVEL-PROCEDURE

Create SUB-PROBLEMS corresponding to
the INFLOW Variables
and OUT-FLOW Variables of the VARIABLE that we are dealing with. Outflows correspond to these variables that the VARIABLE has a FLOWS-INTO relationship with. Inflows correspond to those variables that the VARIABLE has a FLOWS-OUT-OF relationship with.

Check for Long Loops caused by any of these sub-PROBLEMS. i.e. is the RELATED-FLOW-SUB-PROBLEM a SUB-PROBLEM of itself, with a chain of SUB-PROBLEM-OF relationships greater than 2 in length.

If any of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If there is a solution for all sub-problems, then the level-variable-projection is equal to the value in the previous year plus the sum of inflow-projections minus the sum of outflow projections.

Create a INTERMEDIATE-HYPOTHESIS corresponding to this solution.

List the FINAL-HYPOTHESIS's of the inflow-projections and outflow-projections as dependencies on which the INTERMEDIATE-HYPOTHESIS for the level-variable projection DEPENDS-ON.

List the inflow variables and outflow as evidence for the INTERMEDIATE-HYPOTHESIS.

Calculate the quality attributes of the INTERMEDIATE-HYPOTHESIS.

Return the INTERMEDIATE-HYPOTHESIS.

2a. End of LEVEL-PROCEDURE

2b. FLOW-PROCEDURE-CASE-1 (FLOWS-INTO or FLOWS-OUT-OF is passed parameter)

If FLOWS-OUT-OF is the passed parameter, then create SUB-PROBLEMS corresponding to the inflow variables. If FLOWS-INTO is the passed parameter, then create SUB-PROBLEMS corresponding to the outflow variables. Outflows correspond to those variables that the VARIABLE has a FLOWS-INTO relationship with. Inflows correspond to those variables that the VARIABLE has a FLOWS-OUT-OF relationship with.

IF FLOWS-OUT-OF is the passed parameter, then create SUB-PROBLEMS corresponding to the other outflows of the inflow variables. IF FLOWS-INTO is the passed parameter, then create SUB-PROBLEMS corresponding to the other inflows of the outflow variables.

Check for Long Loops caused by any of these sub-PROBLEMS. i.e. is the RELATED-FLOW-SUB-PROBLEM a SUB-PROBLEM of itself, with a chain of SUB-PROBLEMS-OF relationships greater than 2 in length.

If any of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If FLOWS-OUT-OF is the passed parameter, and if there is a solution for all sub-problems, then the variable-projection is equal sum of inflows minus the sum of their other outflows. If FLOWS-INTO is the passed parameter, and if there is a solution for all sub-problems, then the variable-projection is equal sum of outflows minus the sum of their other inflows.

Create a INTERMEDIATE-HYPOTHESIS corresponding to this solution.

List the FINAL-HYPOTHESIS's of the related-flow-projections and other-flow-projections as dependencies on which the INTERMEDIATE-HYPOTHESIS for the variable projection DEPENDS-ON.

List the related-flow variables and other-flows as evidence for the INTERMEDIATE-HYPOTHESIS.

Calculate the quality attributes of the INTERMEDIATE-HYPOTHESIS.

Return the INTERMEDIATE-HYPOTHESIS.

2a. End of FLOW-PROCEDURE-CASE-1

2c. FLOW-PROCEDURE-CASE-2 (FLOW-INTO or FLOWS-OUT-OF is passed parameter)

Identify the variable which is a sub-category of a LEVEL with which the VARIABLE has a flow relationship of the form specified in the passed parameter.

Identify inflows and outflows to and from the level-variable. Outflows correspond to those variables that the LEVEL-VARIABLE has a FLOWS-INTO relationship with. Inflows correspond to those variables that the LEVEL-VARIABLE has a FLOWS-OUT-OF relationship with. Exclude from the above lists the VARIABLE that we are currently focused on.

Create a sub-problem corresponding to the level variable. Create sub-problems corresponding to all of the other-inflows to the level variable. Create sub-problems corresponding to all of the other-outflows to the level variable.

Check for Long Loops caused by any of these sub-PROBLEMS. i.e. is the RELATED-FLOW-SUB-PROBLEM a SUB-PROBLEM of itself, with a chain of SUB-PROBLEM-OF relationships greater than 2 in length.

If any of these sub-problems cause long loops, then abandon the application of the reasoning method and return NIL.

Check if any of the sub-problems has short loops. Solve those which have short loops first. (This has the effect of activating short-loop pruning early before further expansion of the problem tree takes place.)

If problem solution for either sub-problem returns the symbol DEFER, then return DEFER.

If FLOWS-OUT-OF is the passed parameter, and if there is a solution for all sub-problems, then the variable-projection is equal the level-variable-value in its previous year plus the sum of all inflows minus the level variable projection minus the sum of outflows.

If FLOWS-INTO is the passed parameter, and if there is a solution for all sub-problems, then the variable-protection is equal the level-variable-projection plus the sum of the outflow-projections minus the value of the level variable in its previous year minus the sum of all inflows.

Create a INTERMEDIATE-HYPOTHESIS corresponding to this solution.

List the FINAL-HYPOTHESIS's of the related-flow-projections as dependencies on which the INTERMEDIATE-HYPOTHESIS for the variable projection DEPENDS-ON.

List the related-flow variables as evidence for the INTERMEDIATE-HYPOTHESIS.

Calculate the quality attributes of the INTERMEDIATE-HYPOTHESIS.

FIG. 8C depicts the object/relationship structuring that occurs when a local reasoning method, like historical trend analysis is applied.

In FIG. 8C, the current focus of sub-problem object 700 is to project through 1991 the value of an enterprise headcount variable 702. The sub-problem object's UNTRIED-APPLICABLE PERSPECTIVE slot lists historical trend analysis as the next reasoning method to apply. As described above, historical trend analysis performs regression analysis to project a future value for a variable. The data for regression analysis comes from the employee headcount variable 702 and its associated history object 704. First, the type of regression used is determined by the TREND TYPE slot in the employee headcount variable 702. This slot indicates that linear regression is to be used, and the WEIGHTING FACTOR slot shows that 0.8 is the weight factor used for linear regression. Following common linear regression techniques, the value projected employees headcount would be:

$$EHC = Beta_0 + Beta_1(YEAR)$$

where $Beta_0$ and $Beta_1$ are estimated through regression of the historical data in the history object 704.

Once the employee headcount projection value is determined, an intermediate hypothesis object 706 is created and will be linked to the sub-problem object 700 by a two-directional HAS INTERMEDIATE HYPO-/AN INTERMEDIATE HYPO OF relationship.

The intermediate hypothesis object shows the result of the reasoning method application. Moreover, it provides an explanation of the type of analysis used to create the result. In addition, the intermediate hypothesis object 706 contains attributes on the qualities of this specific application of the reasoning method, which are used in reconciliation. In an exemplary embodiment, the frame below lists the attributes of an intermediate hypothesis object:

```
{{INTERMEDIATE HYPOTHESIS
   IS-A+INV              :
   IS-A                  : HYPOTHESIS
   LOCAL-EVIDENCE        :
   DEPENDS-ON            :
   PROJECTED-VALUE       :
   CAUSAL-LENGTH         :
   QUALITY-OF-ESTIMATED-
      PREMISES           :
   NUMBER-OF-ESTIMATED-
      PREMISES           :
   NUMBER-OF-TRUE-PREMISES :
   TOTAL-NUMBER-OF-PREMISES :
   HAS-RECONCILIATION    :
   PERSPECTIVE           :
   INTERMEDIATE-HYPOTHESIS-OF :}}
```

In intermediate hypothesis object 706, a PROJECTED VALUE slot provides a value 13817, and an explanation slot provides an outline of the reasoning methods used and the evidence examined such as:

EXPLANATION: 13 YEARS HISTORICAL DATA INTERPRETED BY A LINEAR MODEL TRANSFORMED INTO A WEIGHTED LINEAR REGRESSION MODEL. THE R SQUARED GOODNESS OF FIT MEASURE IS 0.701632

The other slots contain the hypothesis quality factors used for reconciliations. A CAUSAL LENGTH slot tracks the number of causal reasoning methods applied to achieve the result. In this case, where a local, non-causal estimating method was the only method applied, causal length is zero. An EVIDENCE slot provides a reference to the history object 704 which provided the historical data. A DEPENDS ON slot is used to track dependent premises. As historical trend analysis is not an expansive method, the DEPENDS ON slot will be empty. A NUMBER-OF-ESTIMATED-PREMISES slot tracks the number of estimated reasoning methods that were applied in arriving at the solution. In this case, historical trend analysis counts as only one premise, and it is an estimating procedure. So, this slot contains the number one.

A NUMBER-OF-TRUE-PREMISES slot, on the other hand, tracks the number of axiomatic reasoning methods used. A TOTAL-NUMBER-OF-PREMISES slot sums all premises used. A METHOD slot indicates the method used: historical reasoning. And, finally, a QUALITY-OF-ESTIMATED-PREMISES slot is used with the historical reasoning method to store the goodness-of-fit value that is calculated in regression analysis. Thus, the intermediate hypothesis object 706 contains a variety of information. This data provides a summary of a particular application and the reasoning method, as well as quality data that supports complete reconciliation.

Application of An Expansive Reasoning Method (Long Loops and Short Circuits)

FIGS. 8D–8G depict the object and relationship manipulations that occur when the processor 4 applies an expansive reasoning method, such as reasoning from productivity. This discussion supplements the discussion concerning step 514 in FIG. 7.

Referring to FIG. 8D, there is a fragment of the enterprise model showing a configuration which satisfies the applicability conditions for the productivity reasoning method. As described above, the processor 4 searches for a proportionality relationship attached to the variable in question to determine applicability. However, the existence of that relationship indicates that the template configuration described above with reference to FIG. 4B is also present. In FIG. 8D that condition is in fact described.

Referring to FIG. 8D, there is depicted a configuration of an enterprise model where reasoning from productivity can be performed. A resource variable, enterprise headcount 720, is linked by a RESOURCE OF relationship to an enterprise object 722 and the enterprise object 722, which is linked by a PRODUCES relationship to a widget built object 726. In such a case the system also provides a productivity variable 728 linked to the Enterprise headcount variable 720 by a HAS PRODUCTIVITY relationship, and to the widget build variable 726 by a PRODUCTIVITY IN PRODUCING relationship.

The procedure for the reasoning by productivity method permits reasoning in two directions, the projections can be made for either the resource variable (e.g., employee headcount 720 with the output variable and the productivity variable as premises) or the productivity variable (e.g. the employee headcount-built Productivity variable 728 with the resource variable and the productivity variable as premises). In FIG. 8D, the focus of the planning sub-problem 730 is to create a projection for the enterprise headcount variable 720 in fiscal year 1991. This calls for an application of the procedure to derive a resource from the productivity variable 728. To solve that problem, according to the reasoning method, the processor 4 needs values for the widget built variable 726 and the productivity variable 728. To obtain those values, the processor 4 creates two sub-problems objects 732 and 734. Sub-problem object 734 pertains to projecting the widget built variable for 1991; sub-problem object 732 to projecting the productivity variable for 1991. Once values for productivity variable 728 and the widget built variable 726 are known, the system can determine a value for the enterprise employee variable 720.

However, before attempting to solve these problems, the processor 4 first performs a check for long loops and short circuits.

The checking for a long loop is depicted in FIG. 8F. A long loop occurs when the chain of sub-problems generated in solving for a variable value, using an expansive reasoning method leads one back to the problem where one started. To illustrate this point, FIG. 8G shows a worldwide headcount variable 800 that has a proportionality relationship (linked by a IS PROPORTIONAL relationship) to an attrition variable 802. Connected between those variables 800, 802 is an attrition-ratio variable 801. Additionally, both the worldwide headcount variable 800 and the attrition rate variable 802 have associated decomposition structures. A headcount-by-geography decomposition rule instance object 804 contains information to decompose the worldwide headcount variable by geography. The attrition-by-geography decomposition rule instance object 806 contains similar information. There are also decomposition subset variables. Linked to the headcount-by-geography decomposition instance object 804 is a Europe headcount subset variable 808. Linked (by a MEMBER OF relationship) to the attrition-by-geography decomposition rule instance object 802, is a Europe attrition subset variable 810.

Using that enterprise model configuration, it is possible to describe a chain of sub-problems that would lead to a chain for long loops. Suppose that the focus of the sub-problem is to project the worldwide headcount variable 800 to the end of fiscal year 1991. And in applying the reasoning method applicability tests as described above (SEE FIG. 7, step 506), the processor 4 discovers the IS-PROPORTIONAL-TO relationship, and finds that the proportional reasoning method applies. The temporal decomposition sub-problem object 810 for fiscal year 1991 also shows that the proportionality reasoning method has yet to be tried.

Next, the processor 4 invokes the proportionality reasoning method. Proportional reasoning is an expansive reasoning method. To generate projections value for the worldwide headcount variable 800, the method first requires determination of projected values for the attrition variable 802 and the attrition ratio variable 801. Accordingly, the processor 4 stores two sub-problems objects: one for projecting the attrition ratio variable 801 and one for projecting the attrition rate variable 802. Following the chain of sub-problems generated along the path for projecting the attrition ratio variable 801, the processor 4 creates a sub-problem object 812 indicating that a projection is necessary for the attrition rate through fiscal year 1991. The control module 150 focuses upon this new sub-problem and determines that the bottom up reasoning method applies. There is a decomposition of the attrition variable 802, and one of the subsets is the Europe-attrition variable 810. Bottom up/top down reasoning is also an expansive process, where projected values of the subset variables are used to project the superset variable (attrition).

The focus of the processor 4 then moves to the Europe-attrition sub problem 814. It creates a sub-problem to project a value for Europe attrition through 1991. The processor 4 determines what reasoning methods could apply in solving the problem. In determining which reasoning method applies, the processor determines that a flow relationship exists between the Europe attrition variable 810 and the Europe headcount variable 808.

The conservation of flow reasoning method is yet another expansive reasoning method, and to determine a projected value for the Europe-attrition variable 810, a projected value for the Europe headcount variable 808 must be determined. Accordingly, the processor 4 creates another sub-problem object 816.

In following the chain of sub-problems, the processor 4 now attempts to project a value for the Europe headcount variable 808, and the processor 4 detects a long loop. One of the reasoning methods that could be used to project a value for Europe headcount is the top-down/bottom-up reasoning method. This method is expansive. The value for the worldwide headcount variable 800 (The value the processor originally sought) is required. Because of this long circular loop in the chain of sub-problems generated through expansive reasoning methods, the processor 4 will abandon the aggregation reasoning method in solving for European headcount. To abandon the method, its identifying name is simply deleted from the UNTRIED-APPLICABLE REASONING METHOD slot of the corresponding sub-problem object.

Referring again to FIG. 8D, when the processor 4 checks the results of the long loop check procedure, and a long loop is detected, the processor 4 quits the procedure and attempts to apply another reasoning method (See step 510, FIG. 7). If no long loops were found in checking either the headcount-build productivity projection sub-problem 732 or the widget build projection problem 734, the processor 4 will next perform a check for short circuits.

FIG. 8F illustrates an object relationship configuration that would present a short circuit problem. As described above, a short circuit occurs, when in following the chain of sub-problems generated in a series of expansive reasoning methods, the first sub-problem "A" is an immediate sub-problem of a second sub-problem "B", which, in turn, is an immediate sub-problem of problem "A". Short circuits occur naturally in the model, and the present invention provides a procedure to determine which direction is the best way to proceed in generating values for the sub-problems "A" and the sub-problem "B". If it is "better" that the value of the sub-problem "B" should be used to determine the value of sub-problem A, then the system would abandon the expansive reasoning method in sub-problem B. However, if it is determined that sub-problem A should be used to determine B, then the expansive reasoning method in sub-problem A is abandoned, and in addition, sub-problem B is deferred as it is no longer needed to determine A.

FIG. 8F again depicts the productivity relationship existing between the enterprise headcount variable 720 and the widget built variable 726. The productivity variable 728 links the two variables 720, 726, as does the enterprise object 722, which owns the resource. The current problem is to project the enterprise headcount variable 720 through the end of fiscal year 1991. The sub-problem object 820 indicates that productivity reasoning (an expansive reasoning method) is yet untried.

In applying that reasoning method, two sub-problems are generated. The focus of sub-problem 822 is to create a projection for the productivity variable 728. The focus of sub-problem 821 is to create a projection for the widget built variable 726.

Following the chain from sub-problem 820 to its immediate sub-problem 822, it appears that productivity analysis can also be used to determine the productivity variable 728. As productivity reasoning is an expansive method, it generates two immediate sub-problems 820A, 824. The focus of sub-problem 824 is to determine a projection for the widget-built variable 726 through fiscal year 1991. However, sub-problem 820A is the same as sub-problem 820; to generate a value for the enterprise headcount through fiscal year 1991. Thus, by definition, the sub-problem 820A is an immediate sub-problem of sub-problem 822, which in turn is an immediate sub-problem of 820. As sub-problem 820 and 820A are the same, a short circuit exists.

With the short circuit problem identified, the processor 4, during the short circuit procedure, determines the "best" way to reason, either A to B or B to A. To determine what is best, the processor 4 performs a mini-conflict resolution procedure. As local reasoning methods are applied before expansive ones, it is likely that some intermediate hypothesis exists for the sub-problems. For example, sub-problem 820 might already have an intermediate hypothesis object attached, because of the application of a historical reasoning method. On the other hand, sub-problem 822 may have an intermediate hypothesis object, because of the adoption of a plan. In the circuit check mini-conflict resolution procedure, the processor 4 groups together all available intermediate hypothesis for the sub-problem circuit 820, 822, 820A, and performs reconciliation on the comprised set of intermediate hypotheses.

The conflict resolution procedure follows the same procedure as the reconciliation procedure described above with reference to steps 516 through 518 in FIG. 7. The processor 4 orders the methods to be used such as greatest truth, greatest causality, best quality estimates, etc. To resolve conflicts, the processor 4 examines the hypotheses quality slots, comparing them to find a single hypothesis which best satisfies the ranked reconciliation rules. For example, an intermediate hypotheses that is based on axiomatic opinion data (assumed to be true) will take precedence over an intermediate hypotheses based on an the estimating method like historical trend analysis. If the best intermediate hypothesis belongs to the sub-problem "B" (e.g. sub-problem 822), then "B" will be used to determine "A" and the expansive reasoning will be dropped from sub-problem B. If, during mini-conflict resolution, the processor 4 finds that the "best" intermediate hypothesis belongs to the "A" sub-problem, (e.g. sub-problem 820), the system concludes that "A" should be used to determine "B" and not vice, versa. As a result, the expansive reasoning method is dropped for "A" and the solution of "B" is deferred as is it is no longer needed to determine "A". Here, the processor 4 will delete the reasoning method from the UNTRIED SLOT of this sub-problem 820 and it will add it to the PRUNED-UNSOLVABLE slot.

However, if, during mini-conflict resolution, the processor 4 cannot find a single hypothesis as best, and hypotheses remain in the conflict set from both sub-problems, the processor 4 will perform two additional steps to determine the "best" direction of reasoning.

First, the processor 4 will compare the number of untried reasoning methods of each sub-problem, by counting entries in the UNTRIED slot in each sub-problem object. If the "B" sub-problem is "better" then the method continues; if the "A" sub-problem is "better" then the reasoning method is deferred.

If the untried reasoning method comparison test cannot provide a result (i.e. the number of untried perspectives is equal), the processor 4 will automatically abandon the reasoning method. In this way, the method of the present invention provides a method to base projections on the best evidence available.

Referring again to FIG. 8D, the processor 4 will return to project the variable using the expansive reasoning method, once it determines that no long loops or short circuits exist.

Assume that in FIG. 8D the checks identified no long loops or short circuit in the sub-problem 732 and sub-problem 734. If so, the processor 4 recursively invokes the problem solving procedure for both sub-problems waiting for them to return a final hypothesis for each sub-problem. The recursive called for in each problem will generate a final hypothesis for each variable and related problem solution tree substructure. FIG. 8E diagrams the exemplary object/relationship structuring that occurs as the sub-problems generated return with final hypotheses. A widget-built production final hypothesis object 746, provides an estimated value, an explanation of the reasoning used and a set hypothesis quality factors, in response to sub-problem 732. The final hypothesis object 740 is linked to its sub-problem 732 by a two-directional HAS FINAL HYPOTHESIS RELATIONSHIP. A second final hypothesis, the widget-build final hypothesis object 742, contains similar data pertaining to the value for the widget-built variable 734 through fiscal year 1991. It is joined to its sub-problem 734 by HAS FINAL HYPOTHESIS RELATIONSHIP. In the categorization hierarchy, the final hypothesis objects are also linked by an IS-A relationship to a final hypothesis primitive 744.

The values contained in the final hypothesis objects 740 and 742 are used to generate a projection value to respond to sub-problem 730. The PROJECTED VALUE slot in an intermediate hypothesis object 746 contains the value projection for sub-problem 730. In this example, the productivity reasoning method was applied to project a value for employee headcount through fiscal year 1991. The PROJECTED VALUE slots in final hypotheses objects 740, 742 are combined by the reasoning method to create the projected value in the intermediate hypothesis. As the average employee can build ten widgets in a year and 129746 widgets are needed, the work force through fiscal year 1991 could employ 12945 workers. An explanation on the intermediate hypotheses object 746 procedure provides an overview of the reasoning method.

Moreover, the hypothesis quality factors of both final hypothesis objects 740 and 742 are combined in the intermediate hypothesis object 746. This technique provides a way to construct an intermediate hypothesis that will be weighted during reconciliation according to results of all of the sub-problems. The NUMBER-OF-ESTIMATED PREMISES slot contains a combined total of the sub-problems analyzed in determining a solution, the CAUSAL LENGTH slot represents a sum of the causal methods encountered in arriving at the solution. Because reasoning from productivity is an expansive and causal reasoning method, the processor 4 increments the causal length by one in addition to summing the values from the dependent solutions. The number-of-true PREMISES slot represents a combination of axiomatic statements encountered in the hypothesis. Additionally, the total number of PREMISES are also totalled. These are calculated for the now intermediate hypothesis merely by adding the corresponding values of the supporting final hypothesis.

The intermediate hypothesis object provides a QUALITY OF ESTIMATED PREMISES slot to contain the goodness of fit measurements that are generated during historical trend analysis. When combining the quality of the dependent final hypotheses 740 and 742, the present invention averages the quality of estimated premise values found in these objects.

In addition, the processor 4 will augment the problem solution tree by linking the final hypothesis objects 740 and 742 to the intermediate hypothesis object 746 by a two-directional DEPENDS-ON relationship. The intermediate hypothesis 746 is then linked to the sub-problem object 730 by an two-directional HAS-INTERMEDIATE HYPOTHESIS relationship. Application of this expansive reasoning method is complete. The processor 4 then accesses the sub-problem object 730 to removing the reasoning method identifier from the UNTRIED-APPLICABLE slot and add it in the TRIED slot.

The present discussion of applying an expansive reasoning method, generating sub-problems, applying long loop and short circuit checks and using the final hypothesis of the sub-problems to create an intermediate hypothesis, pertain to step 514 of FIG. 7.

Reconciliation

Referring to step 510 in FIG. 7, once all the reasoning methods applicable to a variable have been applied, the processor 4, using the statements of the control algorithm 150 (FIG. 3), proceeds to step 516 to begin a reconciliation process and develop one final hypothesis for the sub-problem. Reconciliation is needed each time a sub-problem is solved. In dealing with large interrelated knowledge bases, many thousands of reconciliations will take place in solving a scenario. The strategy for dealing with reconciliation is to view the decision as a multi-criteria decision, based on the dimensions of hypothesis quality.

As described above, the processor 4 performs reconciliation by locating available reconciliation rules and then ordering them according to a pre-selected user preference scheme. In an exemplary embodiment, information concerning reconciliation rules are stored in objects in the knowledge base 20 (FIG. 1), categorized under the control branch 164 (see FIG. 3). An example frame for the reconciliation rule object appears as follows:

{{GREATEST TRUTH
  IS-A: PRUNING RECONCILIATION RULE
  PROCEDURE: GREATEST TRUTH
  IS-ACTIVE: T
  EVIDENCE-REQUIRED: CONFLICT-EXISTS
  HAS-PRECEDENCE-OVER: GREATEST CAUSAL EXPLANATION
  IS-PRECEDED-BY: NIL}}

An IS-ACTIVE slot provides an indication of whether the reconciliation rule is available. A HAS-PRECEDENCE-OVER and an IS-PRECEDED-BY slot provide a system for ordering the rules. By activating different combinations of reconciliation rules and by changing the order of preference data, a user has the ability to control the resolution of the estimating procedure, according to his or her own subjective decision making criteria. Associated with each reconciliation method rule object is a reconciliation module (see FIG. 3, 154) to execute the method. Additionally, each reconciliation rule object contains an EVIDENCE-REQUIRED slot which determines the set of conditions for applicability. As the set of unpruned intermediate hypotheses make up a conflict set, a conflict exists when multiple unproved intermediate hypothesis Kremain. The EVIDENCE-REQUIRED slot is an attached procedural test to check that there is conflict in the conflict set.

FIG. 8H depicts the network and categorization structure of a set of identified and ordered reconciliation rules. In an exemplary order of preference, there is a greatest truth rule object 900, a greatest causality rule object 902, a best quality estimates rule object 904 a greatest detail rule object 906, and a most recent statement rule object.

Associated with the greatest truth rule object 900 is a procedure to evaluate greatest truth as a ratio of the number of axiomatically true premise compared to the total number of premises. All intermediate hypothesis objects have TOTAL NUMBER OF TRUE PREMISES quality indicator slots listing the number of true premises. Moreover, the TOTAL NUMBER OF PREMISES slot provides the denominator for the ratio.

The greatest causality rule object 902 is associated with a procedure to measure greatest causality in terms of the total number of causal arguments used in the tree of support. As shown above with reference to FIG. 8E, each intermediate hypothesis generated carries, in its CAUSAL LENGTH slot, a combined total of the causal reasoning methods used in the chain of sub-problems below it. Hence, execution of this reconciliation rule is merely a comparison of causal length slots in the intermediate hypothesis.

The best quality estimates rule object 904 is associated with a procedure to evaluate the quality of estimates by summing the total of all axiomatically true premises with the product of the quality of estimated premises multiplied by the number of estimated premises, with the sum divided by number of premises, as described in the following equation:

$$\frac{\# \text{ TRUE} + (\#\text{ESTIMATED} * \text{QUALITY OF ESTIMATED})}{\text{TOTAL } \#}$$

All of these values are found in the hypothesis quality slots of each intermediate hypothesis.

The greatest detail reconciliation rule object provides for pruning based on the total number of problems, which is found in each intermediate hypothesis in the TOTAL NUMBER OF PREMISES slot.

The most recent statement rule object is associated with a procedure to prune data by the date of a statement. As described above, all opinions, plans and goals are dated. Thus, between two statements, of equal truth value, the one with the later date will succeed.

There is some basis for choosing the types of reconciliation methods and orderings presented in this embodiment. An examination of planning analysis and conversations with planners reveals that, in most cases, planners want to use the "plan of record" as a premise. This assertion gives some justification for the primacy of the degree of axiomatic truth as first in the criterion ranking. Again, the frequency with which planners seek to use one variable as a premise for calculating another in cases where one variable is considered to be a causal "driver" of the other, lends some justification to secondary importance of causality in determining the reasonableness of an argument.

The trade-off between detail and quality of estimates is premised on the view that inaccurate detail is worthless and a reasonable aggregate view of things may be totally acceptable. For this reason, quality of estimates is ranked above detail.

The temporal currency is placed last, primarily because the user can influence through assertion or negation, the statements that are available to the system. If the user does not accept an argument because of temporal currency, the user may negate the argument and re-execute problem solving.

FIG. 8I depicts a variable object 910, a sub-problem 912 for projecting a value of a variable across a horizon and a series of intermediate hypothesis 914, 916, 918. The procedure performed by the processor 4, using the control module is described as follows.

In selecting and ordering the reconciliation rule objects, the processor 4 accesses the control branch of the hierarchical categorization, and then checks the ACTIVE slot. The ordering is explicitly declared through the set of relationships already by the relationships.

Each rule searches for a single immediate hypothesis (eg. greater than) usually there will be ties. Several intermediate hypotheses may be tied for the best. The non-successful intermediate hypotheses are ignored in determining the final hypothesis. As mentioned above, the data for all the reconciliation is contained in the hypothesis quality slots for each object.

In this manner, if pruning is successful, the system will create a final hypothesis object with the same attributes as the successful intermediate hypothesis. The final hypothesis is linked to all the competing intermediate hypotheses by an IS-A-RECONCILIATION-OF relationship. The final hypothesis is linked to the planning problem by the FINAL-HYPOTHESIS-OF relationship.

```
{{FINAL HYPOTHESIS
  IS-A+INV                       :
  IS-A                           : HYPOTHESIS
  LOCAL-EVIDENCE                 :
  DEPENDS-ON                     :
  PROJECTED-VALUE                :
  CAUSAL-LENGTH                  :
  QUALITY-OF-EXTIMATED-          :
    PREMISES
  NUMBER-OF-ESTIMATED-           :
    PREMISES
  NUMBER-OF-TRUE-PREMISES        :
  TOTAL-NUMBER-OF-PREMISES       :
  PERSPECTIVE                    :
  IS-A-RECONCILIATION-OF         :
  FINAL-HYPOTHESIS-OF            :}}
```

If pruning fails and multiple intermediate hypotheses continue to exist, the processor 4 will average the projected result, and average the hypothesis quality factors.

The above described exemplary embodiment of the invention is meant to be representative only, as certain changes and different applications may be made without departing from the clear teachings of the invention. Accordingly, references should be made to the following claims which alone define the invention.

APPENDIX I

RELATION DEFINITIONS

```
;; Define the new relation HAS-SUBSET,
(cschema 'is-a-subset-of
          ('is-a 'karma-relation)
          ('domain '(type instance variable))
          ('range '(schema (or
                            (type is-a variable)
                            (type is-a decomposition-rule))))
          ('inclusion 'subset-of-inclusion-spec)
          ('inverse 'has-subsets))

;; Define the new relation DECOMPOSITION-OF
(cschema 'decomposition-of
          ('is-a 'karma-relation)
          ('domain '(type instance decomposition-rule))
          ('range '(schema (type is-a variable)))
          ('exclusion 'decomposition-of-exclusion-spec)
          ('inclusion 'decomposition-of-inclusion-spec)
          ('inverse 'has-decomposition))

;; Define the new relation has-focus,
(cschema 'has-focus
          ('is-a 'karma-relation)
          ('domain '(type is-a variable))
          ('range '(schema (type is-a user-focus-primitive)))
          ('inverse 'has-object))
```

```
;; Define the new relation SUPPORTS,
(cschema 'supports
         ('is-a 'karma-relation)
         ('domain '(type is-a final-hypothesis))
         ('range '(schema (type is-a hypothesis )))
         ('inverse 'depends-on)
         ('transitivity '(repeat (step supports t)  1 inf)))
;; Define the new relation FINAL-HYPOTHESIS-OF
(cschema 'final-hypothesis-of
         ('is-a 'karma-relation)
         ('domain '(type is-a final-hypothesis))
         ('range '(schema (type is-a problem)))
         ('inverse 'has-final-hypothesis))

;; Define the new relation INTERMEDIATE-HYPOTHESIS-OF
(cschema 'intermediate-hypothesis-of
         ('is-a 'karma-relation)
         ('domain '(type is-a intermediate-hypothesis))
         ('range '(schema (type is-a problem)))
         ('inverse 'has-intermediate-hypothesis))

;; Define the new relation HAS-RECONCILIATION
(cschema 'has-reconciliation
         ('is-a 'karma-relation)
         ('domain '(type is-a intermediate-hypothesis))
         ('range '(schema (type is-a final-hypothesis)))
         ('inverse 'is-a-reconciliation-of))

;; Define the new relations HAS-SUBJECT
(cschema 'has-subject
         ('is-a 'karma-relation)
         ('domain '(type is-a problem))
         ('range '(schema (type is-a variable)))
         ('inverse 'has-planning-problem))

;; Define the new relations  SUB-PROBLEM-OF
(cschema 'sub-problem-of
         ('is-a 'karma-relation)
         ('domain '(type is-a problem))
         ('range '(schema (type is-a problem)))
         ('inclusion 'sub-problem-of-inclusion-spec)
         ('inverse 'has-sub-problem)
         ('transitivity '(repeat (step sub-problem-of t)  1 inf)))
;; Define the new relation OPINION-OF
(cschema 'opinion-of
         ('is-a 'karma-relation)
         ('domain '(or
```

```
                    (type is-a plan)
                    (type is-a document)
                    (type is-a opinion)))
        ('range '(schema (or
                            (type is-a knowledge-source)
                            (type is-a user-focus-primitive))))
        ('inclusion   'opinion-of-inclusion-spec)
        ('inverse 'has-opinion))

;; Define the new relation  IS-AN-OPINION-FOR
(cschema 'is-an-opinion-for
        ('is-a 'karma-relation)
        ('domain '(type is-a opinion))
        ('range '(schema (type is-a variable)))
        ('inverse 'subject-of-opinion))

;; Define the new relation HAS-EFFECT-ON
(cschema 'has-effect-on
        ('is-a 'karma-relation)
        ('domain '(type is-a change))
        ('range '(schema (type is-a variable)))
        ('inverse 'is-affected-by))

;; Define the new relation IS-CAUSED-BY
(cschema 'is-caused-by
        ('is-a 'karma-relation)
        ('domain '(type is-a change))
        ('range '(schema (type is-a programme)))
        ('inclusion 'is-caused-by-inclusion-spec)
        ('inverse 'causes))

;; Define the new relation HISTORY-OF,
(cschema 'history-of
        ('is-a 'karma-relation)
        ('domain '(type is-a history))
        ('range '(schema (type is-a variable)))
        ('inverse 'has-history))
;; Define the new relation GOAL-FOR
(cschema 'goal-for
        ('is-a 'karma-relation)
        ('domain '(type is-a goal))
        ('range '(schema (type is-a variable)))
        ('inverse 'has-goal))

;; Define the new relation IS-A-PLAN-FOR
(cschema 'is-a-plan-for
        ('is-a 'karma-relation)
```

```
        ('domain '(type is-a plan))
        ('range '(schema (type is-a variable)))
        ('inverse 'has-plan))

;; Define the new relation RESOURCE-OF
(cschema 'resource-of
        ('is-a 'karma-relation)
        ('domain '(type is-a variable))
        ('range '(schema (type is-a organisation)))
        ('inverse 'has-resource))

;; Define the new relation IS-PRODUCED-BY,
(cschema 'is-produced-by
        ('is-a 'karma-relation)
        ('domain '(type is-a variable))
        ('range '(schema (type is-a organisation)))
        ('inverse 'produces))

;; Define the new relation PRODUCTIVITY-OF
(cschema 'productivity-of
        ('is-a 'karma-relation)
        ('domain '(type is-a productivity))
        ('range '(schema (type is-a resource)))
        ('inverse 'has-productivity))

;; Define the new relation PRODUCTIVITY-IN-PRODUCING,
(cschema 'productivity-in-producing
        ('is-a 'karma-relation)
        ('domain '(type is-a productivity))
        ('range '(schema (type is-a variable)))
        ('inverse 'is-produced-with-productivity))
;; Define the new relation IS-PROPORTIONAL-TO,
(cschema 'is-proportional-to
        ('is-a 'karma-relation)
        ('domain '(type is-a variable))
        ('range '(schema (type is-a variable)))
        ('inverse 'is-proportional-to+inv))

;; Define the new relations HAS-DENOMINATOR,
(cschema 'has-denominator
        ('is-a 'karma-relation)
        ('domain '(type is-a ratio))
        ('range '(schema (type is-a variable)))
        ('inverse 'denominator-of))

;; Define the new relations HAS-NUMERATOR
(cschema 'has-numerator
```

```
        ('is-a 'karma-relation)
        ('domain '(type is-a ratio))
        ('range '(schema (type is-a variable)))
        ('inverse 'numerator-of))

;; Define the new relations FLOWS-INTO,
(cschema 'flows-into
        ('is-a 'karma-relation)
        ('domain '(type is-a variable))
        ('range '(schema (type is-a variable)))
        ('inverse 'flows-out-of))

;; Define the new relation IS-PRECEDED-BY,
(cschema 'is-preceded-by
        ('is-a 'karma-relation)
        ('domain '(type is-a reconciliation-rule))
        ('range '(schema (type is-a reconciliation-rule)))
        ('inverse 'has-precedence-over)
        ('transitivity '(repeat (step is-preceded-by t)  1 inf)))

;; define the inheritance spec for DECOMPOSITION-OF
(cschema 'decomposition-of-inclusion-spec
        ('instance 'inclusion-spec)
        ('type 'slot)
        ('slot-restriction
            (list 'not
                (append (list 'or
                                'tried-applicable-perspectives
                                'pruned-or-unsolvable-perspectives
                                'untried-applicable-perspectives
                                'name)
                    (let
                        ((relation-list
                            (get-values 'karma-relation
                                        'is-a+inv))
                         (allow-list (list 'is-a)))
                      (set-difference
                        relation-list allow-list))))))

(cschema 'decomposition-of-exclusion-spec
        ('instance 'exclusion-spec)
        ('slot-restriction
            (append (list 'or
                                'tried-applicable-perspectives
                                'pruned-or-unsolvable-perspectives
                                'untried-applicable-perspectives
                                'status
                                ;; 'has-history
```

```
                    'years-of-history
                    'annual-growth-rate
                    'parameters
                    'name)
            (let
                ((relation-list
                    (get-values 'karma-relation
                                'is-a+inv))
                (allow-list (list 'is-a)))
                    (set-difference
                        relation-list allow-list))))
        ('value-restriction T))

;;; Define the inheritance spec for IS-CAUSED-BY
(cschema 'is-caused-by-inclusion-spec
    ('instance 'inclusion-spec)
    ('type 'slot)
    ('slot-restriction '(or acceptance)))
;;; Define the inheritance spec for HAS-OPINION so that
;;  Acceptance slot is inherited all the way through.
(cschema 'opinion-of-inclusion-spec
    ('instance 'inclusion-spec)
    ('type 'slot)
    ('slot-restriction '(or acceptance)))

;; define the inheritance spec for a IS-A-SUBSET-OF
(cschema 'subset-of-inclusion-spec
        ('instance 'inclusion-spec)
        ('slot-restriction (list 'not (append
            (list 'or 'name 'decomposition-by)
                (let
                    ((relation-list
                    (get-values 'karma-relation
                    'is-a+inv))
                    (allow-list (list 'is-a)))
                    (set-difference
                    relation-list allow-list))))))

(cschema 'sub-problem-of-inclusion-spec
        ('instance 'inclusion-spec)
        ('slot-restriction
            (list 'not
                (append (list 'or
                    'tried-applicable-perspectives
                    'pruned-or-unsolvable-perspectives
                    'untried-applicable-perspectives
                    'local-evidence
                    'ignored-evidence
```

```
                    'residual-conflict-set
                    'total-number-of-premises
                    'number-of-true-premises
                    'reconciliation-rules
                    'reconciliation-explanation
                    'chosen-perspective
                    'causal-length
                    'sub-problem-information
                    'status
                    'name)
              (get-values 'karma-relation 'is-a+inv)))))
```

What is claimed:

1. A system analyzer which comprises:
   a. an input device;
   b. a computer processor coupled to the input device and arranged to accept as input a user query from the input device;
   c. a memory coupled to the computer processor;
   d. the memory including:
      i. a set of data objects, each data object in the set of data objects comprising information concerning a component of a system to be analyzed;
      ii. a set of variable objects, each variable object in the set of variable objects defining a factor which affects the functioning of at least one of the components of the system;
      iii. each variable object in the set of variable objects being linked to at least one other variable object in the set of variable objects by a first relationship being a member of a first set of pre-determined relationships such that the first relationship defines a real-world association that exists between the variable objects linked by the first relationship;
      iv. each data object in the set of data objects being linked to a preselected variable object by a second relationship being a member of a second set of pre-determined relationships such that the second relationship describes the applicability of the information contained in the data object linked thereby for use in determining a value for variable object linked thereby;
      v. a set of analytical methods; and
   e. the computer processor operating to process the user query by automatically selecting at least two analytical methods from the set of analytical methods and applying the selected analytical methods to obtain an answer to the user query from each analytical method, wherein the automatic selection of each analytical method is determined by the applicability of said analytical method to the query based upon the configuration of the data objects and variable objects.

2. The system analyzer of claim 1, wherein the computer processor operates to determine a single response to the user query by reconciling among the answers obtained from each analytical method.

3. A computer-based method to project the future value of a variable that relates to an enterprise, the method comprising the steps of:
   creating a model of the enterprise wherein the model is a frame-based model of the enterprise including a set of frames, each frame in the model representing real-world knowledge, each frame comprising a list of relationships, each relationship in the list of relationships specifying a relationship with another frame, each frame further comprising a list of attributes that store data relating to the frame; storing the model of the enterprise in a knowledge base;
   providing a set of reasoning methods;
   providing a set of reconciliation rules;
   accepting as input a query that requests information about the future value of the variable;
   applying each reasoning method in the set of reasoning methods, each reasoning method utilizing the set of frees, to generate from each reasoning method an intermediate hypothesis as to the future value of the variable; and
   reconciling between each intermediate hypothesis to obtain the future value of the variable by:
      (i) locating available reconciliation rules from the set of reconciliation rules;
      (ii) ordering the available reconciliation rules according to a pre-selected preference scheme; and
      (iii) applying the available reconciliation rules in the order determined at step (ii).

4. The method of claim 3 wherein the model of the enterprise includes information about production processes performed by the enterprise.

5. The method of claim 3 wherein the model of the enterprise includes information about a market environment.

6. The method of claim 3 wherein the model of the enterprise represents facts about the structure of the enterprise.

7. The method of claim 3 wherein the model of the enterprise includes flow relationships, causal relationships, compositional relationships and productivity relationships.

8. The method of claim 3 wherein the model of the enterprise includes proportionality relationships.

9. The method of claim 3 wherein the model of the enterprise includes opinion information, goal information and plan information.

10. The method of claim 3 wherein the step of creating a model of the enterprise includes the steps of
    identifying a plurality of objects that each represent a fact about the structure of the enterprise;
    assigning at least one attribute to each one of the plurality of objects;
    assigning at least one value to each one of the plurality of objects; and
    connecting each one of the plurality of objects to related objects.

11. The method of claim 3 wherein the set of reasoning methods includes proportionality reasoning.

12. The method of claim 11 wherein the set of reasoning methods further includes historical trend analysis.

13. The method of claim 3 wherein the set of reasoning methods includes historical trend analysis.

14. The method of claim 3 wherein the set of reasoning methods includes reasoning from productivity.

15. The method of claim 3 wherein the step of applying each reasoning method in the set of reasoning methods comprises the step of applying each reasoning method in parallel.

16. A computer-based method to project the future value of a variable that relates to an enterprise, the method comprising the steps of:
   creating a model of the enterprise;
   storing the model of the enterprise;
   providing a set of reasoning methods;
   providing a set of reconciliation rules;
   accepting as input a query that requests information about the future value of the variable;
   applying each reasoning method in the set of reasoning methods, each reasoning method utilizing the model, to generate from each reasoning method an intermediate hypothesis as to the future value of the variable; and
   reconciling between each reasoning method to obtain the future value of the variable, by
      (i) locating available reconciliation rules from the set of reconciliation rules,
      (ii) ordering the available reconciliation rules according to a pre-selected preference scheme, and
      (iii) applying the available reconciliation rules in the order determined at step (ii).

17. A computer-based method to project the future value of a variable that relates to an enterprise, the method comprising the steps of:
   creating a model of the enterprise comprising a set of variables objects each representing a component of the enterprise;
   storing the model of the enterprise in a knowledge base;
   providing a set of reasoning methods, each reasoning method including an attached required evidence procedure having a variable template;
   accepting as input a query that requests information about the future value of the variable;
   selecting a sub-set of reasoning methods from the set of reasoning methods that are applicable to the query by determining if the variable matched the variable template specified in the attached required evidence procedure for each reasoning method;
   applying each reasoning method in the sub-set of reasoning methods, each reasoning method utilizing the knowledge base, to generate from each reasoning method in the sub-set of reasoning methods an intermediate hypothesis as to the future value of the variable; and
   reconciling between each intermediate hypothesis to obtain the future value of the variable.

18. The method of claim 17 wherein the set of reasoning methods includes proportionality reasoning.

19. The method of claim 18 wherein the set of reasoning methods further includes historical trend analysis.

20. The method of claim 17 wherein the set of reasoning methods includes historical trend analysis.

21. The method of claim 17 wherein the set of reasoning methods includes reasoning from productivity.

* * * * *